(12) United States Patent
Steiner et al.

(10) Patent No.: US 12,216,262 B2
(45) Date of Patent: Feb. 4, 2025

(54) OPTICAL SYSTEM

(71) Applicant: 3M INNOVATIVE PROPERTIES COMPANY, St. Paul, MN (US)

(72) Inventors: Michael L. Steiner, New Richmond, WI (US); Andrew J. Ouderkirk, Kirkland, WA (US); Timothy L. Wong, West St. Paul, MN (US); Zhisheng Yun, Sammamish, WA (US); Jo A. Etter, Kirkland, WA (US); Gilles J. Benoit, Minneapolis, MN (US); John D. Le, Woodbury, MN (US); Erin A. McDowell, Afton, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 726 days.

(21) Appl. No.: 17/482,762

(22) Filed: Sep. 23, 2021

(65) Prior Publication Data

US 2022/0011557 A1    Jan. 13, 2022

Related U.S. Application Data

(62) Division of application No. 16/497,268, filed as application No. PCT/IB2018/051906 on Mar. 21, 2018, now Pat. No. 11,156,814.

(60) Provisional application No. 62/479,915, filed on Mar. 31, 2017.

(51) Int. Cl.
  *G02B 17/08*   (2006.01)
  *G02B 5/30*    (2006.01)
  *G02B 27/28*   (2006.01)

(52) U.S. Cl.
  CPC ....... *G02B 17/0856* (2013.01); *G02B 5/3083* (2013.01); *G02B 27/283* (2013.01)

(58) Field of Classification Search
  CPC ............ G02B 17/0856; G02B 17/0804; G02B 5/3083; G02B 5/30; G02B 5/3025; G02B 5/3033; G02B 27/283; G02B 27/28; G02B 27/017; G02B 27/0172
  See application file for complete search history.

(56) References Cited

U.S. PATENT DOCUMENTS

| 5,882,774 A | 3/1999 | Jonza |
| 5,929,946 A | 7/1999 | Sharp |
| 6,300,991 B1 | 10/2001 | Schadt |
| 6,400,493 B1 | 6/2002 | Mertz et al. |

(Continued)

FOREIGN PATENT DOCUMENTS

WO    WO 2017-040875    3/2017

OTHER PUBLICATIONS

Belyaev, "Phase Retardation vs. Pretilt Angle in Liquid Crystal Cells with Homogenous and Inhomogeneous LC Director Configuration" Optics Express, Feb. 2013, vol. 21, No. 4, pp. 4244-4249.

(Continued)

*Primary Examiner* — Stephone B Allen
*Assistant Examiner* — Adam W Booher
(74) *Attorney, Agent, or Firm* — Clifton F. Richardson

(57) ABSTRACT

An optical system including one or more optical lenses, at least one retarder layer, a reflective polarizer, and a partial reflector is provided. The at least one retarder layer may include first and second retarder layers having different wavelength dispersion curves. The at least one retarder layer may include a first retarder layer having a non-uniform fast axis orientation and/or a non-uniform retardance.

5 Claims, 26 Drawing Sheets

(56) References Cited

U.S. PATENT DOCUMENTS

| | | | |
|---|---|---|---|
| 6,609,795 | B2 | 8/2003 | Weber |
| 9,555,589 | B1 | 1/2017 | Ambur |
| 10,394,040 | B2 | 8/2019 | Gollier |
| 2002/0180916 | A1 | 12/2002 | Schadt |
| 2003/0028048 | A1 | 2/2003 | Cherkaoui |
| 2005/0072959 | A1 | 4/2005 | Moia |
| 2006/0197068 | A1 | 9/2006 | Schadt |
| 2007/0120089 | A1 | 5/2007 | Mao |
| 2008/0144177 | A1 | 6/2008 | Miller |
| 2009/0097117 | A1 | 4/2009 | Coleman |
| 2010/0254002 | A1 | 10/2010 | Merrill |
| 2013/0207031 | A1 | 8/2013 | Palaniswamy |
| 2017/0068100 | A1 | 3/2017 | Ouderkirk |

OTHER PUBLICATIONS

Miskiewicz, "Direct-Writing of Complex Liquid Crystal Patterns", Optics Express, May 2014, vol. 22, No. 10, p. 12691-12706.

Product Information: "Rolic® LCMO Achromatic Retarders", A Product of ROLIC Technologies Ltd., Feb. 2017, 2 pages.

Puliyalil, "Selective Plasma Etching of Polymeric Substrates for Advanced Applications", Nanomaterials, Jun. 2016, vol. 6, No. 6, pp. 1-24.

Schadt, "Optical Patterning of Multi-Domain Liquid-Crystal Displays with Wide Viewing Angles", Nature, May 1996 vol. 381, No. 6579, pp. 212-215.

Seiberle, "Photo-Aligned Anisotropic Optical Thin Films", Journal of the SID, Mar. 2004, vol. 12, No. 1, pp. 87-92.

International Search Report for PCT International Application No. PCT/IB2018/051906, mailed on Oct. 1, 2018, 10 pages.

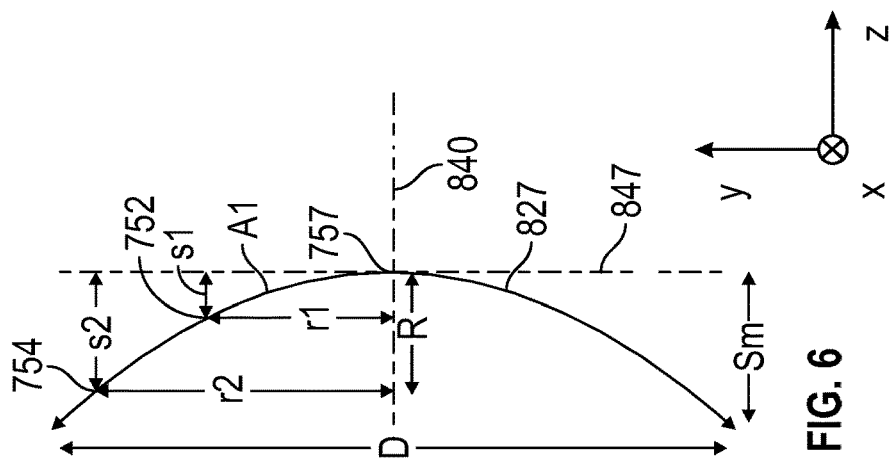
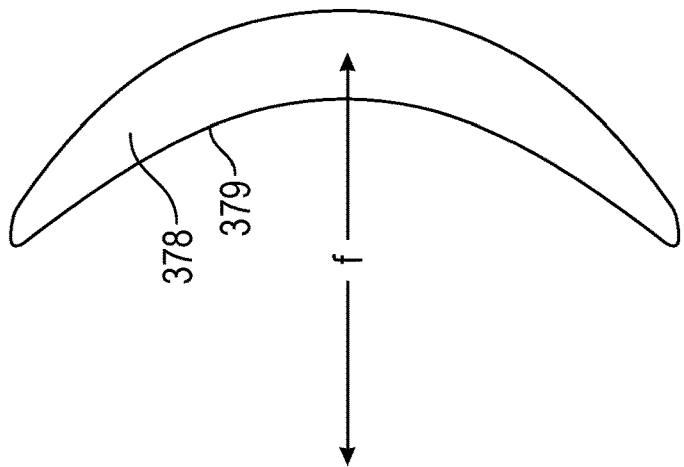
FIG. 5A
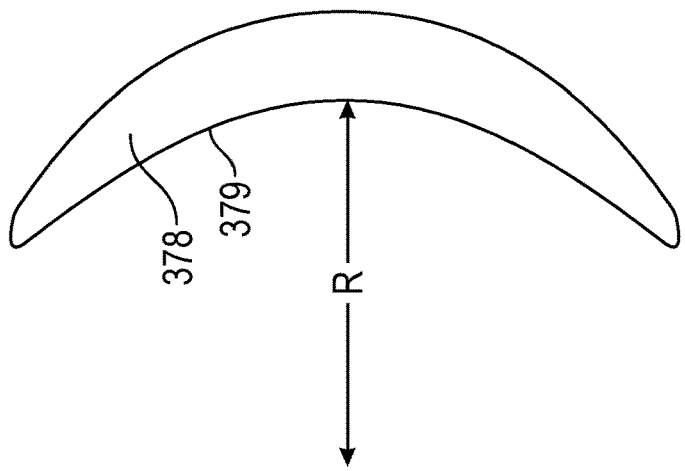
FIG. 5B
FIG. 6

Fast Axis Orientation

Fast Axis Orientation (deg)

OPTICAL SYSTEM

BACKGROUND

Optical systems may utilize a reflective polarizer, a partial reflector and a phase retarder. Such optical systems are useful in head-mounted displays.

SUMMARY

In some aspects of the present description, an optical system for transmitting light is provided. The optical system includes one or more optical lenses having at least one curved major surface; a first retarder layer having a first wavelength dispersion curve in a predetermined wavelength range; a reflective polarizer disposed on and conforming to a major surface of the one or more optical lenses, the reflective polarizer substantially reflecting light having a first polarization state and substantially transmitting light having an orthogonal second polarization state in the predetermined wavelength range; a partial reflector disposed on and conforming to a major surface of the one or more optical lenses between the first retarder layer and the reflective polarizer, the partial reflector having an average optical reflectance of at least 20% in the predetermined wavelength range; and a second retarder layer disposed between the partial reflector and the reflective polarizer and having a second wavelength dispersion curve, different than the first wavelength dispersion curve, in the predetermined wavelength range.

In some aspects of the present description, an optical system for displaying an object to a viewer is provided. The optical system includes one or more optical lenses having at least one curved major surface; a reflective polarizer disposed on and conforming to a first major surface of the one or more optical lenses, the reflective polarizer substantially reflecting light having a first polarization state and substantially transmitting light having an orthogonal second polarization state in a predetermined wavelength range; a partial reflector disposed on and conforming to a different second major surface of the one or more optical lenses, the partial reflector having an average optical reflectance of at least 20% in the predetermined wavelength range; a first retarder layer disposed on and conforming to a third major surface of the one or more optical lenses; and a second retarder layer disposed on and conforming to a fourth major surface, different than the third major surface, of the one or more optical lenses. For at least one wavelength in the predetermined wavelength range, at least one of the first and second retarder layers has a substantially uniform retardance across a first region of the retarder layer and a non-uniform retardance across a different second region of the retarder layer.

In some aspects of the present description, an optical system for displaying an object to a viewer is provided. The optical system includes one or more optical lenses having at least one curved major surface; a reflective polarizer disposed on and conforming to a major surface of the one or more optical lenses, the reflective polarizer substantially reflecting light having a first polarization state and substantially transmitting light having an orthogonal second polarization state in a predetermined wavelength range; a partial reflector disposed on and conforming to a major surface of the one or more optical lenses, the partial reflector having an average optical reflectance of at least 20% in the predetermined wavelength range; a first and second spaced apart retarder layers disposed on and conforming to different major surfaces of the one or more optical lenses. The first retarder layer is substantially a quarter-wave retarder for a first wavelength in the predetermined wavelength range, and the second retarder layer is substantially a quarter-wave retarder for a different second wavelength in the predetermined wavelength range.

In some aspects of the present description, an optical system for displaying an object to a viewer and having a maximum contrast ratio at a predetermined wavelength is provided. The optical system includes one or more optical lenses having at least one curved major surface; a reflective polarizer disposed on and conforming to a first major surface of the one or more optical lenses, the reflective polarizer substantially reflecting light having a first polarization state and substantially transmitting light having an orthogonal second polarization state at the predetermined wavelength; a partial reflector disposed on and conforming to a different second major surface of the one or more optical lenses, the partial reflector having an average optical reflectance of at least 20% at the predetermined wavelength; and a first retarder layer disposed on and conforming to a major surface of the one or more optical lenses. The optical system has an optical axis such that a light ray propagating along the optical axis passing through the one or more optical lenses, the partial reflector, the reflective polarizer and the first retarder layer without being substantially refracted. The optical axis intersects the first retarder layer at an origin. For a light ray having the first polarization state at the predetermined wavelength passing through the origin, the first retarder layer converts the light ray to an elliptically polarized light for the light ray propagating along the optical axis, and to a circularly polarized light for the light ray propagating along a direction oblique to the optical axis.

In some aspects of the present description, an optical system for displaying an object to a viewer is provided. The optical system includes one or more optical lenses having at least one curved major surface; a reflective polarizer substantially reflecting light having a first polarization state and substantially transmitting light having an orthogonal second polarization state at a predetermined wavelength; a partial reflector having an average optical reflectance of at least 20% at the predetermined wavelength; and a first unitary retarder having at at least one first location, a first orientation relative to the first polarization state and a first retardance at the predetermined wavelength, and at at least one different second location, a different second orientation relative to the first polarization state and a different second retardance at the predetermined wavelength.

In some aspects of the present description, a display system for displaying an image to a viewer and having a maximum contrast ratio at a predetermined wavelength is provided. The display system includes a display emitting an image and an optical system for displaying the emitted image to the viewer. The optical system includes one or more optical lenses having at least one curved major surface; a reflective polarizer substantially reflecting light having a first polarization state and substantially transmitting light having an orthogonal second polarization state at a predetermined wavelength; a partial reflector having an average optical reflectance of at least 20% at the predetermined wavelength; and a unitary first retarder layer. The display system has an optical axis such that a light ray emitted by the display and propagating along the optical axis passes through the one or more optical lenses, the partial reflector, the reflective polarizer and the first retarder layer without being substantially refracted. For an emitted chief light ray having the first polarization state at the predetermined wavelength, the first retarder layer converts the chief light ray to a circularly polarized light for the chief light ray emitted from an edge of the image, and to an elliptically polarized light for the chief light ray propagating along the optical axis.

In some aspects of the present description, a display system for displaying an image to a viewer and having a maximum contrast ratio at a predetermined wavelength is provided. The display system includes a display emitting an image and an optical system for displaying the emitted image to the viewer. The optical system includes one or more optical lenses having at least one curved major surface; a reflective polarizer substantially reflecting light having a first polarization state and substantially transmitting light having an orthogonal second polarization state at a predetermined wavelength; a partial reflector having an average optical reflectance of at least 20% at the predetermined wavelength; and a unitary first retarder layer. The display system has an optical axis such that a light ray emitted by the display and propagating along the optical axis passes through the one or more optical lenses, the partial reflector, the reflective polarizer and the first retarder layer without being substantially refracted. For a plurality of chief light rays emitted by the display, each chief light ray having the first polarization state at the predetermined wavelength and a different separation from the optical axis, the first retarder layer converts the chief light ray to a circularly polarized light.

In some aspects of the present description, a display system for displaying an image to a viewer and having a maximum contrast ratio at a predetermined wavelength is provided. The display system includes a display emitting an image and an optical system for displaying the emitted image to the viewer. The optical system includes one or more optical lenses having at least one curved major surface; a reflective polarizer substantially reflecting light having a first polarization state and substantially transmitting light having an orthogonal second polarization state at the predetermined wavelength; a partial reflector having an average optical reflectance of at least 20% at the predetermined wavelength; and a unitary first retarder layer. The display system has an optical axis such that a light ray emitted by the display and propagating along the optical axis passes through the one or more optical lenses, the partial reflector, the reflective polarizer and the first unitary retarder layer without being substantially refracted. For a plurality of chief light rays emitted by the display, each chief light ray having the first polarization state at the predetermined wavelength and a different separation from the optical axis, the first retarder layer has a retardance within 10% of one fourth of the predetermined wavelength.

In some aspects of the present description, an optical system for displaying an object to a viewer is provided. The optical system includes one or more optical lenses having at least one curved major surface; a reflective polarizer disposed on and conforming to a first major surface of the one or more optical lenses, the reflective polarizer substantially reflecting light having a first polarization state and substantially transmitting light having an orthogonal second polarization state; a partial reflector disposed on and conforming to a different second major surface of the one or more optical lenses, the partial reflector having an average optical reflectance of at least 20%; a first retarder layer disposed on and conforming to a third major surface of the one or more optical lenses; and a second retarder layer disposed on and conforming to a fourth major surface, different than the third major surface, of the one or more optical lenses. Relative to the first polarization state, the first retarder layer has a substantially uniform orientation and non-uniform retardance across the first retarder layer, and the second retarder layer has a substantially uniform retardance and non-uniform orientation across the second retarder layer.

In some aspects of the present description, an optical system for displaying an object to a viewer is provided. The optical system includes one or more optical lenses having at least one curved major surface; a reflective polarizer disposed on and conforming to a first major surface of the one or more optical lenses, the reflective polarizer substantially reflecting light having a first polarization state and substantially transmitting light having an orthogonal second polarization state; a partial reflector disposed on and conforming to a different second major surface of the one or more optical lenses, the partial reflector having an average optical reflectance of at least 20%; a first retarder layer disposed on and conforming to a third major surface of the one or more optical lenses; and a second retarder layer disposed on and conforming to a fourth major surface, different than the third major surface, of the one or more optical lenses. Relative to the first polarization state, the first retarder has a substantially uniform orientation and uniform retardance across the first retarder layer, and the second retarder layer has a substantially non-uniform retardance and non-uniform orientation across the second retarder layer.

In some aspects of the present description, an optical system for displaying an object to a viewer and having a maximum contrast ratio at a predetermined wavelength is provided. The optical system includes one or more optical lenses having at least one curved major surface; a reflective polarizer disposed on and conforming to a first major surface of the one or more optical lenses, each location on the reflective polarizer having corresponding mutually orthogonal pass and block polarization states, such that at the location, the reflective polarizer substantially reflects light having the block polarization state and substantially transmits light having the pass polarization state at the predetermined wavelength; a partial reflector disposed on and conforming to a different second major surface of the one or more optical lenses, the partial reflector having an average optical reflectance of at least 20% at the predetermined wavelength; a first retarder layer disposed on and conforming to a third major surface of the one or more optical lenses; and a second retarder layer disposed on and conforming to a fourth major surface, different than the third major surface, of the one or more optical lenses between the partial reflector and the reflective polarizer. The optical system has an optical axis such that a light ray propagating along the optical axis passes through the one or more optical lenses, the partial reflector, the reflective polarizer and the first and second retarder layers without being substantially refracted. The optical axis intersects the first retarder layer at a first origin and the reflective polarizer at a second origin, such that for a light ray having the predetermined wavelength and the block polarization state of the reflective polarizer at the second origin and first incident on the first retarder layer at the first origin and making an angle θ with the optical axis, the light ray is substantially reflected when first incident on the reflective polarizer at a first location and substantially transmitted when second incident on the reflective polarizer at a second location. A difference between the polarization state of the light ray and the pass polarization state of the reflective polarizer at the second location is greater when θ is zero and less when θ is not zero.

In some aspects of the present description, a display system for displaying an image to a viewer and having a maximum contrast ratio at a predetermined wavelength is provided. The display system includes a display emitting an image and an optical system for displaying the emitted image to the viewer. The optical system includes one or more optical lenses having at least one curved major surface; a reflective polarizer disposed on and conforming to a first major surface of the one or more optical lenses; a partial reflector disposed on and conforming to a different second major surface of the one or more optical lenses, the partial reflector having an average optical reflectance of at least 20% at the predetermined wavelength; and spaced apart first and second retarder layers disposed on and conforming to different major surfaces of the one or more optical lenses. Each location on the reflective polarizer has corresponding mutually orthogonal pass and block polarization states, such that at the location, the reflective polarizer substantially reflects light having the block polarization state and substantially transmits light having the pass polarization state at the predetermined wavelength. Each of the first and second retarder layers has at least one of a variable retardance and orientation. The optical system has an optical axis such that a light ray propagating along the optical axis passes through the one or more optical lenses, the partial reflector, the reflective polarizer and the first and second retarder layers without being substantially refracted. For a plurality of chief light rays emitted by the display, each chief light ray having the predetermined wavelength and emitted at a different separation from the optical axis, the chief ray is substantially reflected when first incident on the reflective polarizer at a first location thereon and substantially transmitted when second incident on the reflective polarizer at a second location thereon. A difference between the polarization state of the chief ray at the second location and the pass polarization state of the reflective polarizer at the second location being less than about 0.07.

In some aspects of the present description, a display system for displaying an image to a viewer and having a maximum contrast ratio at a predetermined wavelength is provided. The display system includes an exit pupil having a diameter in a range from about 4.5 mm to about 6 mm; a display emitting an image; and an optical system for displaying the emitted image to the viewer. The optical system includes one or more optical lenses having an f-number in a range from about 0.2 to about 2.5; a reflective polarizer substantially reflecting light having a first polarization state and substantially transmitting light having an orthogonal second polarization state at the predetermined wavelength; a partial reflector disposed on and conforming to a different second major surface of the one or more optical lenses, the partial reflector having an average optical reflectance of at least 20% at the predetermined wavelength; and spaced apart first and second retarder layers disposed on and conforming to different major surfaces of the one or more optical lenses. At the predetermined wavelength and the first polarization state and for each location in a plurality of locations on the display, the display emits a cone of light rays substantially filling the exit pupil. The cone of light rays passes through the first and second retarder layers over respective first and second incident areas, such that an average retardance of each of the first and second retarder layers over the respective first and second incident areas is within 10% of one fourth of the predetermined wavelength.

In some aspects of the present description, an optical system for displaying an image to a viewer and having a maximum contrast ratio at a predetermined wavelength is provided. The optical system includes one or more optical lenses having at least one curved major surface; a first retarder layer; a reflective polarizer disposed on and conforming to a major surface of the one or more optical lenses; a partial reflector disposed on and conforming to a major surface of the one or more optical lenses between the first retarder layer and the reflective polarizer, the partial reflector having an average optical reflectance of at least 20% at the predetermined wavelength; and a second retarder layer disposed between the partial reflector and the reflective polarizer. The optical system has an optical axis such that a light ray propagating along the optical axis passes through the one or more optical lenses, the partial reflector, the reflective polarizer and the first and second retarder layers without being substantially refracted. The optical axis intersects the first retarder layer at a first origin and the reflective polarizer at a second origin. At the second origin, the reflective polarizer substantially reflects light having a block polarization state and substantially transmits light having an orthogonal pass polarization state at the predetermined wavelength. For a first light ray propagating along the optical axis and incident on the first retarder layer at the first origin having the predetermined wavelength and the block polarization state, the first light ray comprises a first polarization state when first incident on the reflective polarizer and a second polarization state when second incident on the reflective polarizer, a difference between the first and block polarization states being less than a difference between the second and pass polarization states.

In some aspects of the present description, an optical system for transmitting light is provided. The optical system includes one or more optical lenses having at least one curved major surface; a partial reflector disposed on and conforming to a major surface of the one or more optical lenses and having an average optical reflectance of at least 20% in a predetermined wavelength range; a reflective polarizer disposed on and conforming to a major surface of the one or more optical lenses, the reflective polarizer substantially reflecting light having a first polarization state and substantially transmitting light having an orthogonal second polarization state in the predetermined wavelength range; and a first retarder disposed on and conforming to a major surface of the one or more optical lenses. The optical system has an optical axis such that a light ray propagating along the optical axis passes through the one or more optical lenses, the partial reflector, the reflective polarizer and the first retarder without being substantially refracted. The optical axis intersects the first retarder at a first origin. The first retarder includes non-overlapping central and first and second edge regions, where the central region includes the first origin, and the first and second edge regions are disposed at or near respective first and second edges of the first retarder, such that for at least one first wavelength $\lambda_o$ in the predetermined wavelength range: the central region has an average retardance substantially equal to $\delta$; the first edge region has an average retardance substantially equal to $\delta-\xi$; and the second edge region has an average retardance substantially equal to $\delta+\xi$. For an integer n, $\lambda_o(n+1/8) \leq \delta \leq \lambda_o(n+1/2)$ and $\delta/50 \leq \xi \leq \delta/2$.

In some aspects of the present description, an optical system for transmitting light is provided. The optical system includes one or more optical lenses having at least one curved major surface; a partial reflector disposed on and conforming to a major surface of the one or more optical lenses and having an average optical reflectance of at least 20% in a predetermined wavelength range; a reflective polarizer disposed on and conforming to a major surface of the one or more optical lenses, the reflective polarizer substantially reflecting light having a first polarization state and substantially transmitting light having an orthogonal second polarization state in the predetermined wavelength range; and a first retarder disposed on and conforming to a major surface of the one or more optical lenses. For at least one first wavelength $\lambda_o$ in the predetermined wavelength range: a center of the first retarder has a retardance equal to $\delta_o$, wherein for an integer n, $\lambda_o(n+\frac{1}{8}) \leq \delta_o \leq \lambda_o(n+\frac{1}{2})$; and a retardance of the first retarder increases in a first direction away from the center to an edge of the first retarder and decreases in a second direction away from the center to an edge of the first retarder, an angle between the first and second directions being in a range from about 60 degrees to about 120 degrees, such that a maximum contrast ratio of the optical system in the predetermined wavelength range is at least 5% greater than that of a comparative optical system having the same construction except that the first retarder of the comparative optical system has a uniform retardance of $\delta_o$.

In some aspects of the present description, an optical system for transmitting light is provided. The optical system includes one or more optical lenses having at least one curved major surface; a partial reflector disposed on and conforming to a major surface of the one or more optical lenses and having an average optical reflectance of at least 20% in a predetermined wavelength range; a reflective polarizer disposed on and conforming to a major surface of the one or more optical lenses, the reflective polarizer substantially reflecting light having a first polarization state and substantially transmitting light having an orthogonal second polarization state in the predetermined wavelength range; and a first retarder disposed on and conforming to a major surface of the one or more optical lenses. For at least one first wavelength $\lambda_o$ in the predetermined wavelength range: a center of the first retarder has a fast axis orientation relative to the fast optical axis equal to $\theta_o$, $\theta_o$ being in a range of 35 to 55 degrees; and a fast axis orientation of the first retarder increases in a first direction away from the center to an edge of the retarder and decreases in a second direction away from the center to an edge of the retarder, an angle between the first and second directions being in a range from about 60 degrees to about 120 degrees, such that a maximum contrast ratio of the optical system in the predetermined wavelength range is at least 5% greater than that of a comparative optical system having the same construction except that the first retarder of the comparative optical system has a uniform fast axis orientation with respect to the first polarization state of $\theta_o$.

In some aspects of the present description, an optical system for transmitting light is provided. The optical system includes one or more optical lenses having at least one curved major surface; a partial reflector disposed on and conforming to a major surface of the one or more optical lenses and having an average optical reflectance of at least 20% in a predetermined wavelength range; a reflective polarizer disposed on and conforming to a major surface of the one or more optical lenses, the reflective polarizer substantially reflecting light having a first polarization state and substantially transmitting light having an orthogonal second polarization state in the predetermined wavelength range; and a first retarder disposed on and conforming to a major surface of the one or more optical lenses. The optical system has an optical axis such that a light ray propagating along the optical axis passes through the one or more optical lenses, the partial reflector, the reflective polarizer and the first retarder without being substantially refracted. The optical axis intersects the first retarder at a first origin. The first retarder includes non-overlapping central and first and second edge regions, where the central region includes the first origin, and the first and second edge regions are disposed at or near respective first and second edges of the first retarder, such that for at least one first wavelength $\lambda_o$ in the predetermined wavelength range: the central region has an average fast axis orientation relative to the first polarization state substantially equal to $\theta$; the first edge region has an average fast axis orientation relative to the first polarization state substantially equal to $\theta-\varepsilon$; and the second edge region has an average fast axis orientation relative to the first polarization state substantially equal to $\theta+\varepsilon$. $\theta$ is in a range of 35 to 55 degrees and $\varepsilon$ is in a range of 0.5 to 20 degrees.

In some aspects of the present description, an optical system for transmitting light is provided. The optical system includes one or more optical lenses having at least one curved major surface; a partial reflector disposed on and conforming to a major surface of the one or more optical lenses and having an average optical reflectance of at least 20% in a predetermined wavelength range; a reflective polarizer disposed on and conforming to a major surface of the one or more optical lenses, the reflective polarizer substantially reflecting light having a first polarization state and substantially transmitting light having an orthogonal second polarization state in the predetermined wavelength range; and a first retarder disposed on and conforming to a major surface of the one or more optical lenses. The first retarder includes a first region having a substantially uniform retardance and a non-overlapping second region having a non-uniform retardance, the first region having a surface area of at least 10 percent of a total surface area of the first retarder, the second region being a remaining portion of the first retarder.

In some aspects of the present description, an optical system for transmitting light is provided. The optical system includes one or more optical lenses having at least one curved major surface; a partial reflector disposed on and conforming to a major surface of the one or more optical lenses and having an average optical reflectance of at least 20% in a predetermined wavelength range; a reflective polarizer disposed on and conforming to a major surface of the one or more optical lenses, the reflective polarizer substantially reflecting light having a first polarization state and substantially transmitting light having an orthogonal second polarization state in the predetermined wavelength range; and a first retarder disposed on and conforming to a major surface of the one or more optical lenses. The first retarder includes a first region having a substantially uniform fast axis orientation and a non-overlapping second region having a non-uniform fast axis-orientation, the first region having a surface area of at least 10 percent of a total surface area of the first retarder, the second region being a remaining portion of the first retarder.

BRIEF DESCRIPTION OF THE DRAWINGS

FIGS. 5A-5B are schematic cross-sectional views of an optical lens;

FIG. 6 is a schematic cross-sectional view of a curved surface;

DETAILED DESCRIPTION

Figure 1A:
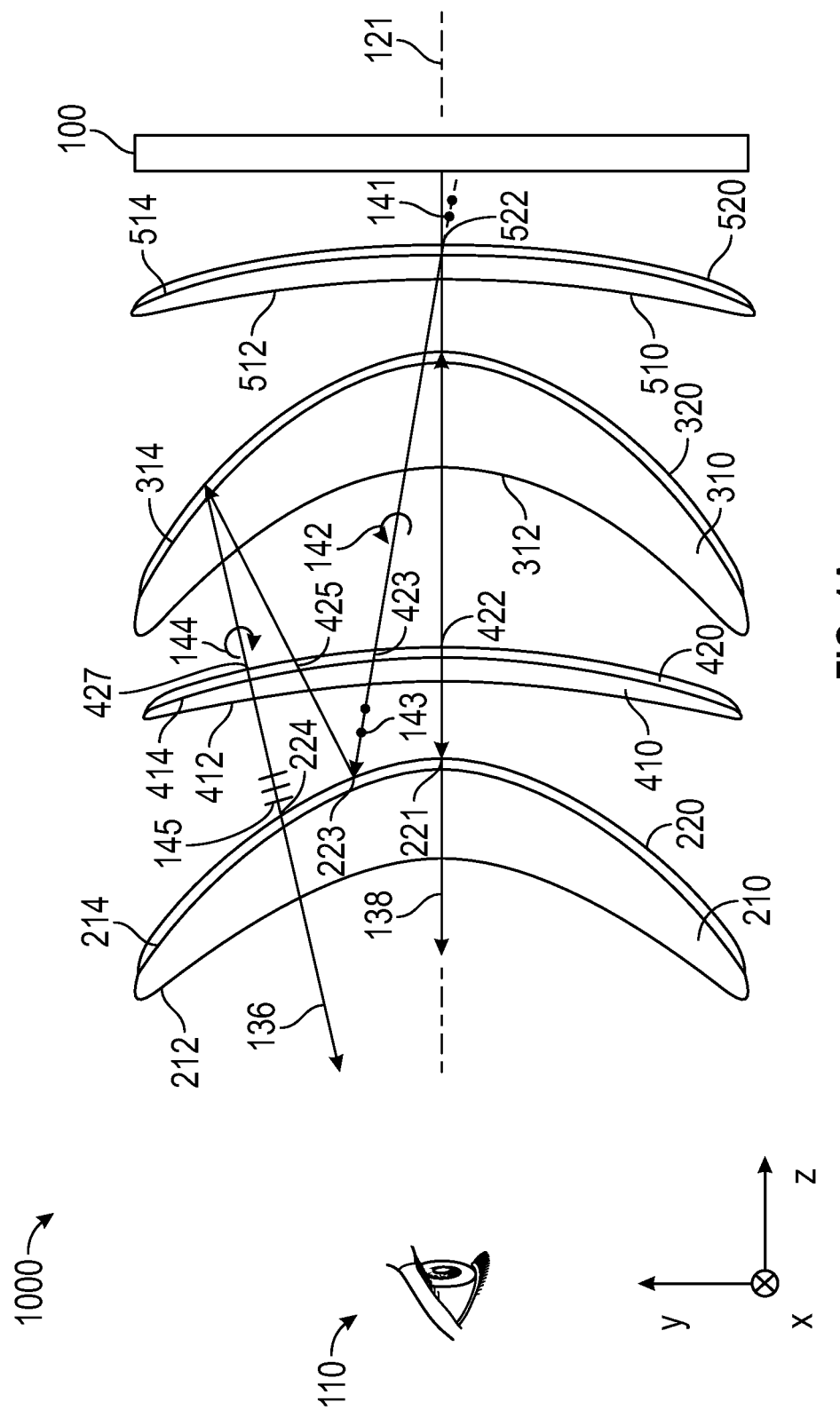
FIG. 1A is a schematic cross-sectional view of an optical system.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Optical systems of the present description are useful in head-mounted displays, for example, where an image from a display panel is provided to a viewer. Such head-mounted displays are useful in virtual reality and/or gaming applications, for example. Related optical systems are described in U.S. Pat. Appl. Pub. No. 2017/0068100 (Ouderkirk et al.) filed Sep. 25, 2015, which is hereby incorporated herein by reference to the extent that it does not contradict the present description.

Optical systems of the present description typically include one or more optical lenses, a reflective polarizer, a partial reflector, and at least one retarder layer. The reflective polarizer typically substantially reflects light having a first polarization state and substantially transmits light having an orthogonal second polarization state at a predetermined wavelength or in a predetermined wavelength range. In some embodiments, the reflective polarizer is disposed on and conforms to a first major surface of the one or more optical lenses. The partial reflector typically has an average optical reflectance of at least 20% or at least 30% at a predetermined wavelength or in a predetermined wavelength range. In some embodiments, the partial reflector is disposed on and conforms to a different second major surface of the one or more optical lenses.

According to the present description, it has been found that the retarder layer(s) in the optical system can be selected to give improved optical performance (e.g., increased contrast ratio, reduced ghosting). The retarder layer(s) may have wavelength dispersion curves selected to give a non-quarter wave retardance at some wavelengths in the visible range, or one retarder layer may be selected to have a first wavelength dispersion curve and another retarder layer may be selected to have a different second wavelength dispersion curve. A retarder layer may also be referred to as a retarder. In some embodiments, one or more retarders may be selected such that the retardance or the fast optical axis orientation of the retarder varies over an area of the retarder. It has been found, that using retarders with differing wavelength dispersion curves, and/or with variable retardance, and/or with variable fast axis orientation can be used to correct for various optical defects present in some optical system and thus provide improved optical performance. For example, in optical systems using a standard quarter-wave retarder, there may be misalignments between a local block state of the reflective polarizer and the polarization state of a light ray first incident on the reflective polarizer and/or between a local pass state of the reflective polarizer and the polarization state of a light ray second incident on the reflective polarizer. Such misalignments can occur due to shifts in the local pass and block axes of the reflective polarizer when it is formed into a curved shape, for example. Rectangular displays or displays tilted or off-center relative to an optical axis of the optical system, for example, can also lead to such misalignments if a standard quarter-wave retarder were used.

In some embodiments, the at least one retarder layer includes a first retarder layer having a spatially varying retardance and/or a spatially varying fast optical axis orientation. In some embodiments, the at least one retarder layer includes first and second retarder layers where one of the first and second retarders has a spatially varying retardance and a spatially uniform fast optical axis orientation and the other of the first and second retarders has a spatially uniform retardance and a spatially varying fast optical axis orientation. In a retarder having a uniform retardance, retardance is uniform as a function of position across the retarder at a given wavelength and a given incidence angle. In some embodiments, the at least one retarder layer includes first and second retarder layers where at least one of the first and second retarder layers has a substantially uniform retardance across a first region of the retarder layer and a non-uniform retardance across a different second region of the retarder layer. In some embodiments, the first region is an interior region and the second region is a perimeter region substantially surrounding the interior region.

In some embodiments, the at least one retarder layer includes first and second retarder layers where the first retarder layer has a first wavelength dispersion curve and the second retarder layer has a different second wavelength dispersion curve. In such embodiments, the first and second retarder layers may each have a spatially uniform retardance and fast axis orientation, while in other embodiments, one or both of the first and second retarder layers may have a spatially varying retardance and/or a spatially varying fast optical axis orientation. In some embodiments, the at least one retarder layer includes first and second retarder layers where the first retarder layer is substantially a quarter-wave retarder at a first wavelength in a predetermined wavelength range and the second retarder layer is substantially a quarter wave retarder at a different second wavelength in the predetermined wavelength range. In some embodiments, one or both of the first and second retarder layers are chromatic retarders with a wavelength dispersion curve varying monotonically with increasing wavelength.

FIG. 1A is a schematic cross-sectional view of an optical system 1000 for transmitting light. In some embodiments, optical system 1000 displays an object 100 to a viewer 110. The object 100 may be a display or an image on a display, for example. Suitable displays include liquid crystal displays (LCDs) and organic light emitting diode (OLED) displays, for example. Alternatively, the object 100 may be some object other than a display such as an object in the environment of the viewer 110. In embodiments in which object 100 is a display, the optical system 1000 together with the display may be referred to as a display system or alternatively the optical system 1000 may be described as including the display. The optical system 1000 includes optical lenses 210, 410, 310 and 510, a reflective polarizer 220, a partial reflector 320, and retarder layers 420 and 520. Optical lens 210 has opposing first and second major surfaces 212 and 214, optical lens 310 has opposing first and second major surfaces 312 and 314, optical lens 410 has opposing first and second major surfaces 412 and 414, and optical lens 510 has opposing first and second major surfaces 512 and 514. The reflective polarizer 220 is disposed on and conforms to the major surface 214 of optical lens 210. The partial reflector 320 is disposed on and conforms to the major surface 314 of optical lens 320. Retarder layer 420 is disposed on and conforms to the major surface 414 of optical lens 410. Retarder layer 520 is disposed on and conforms to the major surface 514 of optical lens 510. In other embodiments, one or more of the reflective polarizer 220, the partial reflector 320, and the retarder layers 420 and 520 are disposed on a different major surface than shown in the embodiment illustrated FIG. 1A. For example, any one or more of the reflective polarizer 220, the partial reflector 320, and the retarder layers 420 and 520 can be disposed on the opposite major surface of the respective lens. As another example, one or more of these layers may be disposed on another one of these layers. For example, retarder layer 420 can be disposed on reflective polarizer 220 opposite the major surface 214, and/or retarder layer 520 can be disposed on partial reflector 320 opposite the major surface 314. As yet another example, the retarder layer 520 can be disposed on a major surface of the object 100 when the object 100 is a display.

Object 100 emits a light ray 136 having a polarization state 141. The path of light ray 136 is schematically illustrated in FIG. 1A. In some embodiments, object 100 is a display panel producing a polarized light output. In some embodiments, a pre-polarizer is provided which polarizes light from object 100 so that the light has the polarization state 141 when incident on retarder layer 520. In some embodiments, the object 100 is an object in the environment of the viewer 110 which emits light 136 by reflecting ambient light towards optical system 1000. After passing through the retarder layer 520 and passing through partial reflector 320, the light ray 136 has polarization state 142; then after passing through retarder layer 420, the light ray 136 has the polarization state 143 when first incident on reflective polarizer at first location 223; then after passing back through retarder layer 420 and reflecting from partial reflector 320, the light ray has the polarization state 144; and then the light ray passes again through retarder layer 420 in polarization state 145 and is second incident on reflective polarizer 220 at second location 224. In some embodiments, the polarization state 141 is a linear polarization state and the retarder layer 520 is selected such that polarization state 142 is an elliptical or circular polarization state. As described further elsewhere herein, the retarder layer 520 can be selected to achieve the polarization state 142 by a suitable selection of the fast optical axis orientation and the retardance at the location (origin 522) where the light ray 136 is incident on the retarder layer 520, where the desired retardance can be obtained by a suitable selection of the in-plane refractive index contrast, the out-of-plane refractive index contrast and the physical thickness of the layers. Similarly, the polarization state 144, which may be an elliptical or a circular polarization state, can be achieved by a suitable selection of the retardance and fast optical axis orientation at locations 423 and 425 where light ray 136 is first and second incident on retarder layer 420; and the polarization state 145 for transmission through the reflective polarizer 220 can be achieved by a suitable selection of the retardance and fast optical axis orientation at location 427 on retarder layer 420 where light ray 136 is third incident on retarder layer 420. In some embodiments, each location on the reflective polarizer 220 has orthogonal pass and block state which exhibits some variation from location to location due to forming the reflective polarizer into the desired shape. For example, in some embodiments, the retardance and/or the fast optical axis orientation for at least one of the retarder layers 420 and 520 is spatially varied so that the polarization state 143 is substantially along the block state at first location 223 and the polarization state 145 is substantially along the pass state at second location 224.

The polarization states 141 and 143 are schematically depicted in FIG. 1A as having an electric field polarized in the x-direction, referring to the x-y-z coordinate system depicted in FIG. 1A. However, either or both of these polarization states may be some state other than linearly polarized along the x-direction. For example, if polarization state 141 is linearly polarized, the polarization state 143 may be elliptically polarized depending on the retardances and fast optical axis orientations of the retarder layers 420 and 520. In some embodiments, the fast optical axes of retarder layers 420 and 520 are approximately orthogonal and the retardances of the retarder layers 420 and 520 are approximately quarter wave so that polarization states 141 and 143 are approximately the same. For example, in some embodiments, the fast optical axis of retarder layer 520 at origin 522 is substantially orthogonal to the fast optical axis of the retarder layer 420 at origin 422. In other embodiments, the fast optical axes of retarder layers 420 and 520 are approximately parallel and the retardances of the retarder layers 420 and 520 are approximately quarter wave so that polarization states 141 and 143 are approximately orthogonal. For example, in some embodiments, the fast optical axis of retarder layer 520 at origin 522 is substantially parallel to the fast optical axis of the retarder layer 420 at origin 422. However, as described further elsewhere herein, the retardances and/or fast optical axis orientation for one or both of the retarder layers 420 and 520 may be varied to improve the performance of the optical system 1000 and, accordingly, the fast axis orientations may not be precisely parallel or perpendicular over the area of the retarder and the retardances may not be precisely quarter wave over the area of the retarder. In some embodiments, the retarder layer 520 has a first wavelength dispersion curve and the retarder layer 420 has a different wavelength dispersion curve, as described further elsewhere herein.

Optical system 1000 has an optical axis 121. The optical axis of an optical system or a display system or an optical lens or optical element in an optical system can be understood as an axis near the center of the system or a lens or optical element where a light ray propagating along the optical axis passes through the lens(es) and/or optical element(s) with a minimum degree of refraction so that light propagating along axes close to but different from the optical axis experience greater degrees of refraction. In some embodiments, each of the one or more lenses is centered on an optical axis through an apex of each of the one or more lenses. The light ray along the optical axis may pass through the lens(es) and/or optical element(s) without being refracted or without being substantially refracted. Without being substantially refracted means that the angle between a light ray incident on a surface and a light ray transmitted through the surface is no more than 15 degrees. In some embodiments, an angle between the incident ray and the transmitted ray is less than 10 degrees, or less than 5 degrees, or less than 3 degrees, or less than 2 degrees. In some embodiments, the optical axis of an optical system is an axis such that a light ray propagating along the axis passes through the one or more optical lenses, the partial reflector, the reflective polarizer and the retarder layer(s) without being substantially refracted. In some embodiments, a light ray propagating along the axis passes through the one or more optical lenses, the partial reflector, the reflective polarizer and the retarder layer(s) without being refracted by more than 10 degrees, or more than 5 degrees, or more than 3 degrees, or more than 2 degrees at any major surface of the optical system.

A reflective polarizer may be said to substantially transmit light having a first polarization state at a predetermined wavelength or in a predetermined wavelength range if at least 60 percent of light having the first polarization state at the predetermined wavelength or in the predetermined wavelength range is transmitted through the polarizer. In some embodiments, at least 70 percent, or at least 80 percent, of light having the first polarization state at the predetermined wavelength or in the predetermined wavelength range is transmitted through the polarizer. A reflective polarizer may be said to substantially reflect light having a second polarization state at a predetermined wavelength or a predetermined wavelength range if at least 60 percent of light having the second polarization state at the predetermined wavelength or in the predetermined wavelength range is reflected from the reflective polarizer. In some embodiments, at least 70 percent, or at least 80 percent, of light having the second polarization state and the predetermined wavelength is reflected from the polarizer. The predetermined wavelength may be a wavelength at which the contrast ratio of the optical system is a maximum, as described further elsewhere herein. The predetermined wavelength range may be the wavelength range over which the optical system or display system is designed to operate. For example, the predetermined wavelength range may be the visible range (400 nm to 700 nm). As another example, the predetermined wavelength range may include one or more visible wavelength ranges. For example, the predetermined wavelength range may be the union of more than one narrow wavelength ranges (e.g., the union of disjoint red, green and blue wavelength ranges corresponding to light emission colors of a display panel). Such wavelength ranges are described further in U.S. Pat. Appl. Pub. No. 2017/0068100 (Ouderkirk et al.), previously incorporated herein by reference. In some embodiments, the predetermined wavelength ranges include other wavelength ranges (e.g., infrared (e.g., near infrared (about 700 nm to about 2500 nm)), or ultraviolet (e.g., near ultraviolet (about 300 nm to about 400 nm)) as well as visible wavelength ranges.

A retarder or a region in a retarder may be described as having a substantially uniform orientation or a substantially uniform retardance if the variation in the orientation or retardance in the retarder or region of the retarder is substantially less than the variation in the orientation or retardance of another retarder in the optical system or another region of the retarder. Similarly, a retarder or a region in a retarder may be described as having a substantially non-uniform orientation or substantially non-uniform retardance if the variation in the orientation or retardance in the retarder region of the retarder is substantially more than the variation in the orientation or retardance of another retarder in the optical system or another region of the retarder. For example, a retarder having a first region with a substantially uniform retardance and second region with a non-uniform or substantially non-uniform retardance can be understood to mean that a maximum difference in retardances in the first region is no more than 20% of a maximum difference in retardances in the second region. In some embodiments, the maximum difference in retardances in the first region is no more than 10%, or no more than 5% of the maximum difference in retardances in the second region. As another example, a retarder having a first region with a substantially uniform orientation and second region with a non-uniform or substantially non-uniform orientation can be understood to mean that a maximum angular difference in fast optical axis orientation in the first region is no more than 20% of a maximum angular difference in fast optical axis orientation in the second region. In some embodiments, the maximum angular difference in fast optical axis orientation in the first region is no more than 10%, or no more than 5% of the maximum angular difference in fast optical axis orientation in the second region.

FIG. 1A also schematically illustrates light ray 138. Light ray 138 propagates along optical axis 121 and passes through the retarder layer 520 at an origin 522, passes through retarder layer 420 at an origin 422 and passes through reflective polarizer 220 at origin 221. FIG. 1B is a schematic cross-sectional view of a portion of optical system 1000 where light ray 136 is first incident on origin 522 of retarder layer 520. Light ray 136 makes an angle θ with the optical axis 121 at the origin 522. Optical system 1000 also has a light ray (not illustrated) that is first incident on retarder layer 420 at the origin 422 of the retarder layer 420 and which makes an angle θ with the optical axis 121 at the origin 422.

In some embodiments, the reflective polarizer 220 substantially reflects light having a first polarization state (e.g., polarization state 143) and substantially transmits light having an orthogonal second polarization state (e.g., polarization state 145) at a predetermined wavelength. The predetermined wavelength may be a wavelength at which the contrast ratio of the optical system 1000 is a maximum as described further elsewhere herein. In some embodiments, for a light ray having the first polarization state at the predetermined wavelength and passing through the origin 522, the retarder layer 520 converts the light ray to an elliptically polarized light for the light ray propagating along the optical axis 121 (such as light ray 138), and to a circularly polarized light for the light ray propagating along a direction oblique to the optical axis (such as light ray 136). In some embodiments, the retarder layer 520 is selected such that the light ray propagating along a direction oblique to the optical axis is circularly polarized when incident on retarder layer 420. In this case, the light ray may be elliptically polarized immediately after the passing through the retarder layer 520 in order to correct for birefringence in the lens 310 and/or 510 and/or in order to correct for polarization effects of the partial reflector 320 so that the light ray is circularly polarized when first incident on retarder layer 420. It has been found that in some cases improved optical properties can be obtained when the retardance/fast axis orientation is selected to give circularly polarized light off-axis even at the expense of resulting in elliptically polarized light on-axis. In other embodiments, the retarder layer 520 converts the light ray to a circularly polarized light for the light ray propagating along the optical axis 121, and to an elliptically polarized light for the light ray propagating along a direction oblique to the optical axis. The polarization state of light transmitted through the retarder layer 520 can be selected by a suitable selection of the retardance and the fast optical axis orientation of the retarder layer 520, as described further elsewhere herein. For example, if light ray 138 is linearly polarized along the x-axis when first incident on retarder layer 520 at origin 522, and if retarder layer 520 has a fast optical axis in the x-y plane at an angle of 45 degrees relative to the x-axis at the origin 522 and a retardance of one fourth of the wavelength of light ray 138 at the origin 522, then retarder layer 520 converts the light ray 138 from the linear polarized state to a circularly polarized state.

In some embodiments, at least one of the retarder layers 420 and 520 is a unitary retarder having at at least one first location, a first orientation relative to the first polarization state and a first retardance at the predetermined wavelength, and at at least one different second location, a different second orientation relative to the first polarization state and a different second retardance at the predetermined wavelength. Such patterned retarder layers are described further elsewhere herein. The first and second orientations relative to the first polarization state can be described in terms of an angle between the fast optical axis of the unitary retarder and an axis of the first polarization state. For example, the unitary retarder may have a fast optical axis that is oriented with an angle between 35 and 55 degrees from a block axis of the reflective polarizer 220.

In some embodiments, relative to the first polarization state, the retarder layer 520 has a substantially uniform orientation and non-uniform retardance across the retarder layer 520, and the retarder layer 420 has a substantially uniform retardance and non-uniform orientation across the retarder layer 420. In some embodiments, relative to the first polarization state, the retarder layer 520 has a substantially uniform orientation and uniform retardance across the retarder layer 520, and the retarder layer 420 has a substantially non-uniform retardance and non-uniform orientation across the retarder layer 420. In other embodiments, relative to the first polarization state, the retarder layer 420 has a substantially uniform orientation and non-uniform retardance across the retarder layer 420, and the retarder layer 520 has a substantially uniform retardance and non-uniform orientation across the retarder layer 520. In some embodiments, relative to the first polarization state, the retarder layer 420 has a substantially uniform orientation and uniform retardance across the retarder layer 420, and the retarder layer 520 has a substantially non-uniform retardance and non-uniform orientation across the retarder layer 520.

In some embodiments, at the origin 221, the reflective polarizer substantially reflects light having a block polarization state and substantially transmits light having an orthogonal pass polarization state at the predetermined wavelength, such that for a first light ray propagating along the optical axis and incident on the retarder layer 520 at the origin 522 and having the predetermined wavelength and the block polarization state, the first light ray comprises a first polarization state when first incident on the reflective polarizer 220 and a second polarization state when second incident on the reflective polarizer 220, a difference between the first and block polarization states being less than a difference between the second and pass polarization states. Quantification of differences between polarization states is described elsewhere herein. It has been found that minimizing the difference between the first and block polarization states is preferred in some cases, even at the expense of increasing the difference between the second and pass polarization states, since this has been found to reduce ghosting and increase contrast ratio.

In some embodiments, for a light ray 136 having the predetermined wavelength and the block polarization state of the reflective polarizer 220 at the origin 221 and first incident on the retarder layer 520 at the first origin 522 and making an angle θ with the optical axis 121, the light ray 136 is substantially reflected when first incident on the reflective polarizer at the first location 223 and substantially transmitted when second incident on the reflective polarizer at the second location 224. For the set of light rays incident on retarder layer 520 at origin 522 at some angle θ, the first and second locations 223 and 224 can be described as being functions of θ. Light ray 136 has a non-zero θ and light ray 138 has a θ of zero. The first and second locations for light ray 138 are both the origin 221 of the reflective polarizer 220. In some embodiments, for non-zero θ, the first and second locations are at different distances from the optical axis 121. In some embodiments, a difference between the polarization state of the light ray 136 and the pass polarization state of the reflective polarizer 220 at the second location 224 is greater when θ is zero and less when θ is not zero. It has been found that in some cases improved optical properties are obtained, when the difference between the polarization state of the light ray 136 and the pass polarization state of the reflective polarizer 220 at the second location 224 is lower off-axis (non-zero θ) even at the expense of this difference being higher on-axis (zero θ).

Figure 1D:
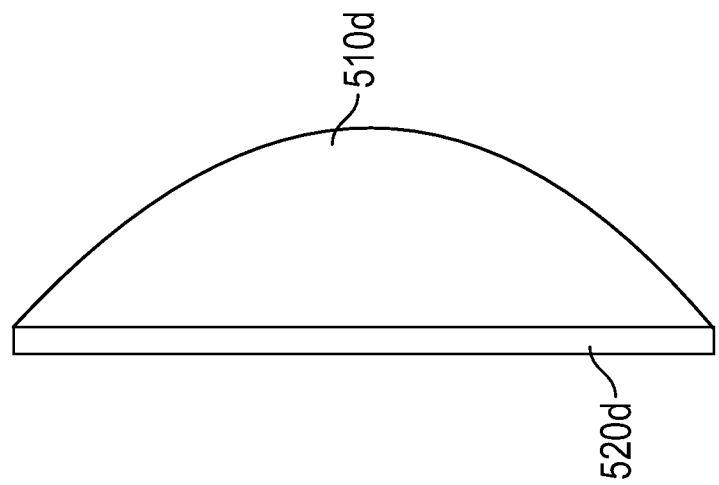
FIGS. 1C-1D are schematic cross-sectional views of layers disposed on planar surfaces.
Figure 1C:
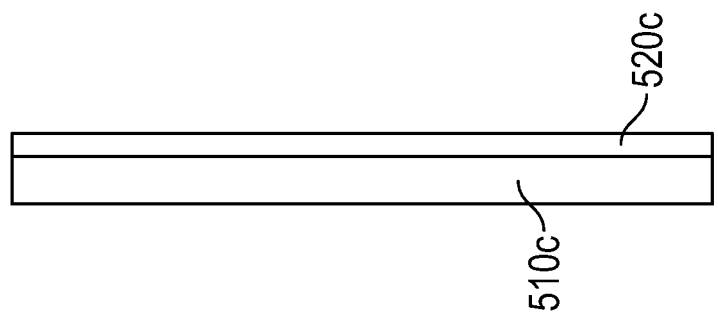
Figure 1B:
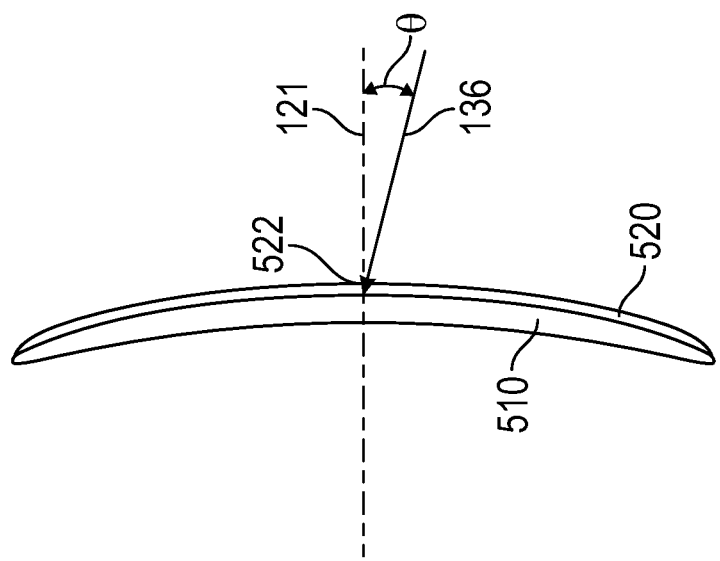
FIG. 1B is a schematic cross-sectional view of a retarder layer disposed on an optical lens.

FIGS. 1C and 1D are schematic cross-sectional views of alternatives to having a layer on a curved surface of a lens. In the embodiment illustrated in FIG. 1C, a layer 520c is disposed on a planar major surface of substrate 510c. The layer 520c may correspond to retarder layer 520, for example, and the substrate 510c may correspond to lens 510, for example. In the embodiment illustrated in FIG. 1D, a layer 520d is disposed on a planar surface of a plano-convex lens 510d. The layer 520c may correspond to retarder layer 520, for example, and the substrate 510c may correspond to lens 510, for example. In other embodiments, layer 520d is disposed on a planar or substantially planar surface of a plano-concave lens. Similarly, in some embodiments, any one or more of the partial reflector 320, the retarder layer 420 and the reflective polarizer 220 may be disposed on a planar or substantially planar major surface. Any type of suitable lens(es) may be used. In some embodiments, one or more of the lenses of the optical system is one of a plano-convex lens, a plano-concave lens, a biconvex lens, a biconcave lens, a positive meniscus lens, a negative meniscus lens, a variable refractive index lens (e.g., a gradient-index lens), and a Fresnel lens.

In some embodiments, one or both of the retarder layers 420 and 520 is disposed on a curved major surface. In some embodiments, the curved major surface is curved about one axis or curved about two orthogonal axes. In some embodiments, one or both of the retarder layers 420 and 520 is substantially planar. A substantially planar layer can be understood to be mean that the layer is nominally planar but may have some curvature due to ordinary manufacturing variations, for example, or may have a radius of curvature at least 10 times a distance from an image surface (e.g., at the display panel) to a stop surface of an optical system. In some embodiments, the retarder layer 520 is disposed on a display panel, or on a planar substrate not having optical power.

In some embodiments, the retarder layer 520 has a different physical thickness than the retarder layer 420. For example, in some embodiments, retarder layer 520 has a greater physical thickness (as schematically illustrated in FIG. 1D) than retarder layer 420. In other embodiments, retarder layer 520 has a smaller physical thickness than retarder layer 420. Utilizing different physical thicknesses may be desired when different materials are used for the different retarder layers in order for each of the retarder layers to have an approximately quarter-wave retardance. It may be desired to use different materials in order to provide different chromatic dispersion curves, for example, as described further elsewhere herein. In some embodiments, it may be desired to use different materials for different retarder layers (e.g., different liquid crystal compositions, or a liquid crystal material for one retarder and an oriented polymer (e.g., polycarbonate) for another retarder) because of the different geometry of the retarder layers. For example, some achromatic retarders may not be readily conformable to a curved surface. In this case, the achromatic retarder may be used on a flat surface or a surface with a lower curvature and a different retarder (e.g., a different achromatic retarder or a chromatic retarder) can be used on a surface with a higher curvature. Either of the retarder layers 420 and 520 may be spin-coated onto the respective major surface of a lens or substrate. The thickness of the spin-coated retarders may vary and the two retarder layers may have different average physical thicknesses. In some embodiments, a first retarder layer (e.g., corresponding to one of retarder layers 420 and 520) includes a first spin-coated retarder layer having a smaller average first physical thickness and a second retarder layer (e.g., corresponding to the other of retarder layers 420 and 520) includes a second spin-coated retarder layer having a greater average second physical thickness.

Figure 1E:
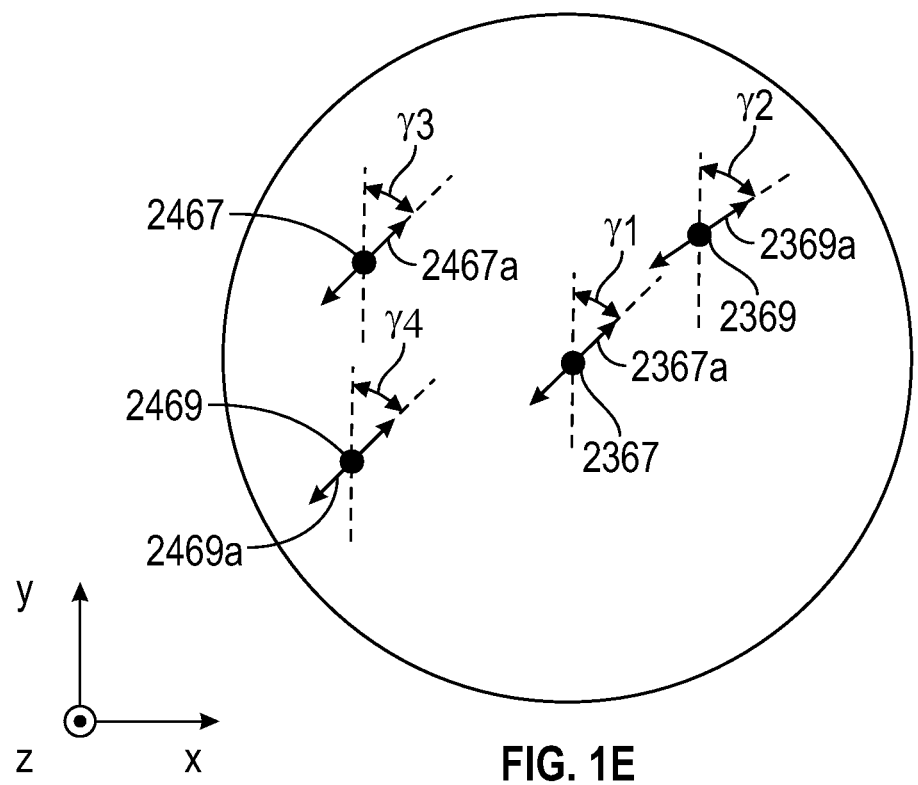
FIGS. 1E-1F are schematic front plan views of overlapping retarder layers.
Figure 1F:
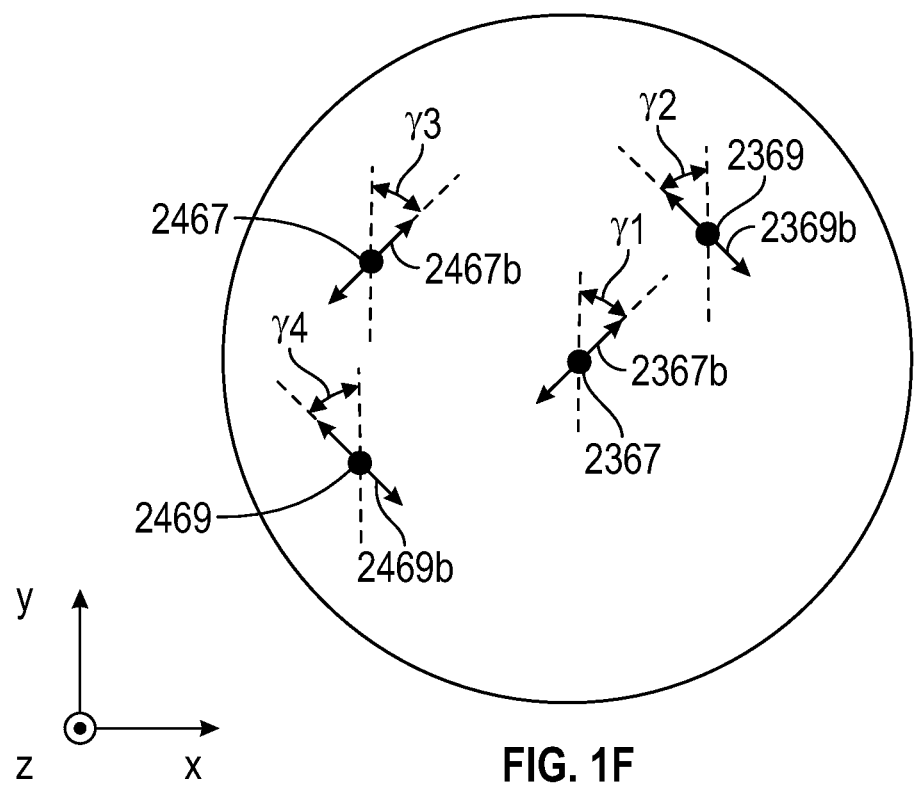

FIGS. 1E-1F are schematic plan views of the retarder layers 420 and 520 of the optical system 1000 where the retarder layers are overlapping each other. A first light ray incident on the optical system 1000 intersects retarder layer 520 at first location 2367 (which may correspond to origin 522, for example) and intersects retarder layer 420 at second location 2369 (which may correspond to one of locations 423 and 425, for example). A second light ray incident on the optical system 1000 intersects retarder layer 520 at third location 2467 and intersects retarder layer 420 at fourth location 2469. In the embodiment of FIG. 1E, the fast axes of the retarder layers 420 and 520 are approximately parallel (e.g., within 20 degrees or within 10 degrees of parallel) and in the embodiment of FIG. 1F, the fast axes of the retarder layers 420 and 520 are approximately orthogonal (e.g., within 20 degrees or within 10 degrees of perpendicular).

In the embodiment, illustrated in FIG. 1E, in plan view, the retarder 520 has a fast axis 2367a at first location 2367 at an angle γ1 from the y-axis and the retarder 420 has a fast axis 2369a at second at second location 2369 at an angle γ2 from the y-axis. In plan view, the fast axis 2367a of the retarder layer 520 at the first location 2367 and the fast axis 2369a of the retarder layer 420 at the second location 2369 make a first angle |γ2−γ1| with each other. In the embodiment, illustrated in FIG. 1E, in plan view, the retarder 520 has a fast axis 2467a at third location 2467 at an angle γ3 from the y-axis and the retarder 420 has a fast axis 2469a at second at fourth location 2469 at an angle γ4 from the y-axis. In plan view, the fast axis 2467a of the retarder layer 520 at the third location 2467 and the fast axis 2469a of the retarder layer 420 at the fourth location 2469 make a first angle |γ3−γ4| with each other. In some embodiments, the first and second angles are substantially equal. In some embodiments, the first and second angles are different. In some embodiments, the first and second angles are within 5 degrees of each other. In some embodiments, each of the first and second angles are no more than 10 degrees, or no more than 5 degrees.

In the embodiment, illustrated in FIG. 1F, in plan view, the retarder 520 has a fast axis 2367b at first location 2367 at an angle γ1 from the y-axis and the retarder 420 has a fast axis 2369b at second at second location 2369 at an angle γ2 from the y-axis. In plan view, the fast axis 2367b of the retarder layer 520 at the first location 2367 and the fast axis 2369b of the retarder layer 420 at the second location 2369 make a first angle |γ1+γ2| with each other. In the embodiment, illustrated in FIG. 1F, in plan view, the retarder 520 has a fast axis 2467b at third location 2467 at an angle γ3 from the y-axis and the retarder 420 has a fast axis 2469b at second at fourth location 2469 at an angle γ4 from the y-axis. In plan view, the fast axis 2467b of the retarder layer 520 at the third location 2467 and the fast axis 2469b of the retarder layer 420 at the fourth location 2469 make a first angle |γ3+γ4| with each other. In some embodiments, each of the first and second angles are in a range of 80 to 100 degrees, or in a range of 85 to 95 degrees.

The optical lenses can be made from any suitable lens materials such as polycarbonate or glass, for example. In some embodiments, an optical lens is formed in an insert molding process. For example, a reflective polarizer may be formed into a desired shape and then an optical lens may be insert molded onto the reflective polarizer.

Figure 2:
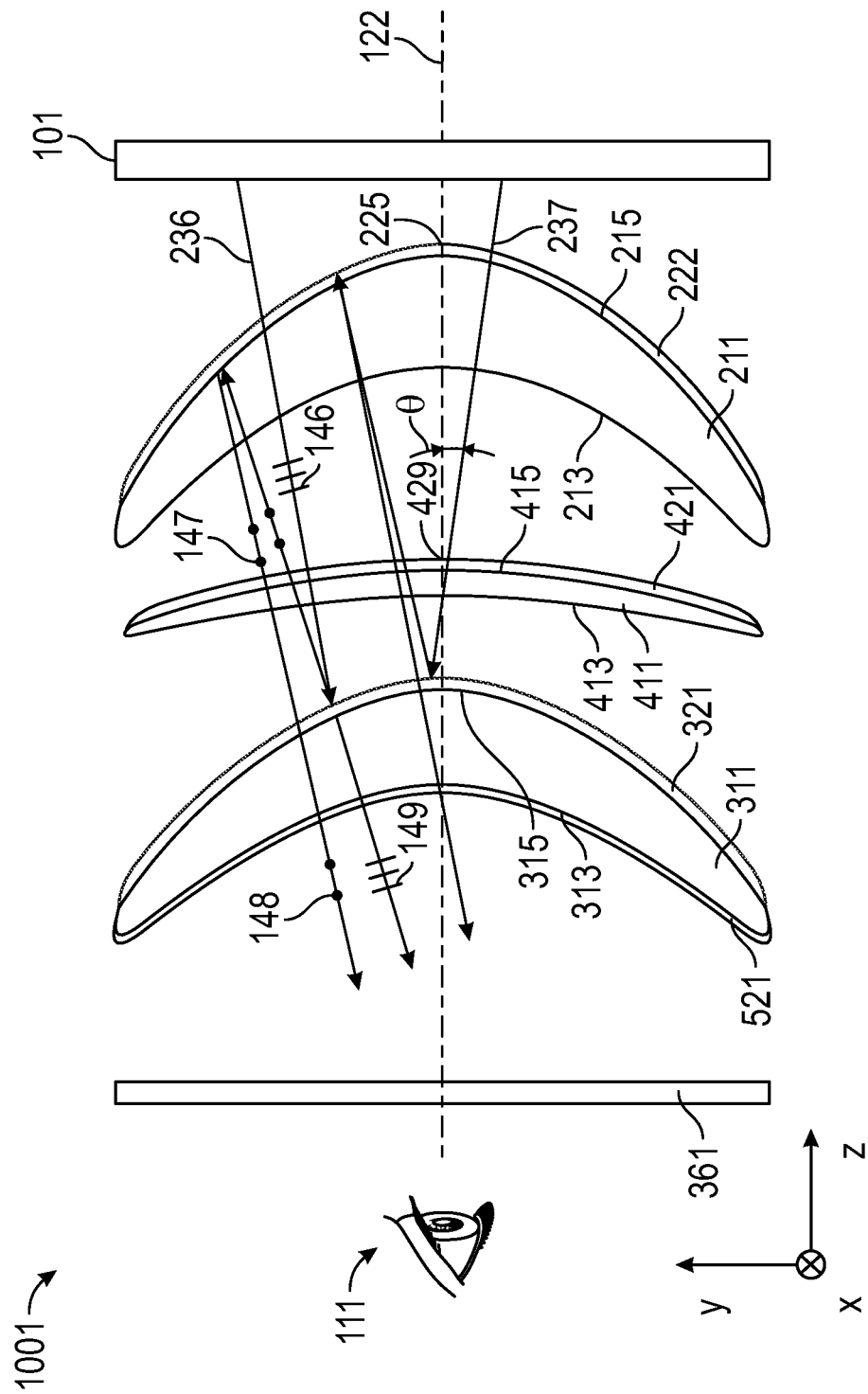
FIG. 2 is a schematic cross-sectional view of an optical system.

In some embodiments, the relative positions of the reflective polarizer and the partial reflector relative to the viewer and the object may be reversed from the embodiment illustrated in FIG. 1A. FIG. 2 is a schematic illustration of an optical system 1001 for transmitting light and/or for displaying an object 101 to a viewer 111. Optical system 1001 may correspond to optical system 1000 except for the relative positions of the various components and the additional of an optional additional polarizer 361. The object 101 may be a display or an image on a display, for example. The optical system 1001 includes optical lenses 211, 411 and 311, a reflective polarizer 222, a partial reflector 321 and retarder layers 421 and 521. Optical lens 211 has opposing first and second major surfaces 213 and 215, optical lens 311 has opposing first and second major surfaces 313 and 315, and optical lens 411 has opposing first and second major surfaces 413 and 415. The reflective polarizer 222 is disposed on and conforms to the major surface 215 of optical lens 211. The partial reflector 321 is disposed on and conforms to the major surface 315 of optical lens 311. Retarder layer 421 is disposed on and conforms to the major surface 415 of optical lens 411. Retarder layer 521 is disposed on and conforms to the major surface 313 of optical lens 311. In other embodiments, one or more of the reflective polarizer 222, the partial reflector 321, and the retarder layers 421 and 521 are disposed on a different major surface than shown in the embodiment illustrated FIG. 2. For example, any one or more of the reflective polarizer 222, the partial reflector 321, and the retarder layers 421 and 521 can be disposed on the opposite major surface of the respective lens or on another of these layers while keeping the relative order of these layers from the viewer 111 to the object 101.

Optical system 1001 further includes an optional additional polarizer 361. In the illustrated embodiment, light rays 236 emitted by object 101 have the polarization state 146 after passing through the reflective polarizer 222. A portion of the light rays 236 is reflected from partial reflector 321, passes through retarder layer 421 and is reflected from the reflective polarizer 222 in polarization state 147. A portion of these light rays pass through partial reflector 321 and retarder layer 521 and are incident on polarizer 361 in polarization state 148 and are transmitted to viewer 111. Another portion of the light rays 236 is transmitted through partial reflector 321 and then through retarder layer 521 and has polarization state 149 when incident on polarizer 361. This portion of the light rays 236 is blocked by polarizer 361 and is not transmitted to viewer 111. In the illustrated embodiment, retarder layers 421 and 521 have fast axes approximately orthogonal to one another. In other embodiments, retarder layers 421 and 521 have fast axes approximately parallel to one another and polarization state 148 is approximately orthogonal to polarization state 147. In some embodiments, at least one of the retarder layers 421 and 521 has a non-uniform retardance and/or non-uniform fast axis orientation. In some embodiments, retarder layer 521 has a first wavelength dispersion curve and retarder layer 421 has a different second wavelength dispersion curve.

Optical system 1001 has an optical axis 122 such that a light ray propagating along the optical axis 122 passes through the one or more optical lenses 211, 411 and 311, the partial reflector 321, the reflective polarizer 222 and the retarder layers 421 and 521 without being substantially refracted. Light ray 237 is first incident of retarder layer 421 at origin 429 and at a non-zero angle θ with the optical axis 122.

In some embodiments, the reflective polarizer 222 substantially reflects light having a first polarization state (e.g., polarization state 147) and substantially transmits light having an orthogonal second polarization state (e.g., polarization state 146) at a predetermined wavelength. The predetermined wavelength may be a wavelength at which the contrast ratio of the optical system 1001 is a maximum as described further elsewhere herein. In some embodiments, for a light ray having the first polarization state at the predetermined wavelength and passing through the first origin 429, the retarder layer 421 converts the light ray to an elliptically polarized light for the light ray propagating along the optical axis 122, and to a circularly polarized light for the light ray propagating along a direction oblique to the optical axis.

In some embodiments, the retarder layer 521 has a substantially uniform orientation and non-uniform retardance across the retarder layer 521, and the retarder layer 421 has a substantially uniform retardance and non-uniform orientation across the retarder layer 421. In some cases, the orientation of the retarder layer 421 or 521 may be specified relative to the first polarization state (e.g., an angle between the fast optical axis and an axis (e.g., block axis) of the first polarization state. The first polarization state may be the block state of the reflective polarizer 220 at the origin 221 and similarly, the second polarization state may be the pass state of the reflective polarizer 220 at the origin 225.

In some embodiments, relative to the first polarization state, the retarder layer 421 has a substantially uniform orientation and non-uniform retardance across the retarder layer 421, and the retarder layer 521 has a substantially uniform retardance and non-uniform orientation across the retarder layer 521. In some embodiments, relative to the first polarization state, the retarder layer 521 has a substantially uniform orientation and uniform retardance across the retarder layer 521, and the retarder layer 421 has a substantially non-uniform retardance and non-uniform orientation across the retarder layer 421. In some embodiments, relative to the first polarization state, the retarder layer 421 has a substantially uniform orientation and uniform retardance across the retarder layer 421, and the retarder layer 521 has a substantially non-uniform retardance and non-uniform orientation across the retarder layer 521.

Figure 3:
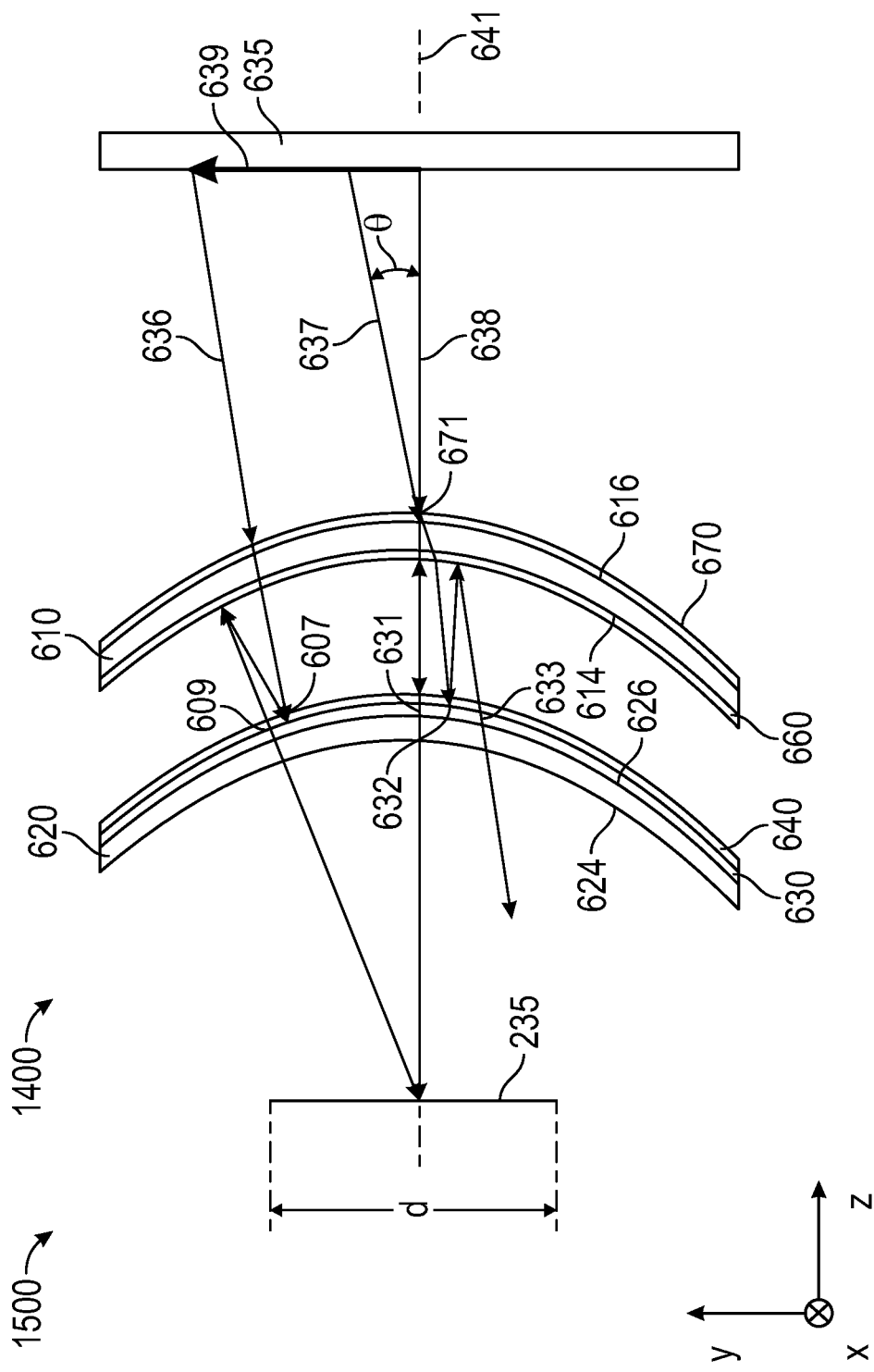
FIGS. 3-4 are schematic cross-sectional views of display systems.

An alternate embodiment is illustrated in FIG. 3 which is a schematic cross-sectional view of display system 1500 which includes optical system 1400 and display 635 emitting image 639. The optical system 1400 includes optical lens 610, which has opposing major surfaces 614 and 616, and optical lens 620, which has opposing major surfaces 624 and 626. A partial reflector 660 is disposed on major surface 614 of optical lens 610 and a retarder layer 670 is disposed on major surface 616 of optical lens 610. Reflective polarizer 630 is disposed on major surface 626 of optical lens 620 and retarder layer 640 is disposed on the reflective polarizer 630. Light rays 636, 637 and 638 are illustrated. Light ray 636 is a chief light ray emitted from an edge of image 639. Light ray 636 is first incident on reflective polarizer 630 at a first location 607 and is second incident on reflective polarizer 630 at a second location 609. Light ray 638 propagates along optical axis 641 which intersects the retarder layer 670 at a first origin 671 and the reflective polarizer 630 at a second origin 631. Light ray 637 is first incident on retarder layer 670 at an origin 671 and makes an angle θ with the optical axis 641. Light ray 637 is first incident on reflective polarizer 630 at first location 632 and second incident on reflective polarizer 630 at second location 633.

Optical system 1400 has an exit pupil 235 having a diameter d. In some embodiments, the diameter of the exit pupil is in a range of about 4.5 mm to about 6 mm. The f-number of an optical system is the ratio of the focal length of the one or more optical lenses collectively to the diameter d of the exit pupil. In some embodiments, the f-number is from about 0.2 to about 2.5. The diameter of the exit pupil refers to the largest lateral dimension of the exit pupil (e.g., a diagonal length in the case of a rectangular exit pupil). In some embodiments, the optical system is configured for use in a head mounted display such that when the head mounted display is worn by a viewer, the exit pupil 235 overlaps the pupil of an eye of the viewer.

As used herein, terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified quantity. As used herein, terms such as "substantially" will be understood in the context in which they are used and described in the present description by one of ordinary skill in the art. If the use of "substantially parallel" is not otherwise clear to one of ordinary skill in the art in the context in which it is used and described in the present description, "substantially parallel" will mean within 10 degrees of parallel. If the use of "substantially perpendicular" or "substantially orthogonal" is not otherwise clear to one of ordinary skill in the art in the context in which it is used and described in the present description, "substantially perpendicular" or "substantially orthogonal" will mean within 10 degrees of perpendicular.

In some embodiments, the reflective polarizer 630 substantially reflects light having a first polarization state and substantially transmits light having an orthogonal second polarization state at a predetermined wavelength. The predetermined wavelength may be a wavelength at which the contrast ratio of the optical system 1400 is a maximum as described further elsewhere herein. In some embodiments, for a light ray having the first polarization state at the predetermined wavelength and passing through the origin 671, the retarder layer 670 converts the light ray to an elliptically polarized light for the light ray propagating along the optical axis 641, and to a circularly polarized light for the light ray propagating along a direction oblique to the optical axis.

In some embodiments, for an emitted chief light ray having the first polarization state at the predetermined wavelength, the first retarder layer 670 converts the chief light ray to a circularly polarized light for the chief light ray emitted from an edge of the image 639, and to an elliptically polarized light for the chief light ray propagating along the optical axis 641.

In some embodiments, at least one of the retarder layers 640 and 670 have first and second regions as described further elsewhere herein. In some embodiments, the first region has a substantially uniform retardance and the second region has a non-uniform retardance. In some embodiments, the first region has a substantially uniform fast optical axis orientation and the second region has a non-uniform orientation. In some embodiments, the first region is an interior region and the second region is a perimeter region substantially surrounding the interior regions.

In some embodiments, retarder layers 640 and 670 have different wavelength dispersion curves. In some embodiments, retarder layer 670 is a quarter-wave retarder at a first wavelength, but not at a different second wavelength, and retarder layer 640 is a quarter-wave retarder at the second wavelength, but not at the first wavelength.

Figure 4:
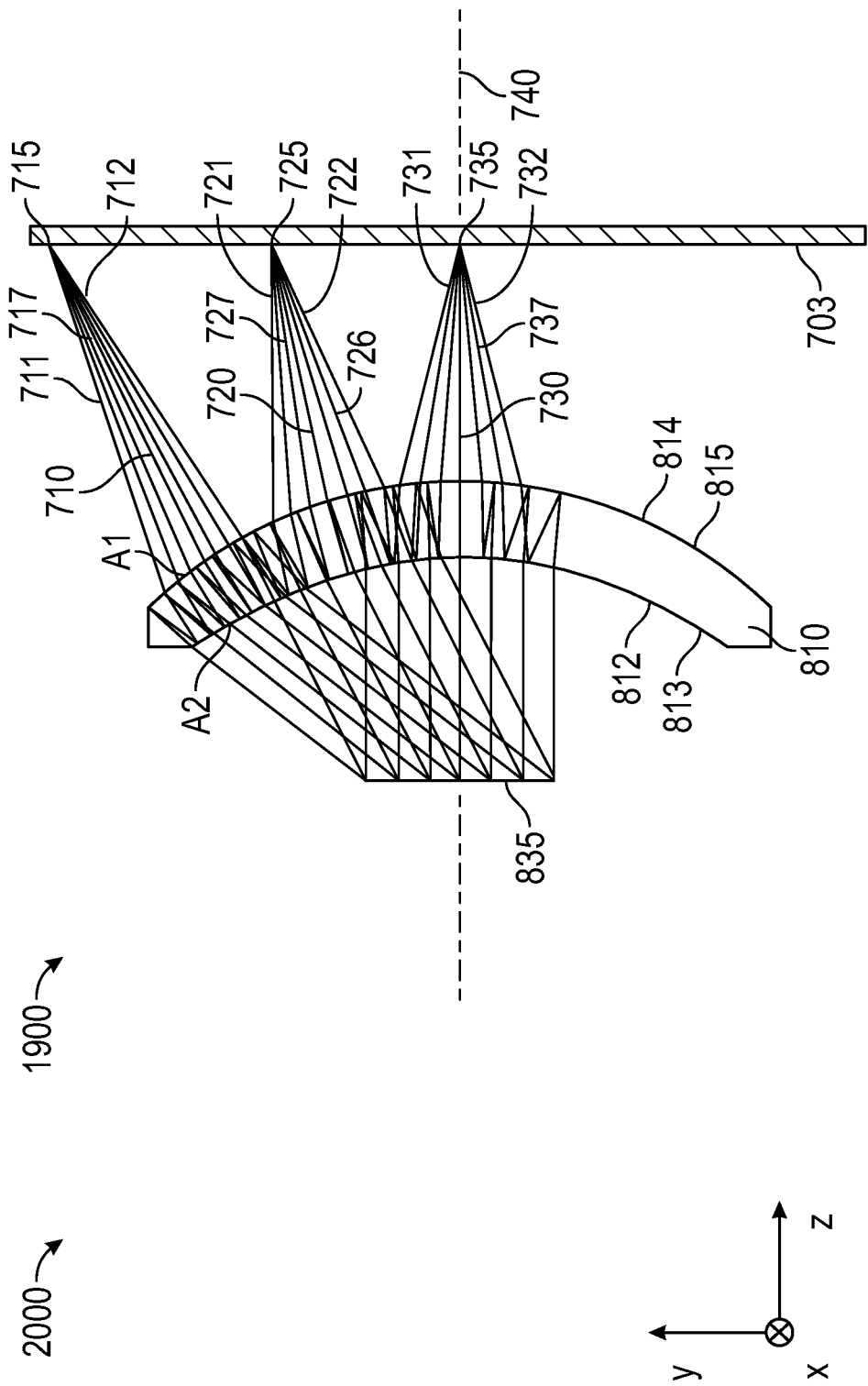

FIG. 4 is a schematic cross-sectional view of display system 2000 including optical system 1900 and display 703. The display 703 emits cone of light rays 717, 727 and 737 from the locations 715, 725 and 735, respectively. In some embodiments, each light ray in the cone of light rays 717, 727 and 737 has a common polarization state (e.g., for rays in the y-z plane, the first polarization state may be the polarization state with the electric field parallel to the x-direction (such as polarization state 141) or may be the polarization state with the electric field polarized in the y-z plane (such as polarization state 145)). This can occur when the display emits linearly polarized light, for example. Each of the cone of light rays 717, 727 and 737 substantially fill the exit pupil 835 of the optical system 1900. A cone of light rays which fills at least 90 percent of an area of an exit pupil may be described as substantially filling the exit pupil. Location 715 is at an edge of an image emitted by the display 703 and near an edge of the display 703. Location 735 is at the center of the display 703. The display 703 emits a plurality of chief rays 710, 720 and 730 from locations 715, 725 and 735, respectively. Marginal rays 711, 712, 721, 722, and 731 and 732 are illustrated. Chief rays intersect the exit pupil 835 at a center of the exit pupil 835, while marginal rays intersect the exit pupil 835 at a boundary of the exit pupil 835. Marginal rays 711 and 712 are emitted from the same location 715 as chief ray 710; marginal rays 721 and 722 are emitted from the same location 725 as chief ray 720; and marginal rays 731 and 732 are emitted from the same location 735 as chief ray 730. The chief ray 730 propagates along the optical axis 740 and the chief rays 710 and 720 are at different separations from the optical axis 740.

The optical system 1900 includes lens 810 having a first major surface 814 with a first optical stack 815 disposed thereon and a second major surface 812 with a second optical stack 813 disposed thereon. The first optical stack 815 includes a partial reflector disposed on the first major surface 814 and a first retarder layer disposed on the partial reflector. In alternate embodiments, the first retarder layer is disposed on the display 703 or on a substrate (e.g., another lens) between the lens 810 and display 703. The second optical stack 813 includes a second retarder layer disposed on the second major surface 812 and a reflective polarizer disposed on the second retarder layer. The cone 717 of light rays is first incident on the first retarder layer over a first incident area A1 and is first incident on the second retarder layer over a second incident area A2. Similarly, each of the cones 727 and 737 of light rays is first incident the first retarder layer over a first incident area and is first incident on the second retarder layer over a second incident area. In some embodiments, the diameter of the exit pupil 835 is in a range of about 4.5 mm to about 6 mm. In some embodiments, the f-number of the optical system 1900 is from about 0.2 to about 2.5. In some embodiments, each of the cone 717, 727 and 737 of light rays substantially fill the exit pupil 835. In some embodiments, an average retardance of each of the first and second retarder layers over the respective first and second incident areas is within 10% of one fourth of a predetermined wavelength. In other embodiments, the average retardance of the first and second retarder layer deviates by more than 10% from each other and from one fourth of the predetermined wavelength. For example, in a highly non-telecentric system (e.g., a system with a largest chief ray angle of more than 60 degrees to the optical axis) it may be desired for the average retardance to differ from one fourth of the predetermined wavelength by more than 10 percent.

Unless indicated differently, this average retardance refers to the unweighted average over the first and second incident areas, respectively, of the retardance experienced by the cone of light rays defining the incident areas and having the predetermined wavelength. The predetermined wavelength may be a wavelength at which the contrast ratio of the optical system 1900 is a maximum, as described further elsewhere herein. The predetermined wavelength may be within a predetermined wavelength range which may be a wavelength range over which the optical system 1900 is intended to operate (e.g., the visible range of 400 nm to 700 nm).

In some embodiments, the reflective polarizer substantially reflects light having a first polarization state and substantially transmits light having an orthogonal second polarization state at the predetermined wavelength. In some embodiments, for a light ray having the first polarization state at the predetermined wavelength and passing through an origin of the first retarder layer intersected by the optical axis 740, the first retarder layer converts the light ray to an elliptically polarized light for the light ray propagating along the optical axis 740, and to a circularly polarized light for the light ray propagating along a direction oblique to the optical axis.

In some embodiments, for a plurality of chief light rays (e.g., chief rays 710, 720 and 730) emitted by the display 703, each chief light ray having the first polarization state at the predetermined wavelength and a different separation from the optical axis 740, the first retarder layer converts the chief light ray to a circularly polarized light. In some embodiments, for each chief light ray emitted by the display 703 having the first polarization state at the predetermined wavelength, the first retarder layer converts the chief light ray to a circularly polarized light.

In some embodiments, for the plurality of chief light rays 720 and 730 emitted by the display 703, each chief light ray having the first polarization state at the predetermined wavelength and a different separation from the optical axis 740, the first retarder layer has a retardance within 10% of one fourth of the predetermined wavelength. In some embodiments, in order for the first retarder layer to have a retardance within 10% of one fourth of the predetermined wavelength for each chief light ray, the first retarder layer is spatially non-uniform in order to provide the desired retardance for chief rays which are emitted from different locations on the display and which have different incidence angles when incident of the first retarder layer.

In some embodiments, for an emitted chief light ray having the first polarization state at the predetermined wavelength, the first retarder layer converts the chief light ray to a circularly polarized light for the chief light ray emitted from an edge of the image (e.g., chief ray 710 emitted from location 715), and to an elliptically polarized light for the chief light ray propagating along the optical axis 740 (e.g., chief light ray 730). In some embodiments, at the predetermined wavelength and the first polarization state and for at least one location (e.g., location 725) on the display 703, the first retarder layer converts the emitted chief and marginal light rays (e.g., rays 720 and 721, respectively) to elliptically polarized light, and at least one other emitted light ray (e.g., light ray 726) to a circularly polarized light.

In some embodiments, optical axis 740 intersect the first retarder layer at a first origin and the reflective polarizer at a second origin. In some embodiments of the optical system 1900, for a light ray having the predetermined wavelength and the block polarization state of the reflective polarizer at the second origin and first incident on the first retarder layer at the first origin and making an angle θ with the optical axis 740, the light ray is substantially reflected when first incident on the reflective polarizer at a first location and substantially transmitted when second incident on the reflective polarizer at a second location, a difference between the polarization state of the light ray and the pass polarization state of the reflective polarizer at the second location being greater when θ is zero and less when θ is not zero.

In some embodiments, each location on the reflective polarizer has corresponding mutually orthogonal pass and block polarization states, such that at each location, the reflective polarizer substantially reflects light having the block polarization state and substantially transmits light having the pass polarization state at the predetermined wavelength.

In some embodiments, each of the first and second retarder layers have at least one of a variable retardance and a variable orientation, such that for a plurality of chief light rays (e.g., chief light rays 720 and 730) emitted by the display 703, each chief light ray having the predetermined wavelength and emitted at a different separation from the optical axis 740, the chief ray is substantially reflected when first incident on the reflective polarizer at a first location (e.g., first location 607 depicted in FIG. 3) thereon and substantially transmitted when second incident on the reflective polarizer at a second location (e.g., second location 609 depicted in FIG. 3) thereon, a difference between the polarization state of the chief ray at the second location and the pass polarization state of the reflective polarizer at the second location being less than about 0.07, or less than about 0.05, or less than about 0.03, or less than about 0.02, or even less than about 0.01. In comparison, this difference is typically about 0.09 when each of the first and second retarder layers a quarter-wave retarder with a uniform retardance and a uniform orientation. In some embodiments, an angle between a polarization axis (e.g., linear polarization axis or major axis of a polarization ellipse) of the polarization state of the chief ray at the second location and a polarization axis of the pass polarization state of the reflective polarizer at the second location is less than about 15 degrees, or less than about 10 degrees, or less than about 5 degrees. In some embodiments, a difference between the polarization state of the chief ray at the second location and the pass polarization state of the reflective polarizer at the second location is less than 0.8, or less than 0.6 times a difference between the polarization state of the chief ray at the second location and the pass polarization state of the reflective polarizer at the second location in a comparative optical system that is equivalent to the optical system except that the first and second retarder layers are replaced with first and second retarder layers having uniform retardance and orientation corresponding to the retardance and orientation of the first and second retarder layers of the optical system at locations where the optical axis intersects the first and second retarder layers.

As described further elsewhere herein, differences between two polarization states can be quantified on a scale of zero to unity where a difference of zero means that the two polarization states are the same and a difference of unity means that the two polarization states or orthogonal. In some embodiments, for at least one chief ray in the plurality of chief rays, the first and second locations on the reflective polarizer are different locations.

In some embodiments, at least one of the first and second retarder layers have first and second regions as described further elsewhere herein. In some embodiments, the first region has a substantially uniform retardance and the second region has a non-uniform retardance. In some embodiments, the first region has a substantially uniform fast optical axis orientation and the second region has a non-uniform orientation. In some embodiments, the first region is an interior region and the second region is a perimeter region substantially surrounding the interior regions.

In some embodiments, the first and second retarder layers have different wavelength dispersion curves. In some embodiments, the first retarder layer is a quarter-wave retarder at a first wavelength, but not at a different second wavelength, and the second retarder layer is a quarter-wave retarder at the second wavelength, but not at the first wavelength.

Embodiments with one, two or three or four optical lenses are specifically illustrated herein. It will be understood that additional optical lenses could be included and that many of the attributes described for one arrangement of the optical lens(es) applies to other arrangements of the optical lens(es). It will be understood that properties of spaced apart first and second retarder layers (e.g., retardance distribution, fast optical axis orientation distribution, wavelength dispersion curves) described for one optical system also applies to other optical systems corresponding to the optical system but having a different number of optical lenses or having the various layers disposed on a different major surface of the one or more optical lenses.

FIGS. 5A and 5B are schematic cross-sectional views of an optical lens 378 having a focal length f and having a major surface 379 with a radius of curvature R. Lens 378 has an optical power of 1/f. In some embodiments, the one or more optical lenses of an optical system has a non-zero optical power in at least one direction (e.g., focusing light onto a focal line). In some embodiments, the one or more optical lenses of an optical system has a non-zero optical power two directions (e.g., focusing light on a focal point). In some embodiments, lenses with non-zero optical power have at least one curved major surface. In some embodiments, non-zero optical power is achieved using Fresnel len(es) which may or may not have a curved surface or by using variable refractive index lens(es) which may or may not have a curved surface. In some embodiments, at least one major surface of the one or more optical lenses has a radius of curvature R of at least 6 mm, or at least 10 mm, and less than 1000 mm, or less than 600 mm. For example, in some embodiments, at least one major surface of the one or more optical lenses has a radius of curvature R from about 6 mm to about 1000 mm. In some embodiments, the focal length of the one or more lenses collectively (the inverse of the overall optical power of the one or more optical lenses) is in a range of 0.5 mm to 50 mm, or in a range of 1 mm to 25 mm. In some embodiments, the optical system has an f-number of at least about 0.1, or at least about 0.2, or at least about 0.3 and no more than about 3.0, or no more than about 2.5, or no more than about 2.2.

In some embodiments, the reflective polarizer, the partial reflector, the retarder layers and/or at least one major surface of an optical lens is curved about two orthogonal axes. For example, the reflective polarizer may be disposed on a spherical or aspherical surface of a lens. FIG. 6 is a cross-sectional view of curved surface or layer 827 which has apex 757 (which is the largest point on curved surface or layer 827 along the z-direction) and is curved about two orthogonal axes (e.g., the x-axis and the y-axis). Layer 827 may be a partial reflector, a retarder layer or a reflective polarizer. Alternatively, the curve for layer 827 can be understood to describe a curved surface of a lens, for example. The layer 827 has at least one first location 752 having a radial distance r1 from an optical axis 840 passing through the apex 757, and a displacement s1 from a plane 847 (parallel to the x-y plane) perpendicular to the optical axis 840 at the apex 757. In some embodiments, the layer 827 is a reflective polarizer and the ratio s1/r1 is at least 0.1, or at least 0.2, and may be less than 0.8 or less than 0.6. For example, in some embodiments, s1/r1 is in a range of 0.2 to 0.8 or in a range of 0.3 to 0.6. The layer 827 has at least one second location 754 having a radial distance r2 from the optical axis 1040 and a displacement s2 from the plane 847. In some embodiments, layer 827 is a reflective polarizer and s2/r2 is at least 0.3, and may be less than 0.8. The layer 827 has a diameter D, a maximum sag Sm and a radius of curvature R at the apex 757. In some embodiments, each of the reflective polarizer and at least one retarder layer is curved about two orthogonal axes. In some embodiments, each of the reflective polarizer, the retarder layer(s) and the partial reflector is curved about two orthogonal axes.

In some embodiments, layer 827 is rotationally symmetric or substantially rotationally symmetric about optical axis 840. A surface, film or component may be said to be substantially rotationally symmetric if the azimuthal variation in the shape of the surface, film or component is no greater than about 10 percent. Azimuthal variation refers to variation with the azimuthal angular coordinate about the optical axis 840 through the apex 757. In some embodiments, the azimuthal variation in s1/r1 is less than 10 percent, or less than 8 percent, or less than 6 percent, or less than 4 percent, or less than 2 percent, or less than 1 percent, or even less than 0.5 percent. The one or more locations 752 may be a ring of locations having a common radial distance r1 from the optical axis 840, and similarly the one or more locations 754 may be a ring of locations having a common radial distance r2 from the optical axis 840. A film may be said to be rotationally symmetric if the azimuthal variation in the shape of the film is sufficiently small that the film can be molded into a rotationally symmetric lens without wrinkling the film. The coordinates s1 and r1 define an area A1 of the layer 827 having a radial position from the optical axis 840 of no more than r1 or having a distance along the optical axis from the apex 757 of no more than s1.

Figure 7A:
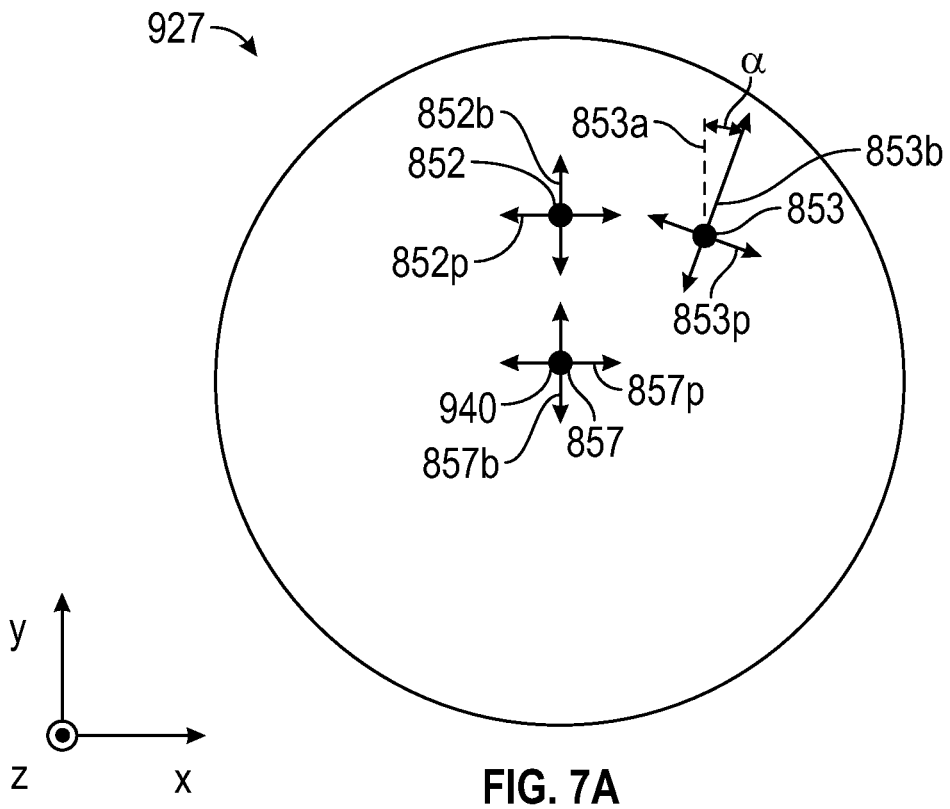
FIGS. 7A-7B are schematic front views of a reflective polarizer.
Figure 7B:
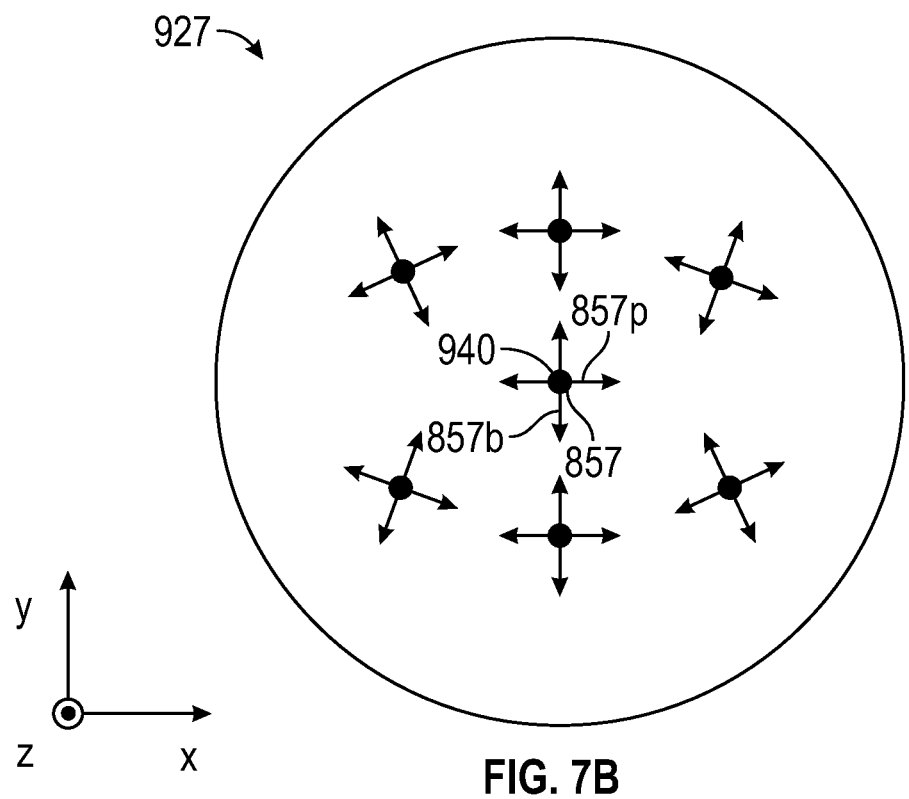
Figure 7C:
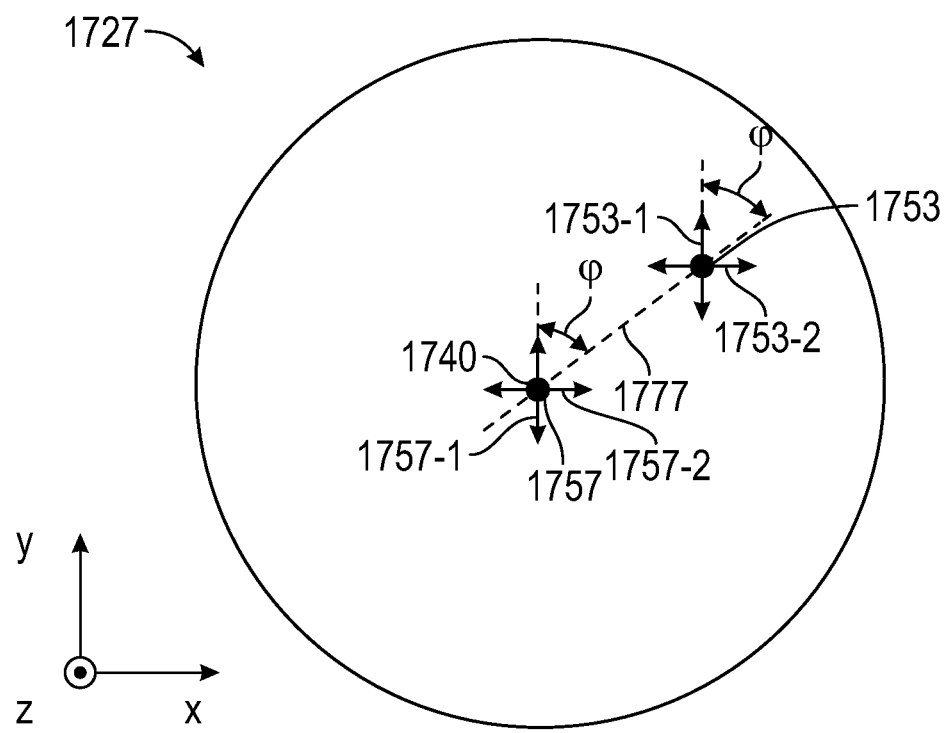
FIG. 7C is a schematic front view of a curved surface.

FIG. 7A is a schematic front view of reflective polarizer 927, which may correspond to layer 827, having an origin or apex 857 along an optical axis 940. The reflective polarizer 927 is curved about two orthogonal axes (e.g., the x- and y-axes). FIG. 7B is a schematic front view of the reflective polarizer 927 schematically illustrating a possible spatial variation in the orientation of the pass and block axes. The reflective polarizer 927 has orthogonal pass and block axes 85'7p and 857b at the apex 857. The reflective polarizer 927 has orthogonal pass and block axes 852p and 852b at a first location 852, and orthogonal pass and block axes 853p and 853b at a second location 853. In the illustrated embodiment, the pass and block axes 852p and 852b are substantially aligned with the pass and block axes 85'7p and 857b, while the pass and block axes 853p and 853b are rotated by an angle α relative to axes aligned with the pass and block axes 85'7p and 857b. Axes tangent to a curved surface at different locations on the curved surface may be said to be aligned with each other if a corresponding angle between the axes and a tangent to a shortest smooth curve on the curved surface between the two locations are the same. This is schematically illustrated in FIG. 7C which is a front plan view of a curved surface 1727 illustrating first and second axes 1757-1 and 1757-2 at a first location 1757 and first and second axes 1753-1 and 1753-2 at a second location 1753. The first and second axes 1757-1 and 1757-2 are tangent to the surface 1727 at the first location 1757 and the first and second axes 1753-1 and 1753-2 are tangent to the surface 1727 at the second location 1753. Since the surface 1727 is curved, the first and second axes 1753-1 and 1753-2 are generally in a different plane than the first and second axes 1757-1 and 1757-2. A shortest curve 1777 is shown between the first and second locations 1757 and 1753. The shortest curve 1777 is illustrated as being linear in plan view, but in other cases the curve 1777 may be nonlinear in pan view. An angle φ is shown between the first axis 1757-1 and the curve 1777 at the first location 1757. The corresponding angle between the first axis 1753-1 and the curve 1777 is also φ so that the first axis 1757-1 and the first axis 1753-1 are aligned. Similarly, an angle between the second axis 1757-2 and the curve 1777 at the first location 1757 is equal to the corresponding angle between the second axis 1753-2 and the curve 1777 at the second location 1753 (90 degrees minus φ) so the second axis 1757-2 and the second axis 1753-2 are aligned. The first location 1757 is at an origin 1740 of the curved surface which may be a centroid of the surface and/or an apex and/or a location intersected by an optical axis of an optical system including the curved surface 1727. Axes aligned with the first and second axes 1757-1 and 1757-2 can be defined at each point on the surface 1727 by orienting the axes such that they make the same corresponding angle with respect to a shortest curve between the point and the first location as the first and second axes 1757-1 and 1757-2. The local pass and block axes at each point on a reflective polarizer may be specified relative to axes tangent to the reflective polarizer that are aligned with axes defined at the optical axis (e.g., axes 857b and/or 857p). For example, axis 853a at location 853 is aligned with block axis 857b since axis 853a and 857b are both tangent to the reflective polarizer 927 and have a same angle with respect to a shortest curve between the locations 857 and 853.

The reflective polarizer 927 may be a polymeric multilayer reflective polarizer and may have at least one layer (e.g., layers 1092 of FIG. 8) that is substantially uniaxially oriented at the apex 857. For example, the orientation of the at least one layer may be in the block axis 857b for the reflective polarizer 927 at the apex 857. In some embodiments, reflective polarizer 927 also includes at least one layer that is substantially optically biaxial at at least one first location (e.g., at location 853) on the at least one layer away from the optical axis 940 and substantially optically uniaxial at at least one second location (e.g., location 852) away from the optical axis 940.

A polymeric multilayer optical film may be formed (e.g., thermoformed) to provide reflective polarizer 927. The optical film may initially have at least one layer uniaxially oriented with a block axis along the y-direction. During forming the optical film is stretched to conform to the shape of a tool. The optical film is stretched since the desired shape is curved about two orthogonal axes. In contrast to this, an optical film would not need to be stretched in order to conform to a shape curved about only one axis. The process of forming can leave the optical film substantially uniaxially oriented at location 852 (since the film is stretched along the orientation direction at this location during forming), but result in biaxial orientation at location 853 due to the stretching of the optical film as it is formed. In the embodiment illustrated in FIG. 7A, the block axis 853b is shifted by a degrees at the first location 853 relative to axis 853a which is aligned with block axis 867b. In some embodiments, a maximum variation of a pass axis (or of a block axis) of the reflective polarizer 927 is less than about 5 degrees, or less than about 3 degrees, or less than about 2 degrees, or less than about 1.5 degrees, or less than about 1 degree over the entire area of the reflective polarizer or over an area of the reflective polarizer defined by s1 and r1, or over a reflection aperture of the reflective polarizer, where s1 and s2 are as described for layer 827. The reflection aperture refers to the portion of the reflective polarizer that is utilized by the optical system in reflection. The reflection aperture may be substantially the entire area of the reflective polarizer or may exclude a portion of the reflective polarizer near a boundary of the reflective polarizer. The maximum variation of the pass axis may be determined as the maximum angular difference between the pass axis and a fixed direction (e.g., the x-direction in FIG. 7A) minus the minimum angular difference between the pass axis and a fixed direction.

Any of the reflective polarizers used in any of the optical systems described herein may be linear reflective polarizers which may be adapted to reflect light having a first linear polarization state and transmit light having a second linear polarization state orthogonal to the first linear polarization state. Suitable reflective polarizers include polymeric multilayer optical films and wire-grid polarizers, for example.

Figure 8:
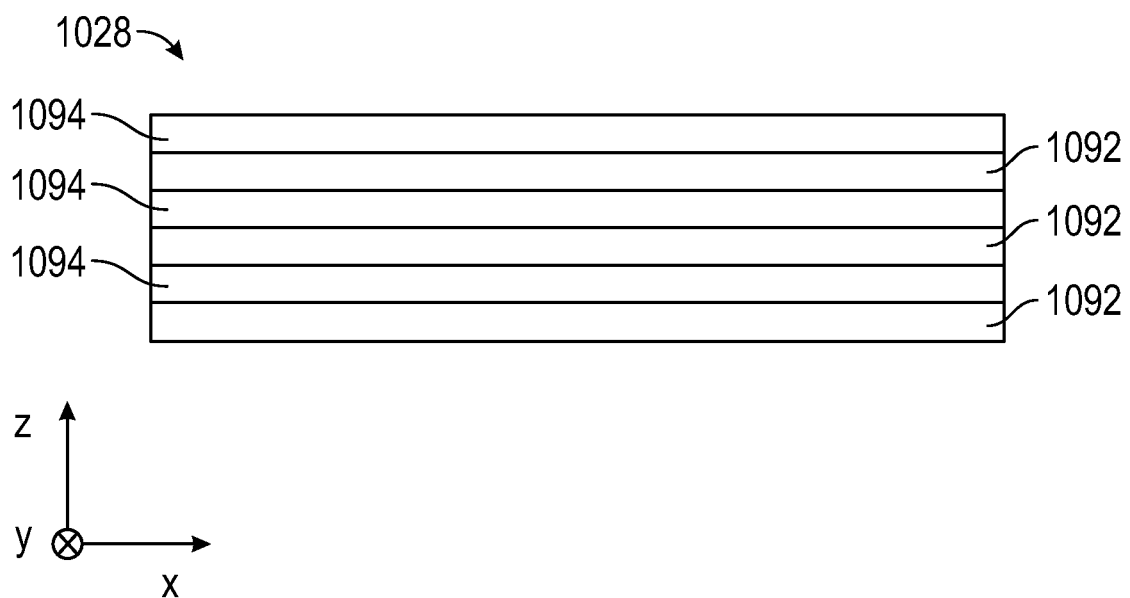
FIG. 8 is a schematic cross-sectional view of a reflective polarizer.

Any of the reflective polarizers used in any of the optical systems of the present description may be a formed (e.g., thermoformed) reflective polarizer which may be a thermoformed polymeric multilayer optical film. The polymeric multilayer optical film may include a plurality of alternating first and second polymeric layers. This is illustrated in FIG. 8 which is a side view of reflective polarizer 1028 including alternating first polymeric layers 1092 and second polymeric layers 1094. The out-of-plane (thickness) z-direction and orthogonal in-plane x- and y-directions are indicated in the figure. Suitable polymeric multilayer reflective polarizers are described, for example, in U.S. Pat. No. 5,882,774 (Jonza et al.), and U.S. Pat. No. 6,609,795 (Weber et al.). Methods of forming a reflective polarizer into a compound curve are described in U.S. Pat. Appl. Pub. No. 2017/0068100 (Ouderkirk et al.), previously incorporated herein by reference, and PCT Appl. No. US2016/050024 (Ouderkirk et al.) filed Sep. 2, 2016 and hereby incorporated herein by reference to the extent that it does not contradict the present description.

In some embodiments, the reflective polarizer used in the optical system of the present description (e.g., reflective polarizer 220) is a multilayer optical film that, prior to being formed (e.g., thermoformed) into the desired shape for the optical lens, is substantially uniaxially oriented in that it has a degree of uniaxial character U of at least 0.7, or at least 0.8, or at least 0.85, where $U=(1/MDDR-1)/(TDDR^{1/2}-1)$ with MDDR defined as the machine direction draw ratio and TDDR defined as the transverse direction draw ratio. Such substantially uniaxially oriented multilayer optical films are described in U.S. Pat. No. 2010/0254002 (Merrill et al.) and may include a plurality of alternating first and second polymeric layers with the first polymeric layers having indices of refraction in a length direction (e.g., x-direction) and a thickness direction (e.g., z-direction) that are substantially the same, but substantially different from an index of refraction in a width direction (e.g., y-direction). For example, the absolute value of the difference in the refractive indices in the x- and z-directions may be less than 0.02 or less than 0.01, and the absolute value of the difference in the refractive indices in the x- and y-directions may be greater than 0.05, or greater than 0.10. Unless specified differently, refractive index refers to the refractive index at a wavelength of 550 nm. Substantially uniaxially oriented reflective polarizers are available from 3M Company under the trade designation Advanced Polarizing Film or APF.

Other types of multilayer optical film reflective polarizers (e.g., Dual Brightness Enhancement Film or DBEF available from 3M Company) may also be used. In other embodiments, other types of reflective polarizers (e.g., wire-grid polarizers) are used.

The partial reflector used in the optical systems of the present description may be any suitable partial reflector. For example, the partial reflector may be constructed by coating a thin layer of a metal (e.g., silver or aluminum) on a transparent substrate (e.g., a film which may then be adhered to a lens, or the substrate may be a lens). The partial reflector may also be formed by depositing thin-film dielectric coatings onto a surface of a lens substrate, or by depositing a combination of metallic and dielectric coatings on the surface, for example. In some embodiments, the partial reflector has an average optical reflectance and an average optical transmittance at a predetermined wavelength or in a predetermined wavelength range that are each in a range of 20% to 80%, or each in a range of 30% to 70%, or each in a range of 40% to 60%, or each in a range of 45% to 55%. The partial reflector may be a half mirror, for example. The average optical reflectance and average optical transmittance in a predetermined wavelength range refer to the unweighted average over the predetermined wavelength range and over polarizations of the optical reflectance and optical transmittance, respectively, determined at normal incidence unless indicated otherwise. The average optical reflectance and average optical transmittance at a predetermined wavelength refer to the unweighted average over polarizations of the optical reflectance and optical transmittance, respectively, determined at normal incidence unless indicated otherwise. In some embodiments, the partial reflector may be a reflective polarizer or may have a polarization dependent reflectivity. However, it is typically preferred that the normal incidence optical reflectance and optical transmittance are independent or substantially independent of polarization state of the incident light. Such polarization independence can be obtained using substantially isotropic metallic layers and/or dielectric layers, for example.

In order to correct for the local rotation of the pass and block axes of the reflective polarizer, and/or to correct for birefringences (e.g., birefringence of an optical lens) in the optical system or other optical artifacts, the retardance of at least one retarder layer may be varied. Retardance of a uniaxial material refers herein to the birefringence times the physical thickness of the material where the birefringence is the difference between the refractive index along the extraordinary axis and the refractive index along the ordinary axis except where other axes are specified. In positive uniaxial materials, the extraordinary axis is the slow axis (higher refractive index) and the ordinary axis is the fast axis (lower refractive index). In the case of a biaxial material having three different refractive indices along three different axes, the retarder layer can be described as having an in-plane retardance and an out-of-plane retardance. In this case, the retardance refers herein to the in-plane retardance except where specific axes are specified or specific light rays are specified, or where the context clearly indicates differently. The in-plane retardance is the phase retardance experienced by light transmitted through the retarder from normal incidence. When specific light rays are specified, the retardance for those light rays may be specified in terms of the actual phase retardance of those rays. This retardance generally depends on the in-plane and out-of-plane retardance of retarder and on the direction of the light incident on the retarder.

In some cases, a retarder layer may include multiple stacked retarder layers with the multiple layers having different fast and slow axes, for example. In this case, an effective retardance and effective fast and slow axes of the retarder layer can be defined relative to a polarized light incident on the retarder and a polarized light transmitted through the retarder as the retardance and fast and slow axis orientation of a conventional single layer retarder that would convert the polarization state of the incident light to the polarization state of the transmitted light. The retardance of such a retarder layer refers to this effective retardance. For a retarder having a single layer, the effective fast and slow optical axes are the fast and slow optical axes of the single layer and the effective retardance is the retardance of the single layer. For a retarder having multiple layers where each layer has a fast and slow axis parallel to or rotated 90 degrees relative to effective fast and slow axes of the retarder, the effective retardance for normally incident light is the sum of the retardance of the layers with the respective fast and slow axes parallel to the effective fast and slow axes of the retarder minus the sum of the retardance of the layers with the respective fast and slow axes rotated 90 degrees relative to the effective fast and slow axes of the retarder.

The optical thickness of a retarder for a specified effective fast or slow optical axis refers to the sum over each layer of the retarder of the refractive index of the layer along the specified effective fast or slow optical axis times the thickness of the layer. For example, in some embodiments, a first retarder layer has a first optical thickness at the origin and a different second optical thickness at at least one other location for one of an effective fast optical axis of the first retarder layer or an effective slow optical axis of the first retarder layer. The first optical thickness is the refractive index along one of the effective fast and slow optical axes times the local physical thickness, and the second optical thickness is the refractive index along the same one of the effective fast and slow optical axes times the local physical thickness.

The retardance of a retarder can be spatially varied by spatially varying the optical thickness of the retarder for an effective fast or slow optical axis and this can be done by spatially varying the thickness and/or the refractive indices along the effective fast or slow axis by a suitable selection of orientation of the layers of the retarder, for example, as described further elsewhere herein. In some cases, the specified x1- and x2-axes may be along the $\hat{x}+\hat{y}$ and $\hat{x}-\hat{y}$ directions, for example, where $\hat{x}$ and $\hat{y}$ are unit vectors in the x-direction and the y-direction. Retardance specified relative to specified axes may be referred to as fixed-axis retardance. The fixed axes may be fixed through the thickness of the retarder at each location, but may vary with location on a major surface of the retarder. The fixed-axis retardance of a positive uniaxial material can be negative since the specified axes may be rotated relative to the extraordinary and ordinary axes of the positive uniaxial material. In embodiments, in which a retarder includes stacked retarder layers, the retardance of the stacked retarder layers refers to the retardance relative to the effective slow and fast optical axes for the retarder, unless specified differently. When specific light rays are specified, the retardance for those light rays may be specified in terms of the actual phase retardance of those rays.

In some embodiments, a retarder layer has a substantially uniform retardance across a first region of the retarder layer and a non-uniform retardance across a different second region of the retarder layer. In some embodiments, the first region is an interior region and the second region is a perimeter region substantially surrounding the interior region. In some embodiments, the interior region is a central region which includes a center of the retarder or an origin of the retarder intersected by an optical axis. A region of a retarder layer which extends to a perimeter of the retarder layer may be described as a perimeter region or a peripheral region of the retarder layer. A perimeter region may be said to substantially surround an interior region if it surrounds at least 90 percent of the perimeter of the interior region. For example, a perimeter region may completely surround the interior region.

Figure 9A:
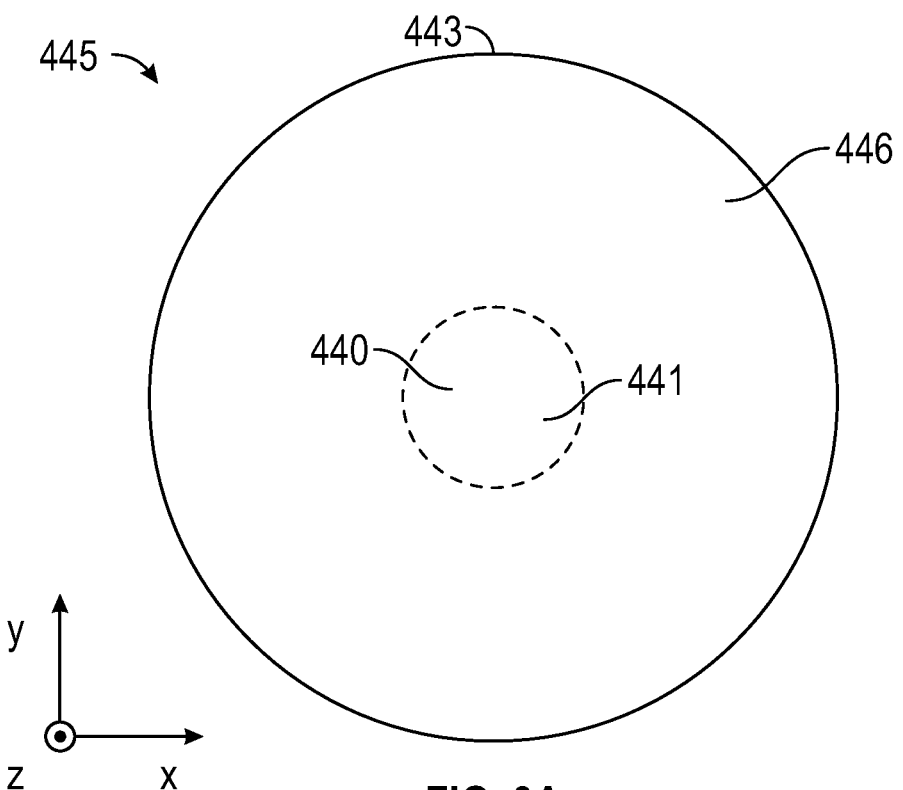
FIGS. 9A-10C are schematic front views of retarder layers.
Figure 9B:
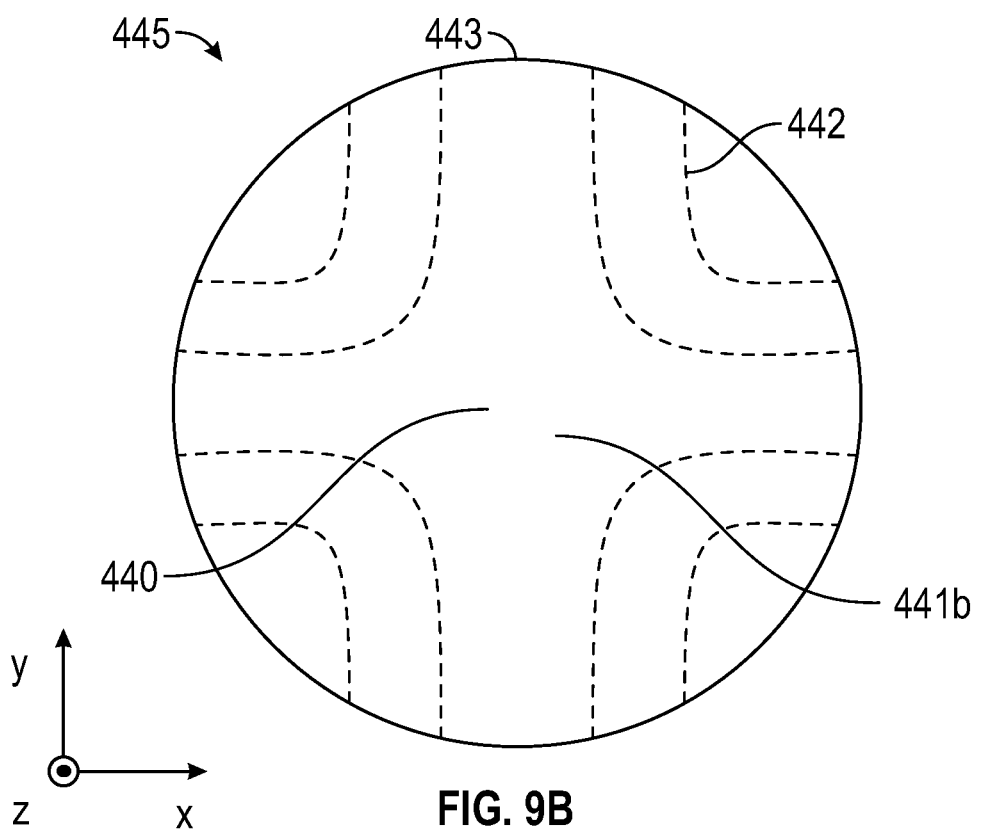
Figure 9C:
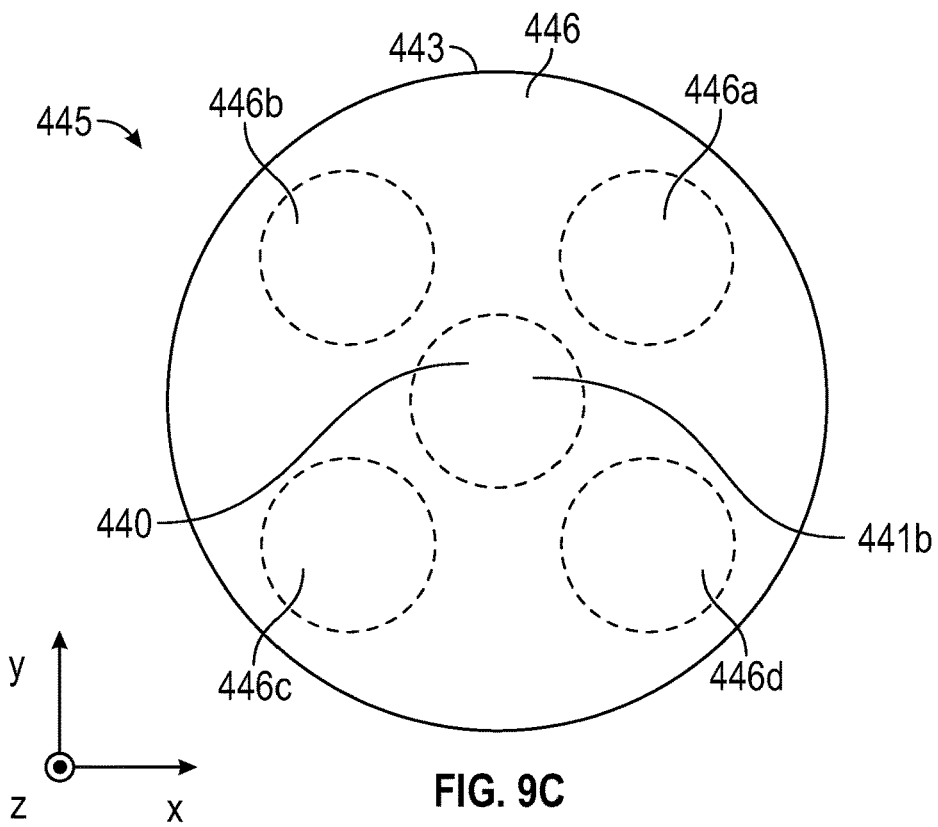

FIG. 9A is a schematic front plan view of retarder layer 445 illustrating regions 441 and 446 of the retarder layer 445. In some embodiments, the region 441 of the retarder layer 445 has a substantially spatially constant retardance and the region 446 has a spatially varying retardance. For example, a maximum difference in the retardance over the region 441 may be less than 10% (or less than 5%, or less than 3%) of a maximum difference in the retardance over the region 446. In the illustrated embodiment, region 441 is an interior region near the center of the retarder layer 445 and the optical axis 440 of an optical system including the retarder layer 445 intersects the retarder layer 445 in the region 441. The region 446 is a perimeter region surrounding the region 441 and extends to the edge 443 of the retarder layer 445. FIG. 9B illustrates retardance contours 442 in some embodiments of retarder layer 445. In some embodiments, the region in which the retardance is spatially substantially constant includes portions that extend to the edge 443 of the retarder layer 445 as illustrated in FIG. 9B. In some embodiments, the retardance is monotonically non-decreasing from a center of the retarder layer 445 to an edge 443 of the retarder layer along the $\hat{x}+\hat{y}$ and $-\hat{x}-\hat{y}$ directions and is monotonically non-increasing from a center of the retarder layer 445 to an edge 443 of the retarder layer along the $\hat{x}-\hat{y}$ and $-\hat{x}+\hat{y}$ directions. In some embodiments, the retardance is monotonically non-increasing from a center of the retarder layer 445 to an edge 443 of the retarder layer along the $\hat{x}+\hat{y}$ and $-\hat{x}-\hat{y}$ directions and is monotonically non-decreasing from a center of the retarder layer 445 to an edge 443 of the retarder layer along the $\hat{x}-\hat{y}$ and $-\hat{x}+\hat{y}$ directions. In some embodiments, the retarder layer 445 is symmetric under 180 degree rotations about the z-axis. In some embodiments, a difference between the retardance and the retardance at the optical axis 440 is antisymmetric under a 90 degree rotation about the z-axis. In some embodiments, the second region 446 includes regions 446a-446d as illustrated in FIG. 9C. In some embodiments, regions 446a and 446c have a lower average retardance than region 441 and regions 446b and 446d have a higher average retardance than region 441. In some embodiments, regions 446a and 446c have a higher average retardance than region 441 and regions 446b and 446d have a lower average retardance than region 441.

The relative size of the regions may be described in terms of the surface area of the regions or in terms of the area as determined in a plan view from a plane orthogonal to the optical axis. In some embodiments, in a plan view, the retarder layer 445 has an area A, the region 441 has an area in a range from about A/10 to about 2A/3, and each of the first through fourth regions 446a-446d has an area in a range from about A/12 to about A/3. In some embodiments, a retarder includes a first region (e.g., region 441) and a non-overlapping second region (e.g., region 446) where the second region is the remaining portion of the retarder. In some embodiments, the first region is a central region and the second region is a peripheral region (i.e., a region which includes at least a portion of a periphery or edge of the retarder) which may surround the central region. In some embodiments, region 441 has a surface area of at least 10 percent of the total surface are of the retarder layer 445. It will be understood that the surface area and total surface area refers to the surface area of one major surface of the retarder.

In some embodiments, a retarder (e.g., retarder layer 445 or 1075 described elsewhere herein) has a non-overlapping central and first and second edge regions. For example, the central region may correspond to region 441 or region 1041. The first and second edge regions may correspond to or regions 446a and 446b or regions 1046a and 1046b, which are disposed at or near respective first and second edges (e.g., edges 1473 and 1477 or 1073 and 1077) of the retarder. The central region (e.g., region 441) includes a first origin (e.g., corresponding to where optical axis 440 intersects retarder layer 445). For at least one first wavelength $\lambda_o$ in a predetermined wavelength range: the central region has an average retardance substantially equal to $\delta$; the first edge region has an average retardance substantially equal to $\delta-\xi$; and the second edge region has an average retardance substantially equal to $\delta+\xi$. In some embodiments for an integer n, $\lambda_o$ (n+⅛)≤$\delta$≤$\lambda_o$ (n+½) and $\delta/50$≤$\xi$≤$\delta/2$. In some embodiments, $\delta$ is substantially equal to $\lambda_o$ (n+¼) or $\lambda_o/4$. In some embodiments, $\xi$ is no less than $\delta/20$, or no less than $\delta/10$. In some embodiments, $\xi$ is no greater than $\delta/4$, or no greater than $\delta/5$. For example, in some embodiments, $\delta/20$≤$\xi$≤$\delta/5$.

The integer n may be any nonnegative integer. For example, n may be zero. A quarter-wave retarder, for example, would have $\delta=\lambda_o/4$ which satisfies the inequities $\lambda_o$ (n+⅛)≤$\delta$≤$\lambda_o$ (n+½) with n=0. Increasing the thickness of a quarter-wave retarder such that the retardance is (n+1)$\lambda_o/4$ for positive n, results in the same change to the polarization state of normally incident light transmitted through the retarder. In some embodiments, retarder layers described herein as having a substantially quarter-wave retardance are replaced with retarder layers having a retardance of (n+1) $\lambda_o/4$ for positive n. In some embodiments, n is 0, and in some embodiments, n is 1.

In some embodiments, the retarder further includes third and fourth edge regions (e.g., regions 446c and 446d or regions 1046c and 1046d), where the central region is between the first and third edge regions and between the second and fourth edge regions. In some embodiments, for the at least one first wavelength $\lambda_o$ in the predetermined wavelength range, the third edge region has an average retardance substantially equal to $\delta-\xi$, and the fourth edge region has an average retardance substantially equal to $\delta+\xi$.

An average retardance of a region refers to the unweighted average of the retardance over the region. The retardance may be understood to be the in-plane retardance or the retardance determined for normally incident light except where non-normally incident light is specified. In some embodiments, a region has a substantially uniform retardance which may be understood to mean that the maximum variation of the retardance in the region (maximum minus minimum retardance in the region) is no more than 10% of the maximum variation of the retardance in the retarder. An average retardance of a region or a retardance at a location in a retarder may be said to be substantially equal to a specified value if it the magnitude of the difference between the specified value and the average retardance of the region or the retardance at the location is no more than 10 percent of the maximum variation of the retardance in the retarder. In some embodiments, the retarder has a retardance at the first origin for the at least one first wavelength $\lambda_o$ in the predetermined wavelength range, of $\delta_o$. In some embodiments, $\delta_o$ is equal to or substantially equal to $\delta$. In some embodiments, for the at least one first wavelength $\lambda_o$ in the predetermined wavelength range, each of the first and second edge regions has a substantially uniform retardance. In some embodiments, for the at least one first wavelength $\lambda_o$ in the predetermined wavelength range, at least one of the first and second edge regions has a varying retardance. In some embodiments, the retarder further includes third and fourth edge regions. In some embodiments, for the at least one first wavelength $\lambda_o$ in the predetermined wavelength range, at least one of the first through fourth edge regions has a substantially uniform retardance. In some embodiments, for the at least one first wavelength $\lambda_o$ in the predetermined wavelength range, each of the first through fourth edge regions has a substantially uniform retardance.

In some embodiments, an optical system for transmitting light includes: one or more optical lenses having at least one curved major surface; a partial reflector disposed on and conforming to a major surface of the one or more optical lenses and having an average optical reflectance of at least 20% in a predetermined wavelength range; a reflective polarizer disposed on and conforming to a major surface of the one or more optical lenses, the reflective polarizer substantially reflecting light having a first polarization state and substantially transmitting light having an orthogonal second polarization state in the predetermined wavelength range; and a first retarder disposed on and conforming to a major surface of the one or more optical lenses, such that for at least one first wavelength $\lambda_o$ in the predetermined wavelength range: a center of the first retarder has a retardance equal to $\delta_o$, where for an integer n, $\lambda_o(n+\frac{1}{8}) \leq \delta_o \leq \lambda_o(n+\frac{1}{2})$; and a retardance of the first retarder increases in a first direction away from the center to an edge of the retarder (e.g., in the $-\hat{x}+\hat{y}$ direction) and decreases in a second direction (e.g., in the $\hat{x}+\hat{y}$ direction) away from the center to an edge of the retarder, an angle between the first and second directions being in a range from about 60 degrees to about 120 degrees, such that a maximum contrast ratio of the optical system in the predetermined wavelength range is at least 5% greater than that of a comparative optical system having the same construction except that the first retarder of the comparative optical system has a uniform retardance of $\delta_o$. For example, the optical system may correspond to optical system 1000 depicted in FIG. 1A and the first retarder may correspond to retarder 520. The comparative optical system may appear as depicted in FIG. 1A, with the retarder 520 replaced with a retarder having a uniform retardance of $\delta_o$. In some embodiments, the first retarder of the optical system is selected such that the contrast ratio is at least 10%, or at least 15% or at least 20%, or at least 25% greater than that of the comparative optical system.

Figure 9D:
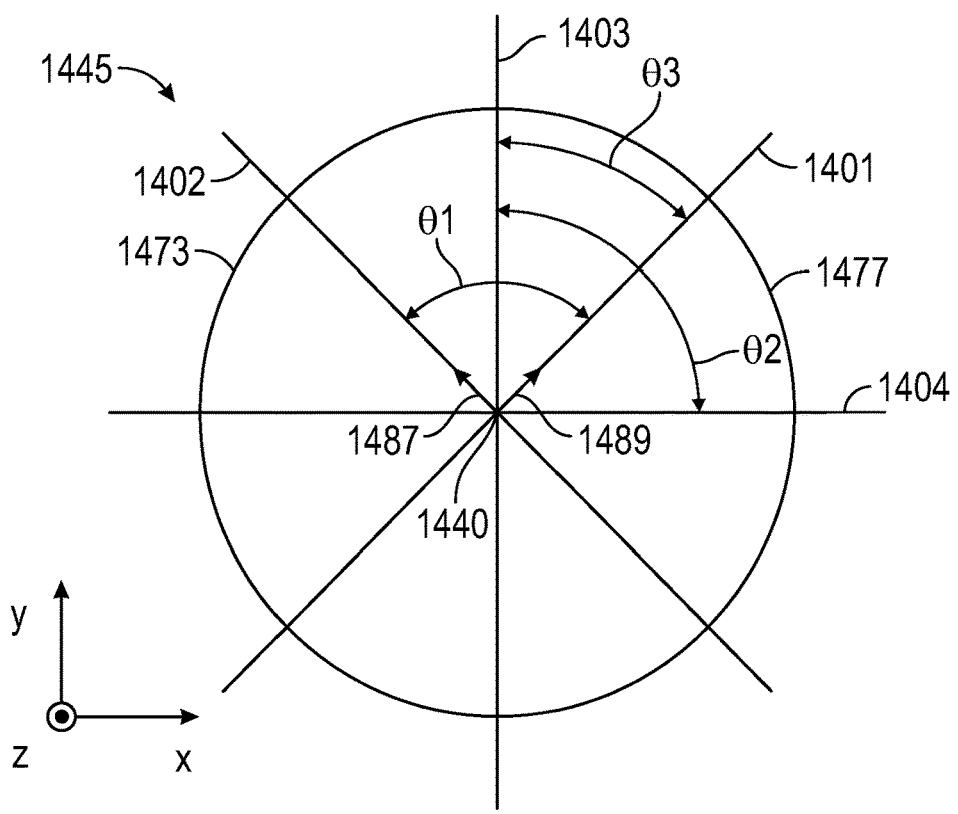

FIG. 9D is a plan view of retarder 1445 which may correspond to retarder layer 445. Planes 1401, 1402, 1403 and 1404 are illustrated. These planes intersect each other along a line (parallel to the z-axis) which intersects the retarder 1445 at the point 1440. Each of the planes intersects the retarder 1445 along a respective curve passing through the point 1440. In some embodiments, a retardance of the first retarder increases in a first direction 1487 away from the center, which may be point 1440, to an edge 1473 of the retarder 1445 and decreases in a second direction 1489 away from the center to an edge 1477 of the retarder 1445. In some embodiments, the first and second directions 1487 and 1489 are along first and second intersections of the retarder 1445 with the planes 1402 and 1401, respectively. When used in an optical system, the line may be the optical axis of the optical system and the point 1440 may be the first origin of the retarder layer intersected by the optical axis. In this case, each of the planes 1401, 1402, 1403 and 1404 contain the optical axis. The retarder 1445 may include a central region corresponding to region 441 and first through fourth edge regions corresponding to regions 446a-446d, which are not labeled in FIG. 9D for ease of illustration. In some embodiments, plane 1401 intersects the retarder 1445 in the central region and in the first edge region and plane 1402 intersects the retarder 1445 in the central region and in the second edge region. In some embodiments, the angle $\theta 1$ between the planes 1401 and 1402 is in a range from about 60 degrees to about 120 degrees, or in a range from about 70 degrees to about 110 degrees. In some embodiments, the angle $\theta 1$ is about 90 degrees. In some embodiments, the angle $\theta 2$ between the planes 1403 and 1404 is in a range from about 60 degrees to about 120 degrees, or in a range of about 70 degrees to about 110 degrees. In some embodiments, the angle $\theta 2$ is about 90 degrees. In some embodiments, the angle $\theta 3$ between the planes 1401 and 1404 is in a range from about 30 degrees to about 60 degrees, or in a range from about 35 degrees to about 55 degrees. In some embodiments, the angle $\theta 3$ is about 45 degrees.

In some embodiments, for the at least one first wavelength $\lambda_o$ in the predetermined wavelength range, the retarder 1445 has a retardance that is substantially symmetric under reflection about the plane 1401 and substantially symmetric under reflection about the plane 1402. The retardance may be described as substantially symmetric under reflection about a plane if the retardance at each point in at least 80 percent of a surface area of the retarder differs from the retardance at a corresponding point determined by reflecting the point about the plane by no more than 10 percent of the maximum variation in the retardance of the retarder. In some embodiments, the retardance at each point in at least 90 percent, or at least 95 percent, of a surface area of the retarder differs from the retardance at a corresponding point determined by reflecting the point about the plane by no more than 10 percent, or by no more than 5 percent, of the maximum variation in the retardance of the retarder. In some embodiments, for the at least one first wavelength $\lambda_o$ in the predetermined wavelength range, the retarder 1445 has a retardance such that a difference in the retardance and the retardance at the point 1440 is substantially antisymmetric under reflection about the plane 1403 and substantially antisymmetric under reflection about the plane 1404. The difference in retardance may be described as substantially antisymmetric under reflection about a plane if the difference in retardance at each point in at least 80 percent of a surface area of the retarder differs from the negative of the difference in retardance at a corresponding point determined by reflecting the point about the plane by no more than 10 percent of the maximum variation in the retardance of the retarder. In some embodiments, the difference in retardance at each point in at least 90 percent, or at least 95 percent, of a surface area of the retarder differs from the negative of the difference in retardance at a corresponding point determined by reflecting the point about the plane by no more than 10 percent, or by no more than 5 percent, of the maximum variation in the retardance of the retarder.

In some embodiments, for the at least one first wavelength $\lambda_o$ in the predetermined wavelength range, the retardance of the first edge region decreases in a direction away from the first origin toward the first edge 1477, and the retardance of the second edge region increases in a direction away from the first origin 1440 toward the second edge 1473. For example, the retardance may decrease in a direction (e.g., the $\hat{x}+\hat{y}$ direction) from the first origin 1440 to the edge 1477 and may increase in a direction (e.g., the $-\hat{x}+\hat{y}$ direction) from the first origin 1440 to the edge 1473.

Methods of making a retarder layer having the retardance variations illustrated in FIGS. 9A-9D include varying the physical thickness of the retarder layer and/or varying the relative alignment of the fast and slow optical axes of individual layers within the retarder layer as described further elsewhere herein.

Figure 10A:
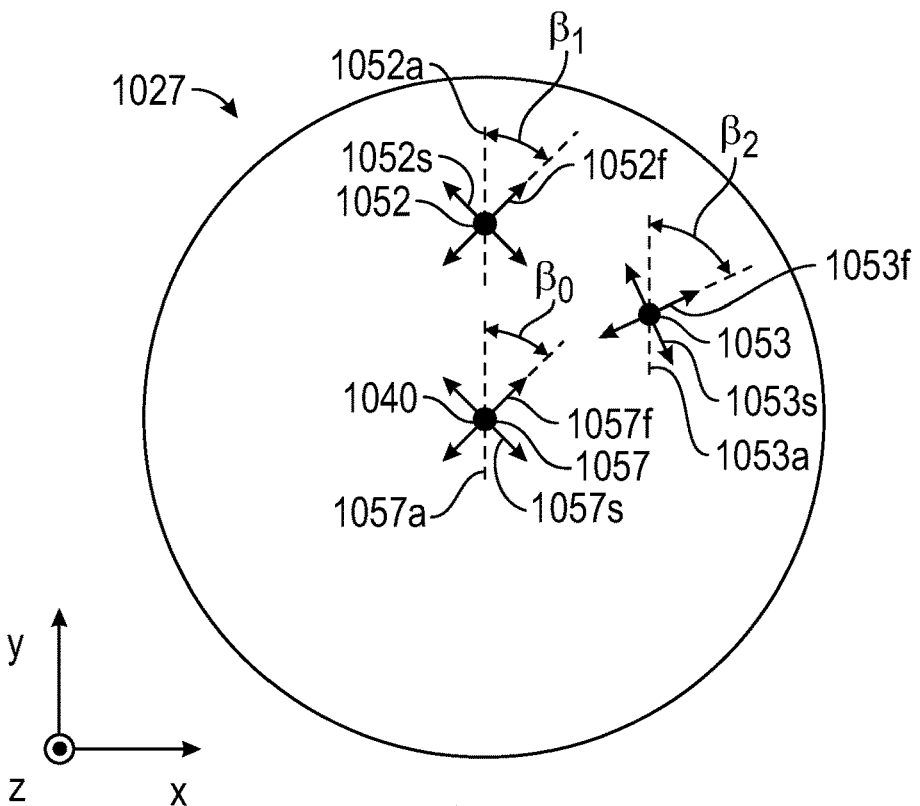

FIG. 10A is a schematic front view of retarder layer 1027 having an origin or apex 1057 along an optical axis 1040. The retarder layer 1027 has orthogonal fast and slow optical axes 1057f and 1057s at the apex 1057. The retarder layer 1027 has orthogonal fast and slow optical axes 1052f and 1052s at a first location 1052, and orthogonal fast and slow optical axes 1053f and 1053s at a second location 1053. In the illustrated embodiment, the fast and slow optical axes 1052f and 1052s are substantially aligned with the fast and slow optical axes 1057f and 1057s, while the fast and slow optical axes 1053f and 1053s are rotated relative to axes which are aligned with the fast and slow optical axes 1057f and 1057s. The angle of the fast optical axis 1057f relative to axis 1057a, which may correspond to a first or second polarization state of the reflective polarizer included an optical system including the retarder layer 1027, is $\beta_0$ at the apex 1057. Similarly, the angle of the fast optical axis 1052f relative to axis 1052a is $\beta_1$ at the first location 1052, and the angle of the fast optical axis 1053f relative to axis 1053a is $\beta_2$ at the second location 1053. In the illustrated embodiment, is $\beta_2 > \beta_0$ and $\beta_1$ is approximately equal to $\beta_0$. In some embodiments, $\beta_0$ is about 45 degrees. In some embodiments, $\beta_0$ is less than 45 degrees. In some embodiments, $\beta_0$ is greater than 45 degrees. The axes 1057a, 1052a and 1053a are tangent to the retarder layer 1027 and the axes 1052a and 1053a are aligned with axis 1057 in that axes 1052a and 1057 have a common corresponding angle with a shortest curve between apex 1040 and first location 1052 and axes 1053a and 1057 have a common corresponding angle with a shortest curve between apex 1040 and second location 1053, as generally described for curved surface 1727. In embodiments where a retarder layer is planar, unless indicated differently, the orientation of a retarder layer relative to a first polarization state refers to the angle between the fast optical axis of the retarder and the axis defined by the first polarization state. In the case where the first polarization state is a linear polarization state, for example, the axis defined by the first polarization state is the axis along the electric field vector of light having the first polarization state and propagating along the optical axis. In the case of an elliptical first polarization state, the axis defined by the first polarization state is the major axis of the polarization ellipse for light having the first polarization state and propagating along the optical axis. In the case of a curved retarder layer, unless indicated differently, an orientation of the retarder layer relative to a first polarization state refers to the orientation of the fast optical axis relative to a local axis tangent to the retarder layer, where the local axis is aligned with the axis defined by the first polarization state. As generally described for curved surface 1727, the local axis at a point on the retarder is aligned with the axis defined by the first polarization state if an angle between the local axis and a shortest curve on the surface of the retarder between the origin 1057 and the location is the same as the corresponding angle between the axis defined by the first polarization state and the curve at the origin 1057. The angle between the fast optical axis and the local axis may be referred to as an angle $\beta$ between the fast optical axis and the first polarization state. The first polarization state may be the block state of the reflective polarizer at an origin intersected by the optical axis. If the angle $\beta$ is substantially constant over the retarder, the retarder may be said to have a substantially uniform fast optical axis orientation.

Figure 10B:
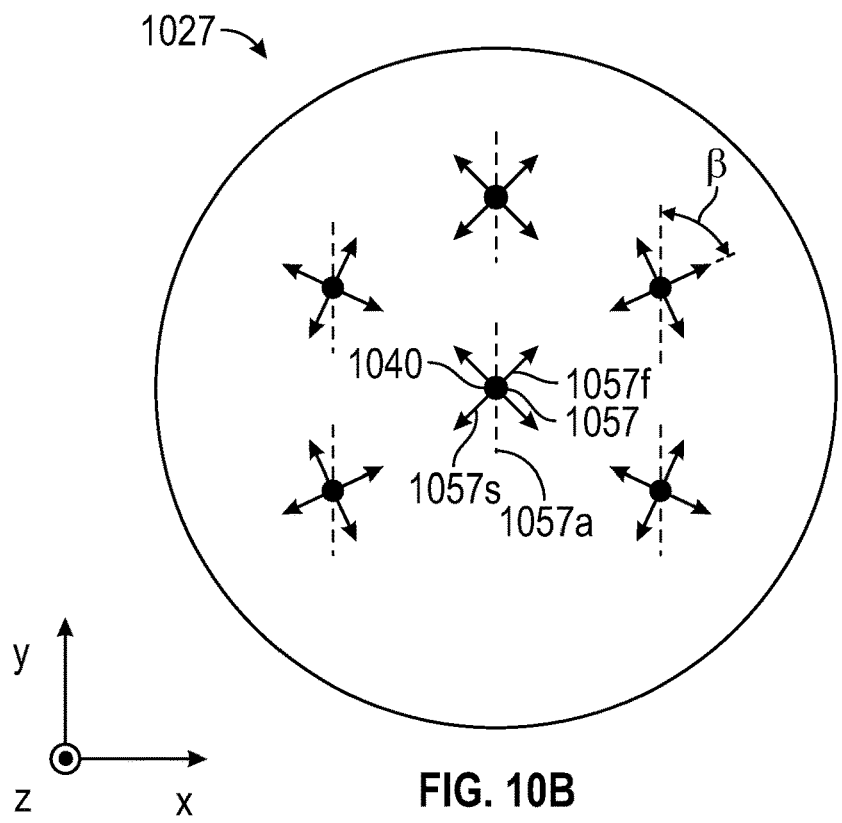

FIG. 10B is a schematic front view of the retarder layer 1027 illustrating a possible spatial variation in the orientation of the fast and slow optical axes. The fast axis is the axis closest to the $\hat{x}+\hat{y}$ direction in the figure. In some embodiments, the angle $\beta$ between the fast optical axis and local axis aligned with axis 1057a is about 45 degrees in a center region and is monotonically non-increasing from a center of the retarder layer 1027 to an edge of the retarder layer 1027 along the $\hat{x}+\hat{y}$ and $-\hat{x}-\hat{y}$ directions and is monotonically non-decreasing from the center of the retarder layer 1027 to the edge of the retarder layer 1027 along the $\hat{x}-\hat{y}$ and $-\hat{x}+\hat{y}$ directions. In some embodiments, the angle $\beta$ between the fast optical axis and local axis aligned with axis 1057a is about 45 degrees in a center region and is monotonically non-decreasing from a center of the retarder layer 1027 to an edge of the retarder layer 1027 along the $\hat{x}+\hat{y}$ and $-\hat{x}-\hat{y}$ directions and is monotonically non-increasing from the center of the retarder layer 1027 to the edge of the retarder layer 1027 along the $\hat{x}-\hat{y}$ and $-\hat{x}+\hat{y}$ directions. In some embodiments, a first retarder layer has a fast optical axis making an angle $\beta$ with the first polarization state (e.g., a block state of a reflective polarizer at an origin or an apex of the reflective polarizer), $\beta$ being less than 45 degrees. In some embodiments, $\beta$ is less than 45 degrees throughout the entire area of the first retarder layer. In other embodiments, $\beta$ is greater than 45 degrees throughout the entire area of the first retarder layer or is less than 45 degrees in some regions of the first retarder layer and is greater than 45 degrees in other regions of the first retarder layer.

In some embodiments, the fast optical axis at at least one location is not parallel to a plane defined by the first and second polarization states of the reflective polarizer. For example, the first and second polarization states may be linear polarization states along the y- and x-axes, respectively, in which case the plane defined by the first and second polarization states is, or is parallel to, the x-y plane (e.g., plane 847). The fast axes 1052f and 1053f may have a component along the negative z-axis due to the curvature of the retarder layer 1027, for example, and so would not be parallel to the plane defined by the first and second polarization states. The fast axis 1057f may be parallel to the plane defined by the first and second polarizations states.

In some embodiments, the retarder layer 1027 includes non-overlapping central and first and second edge regions. For example, the central region and first and second edge regions may have a geometric arrangement corresponding to regions 441, 446a and 446b depicted in FIG. 9C. The retarder layer 1027 may further include third and fourth regions which may correspond to regions 446c and 446d. The central region includes an origin of the first retarder layer intersected by the optical axis 1040. In some embodiments, for at least one first wavelength $\lambda_o$ in the predetermined wavelength range: the central region has an average fast axis orientation relative to a first polarization state (e.g., a block state of a reflective polarizer) substantially equal to $\theta$; the first edge region has an average fast axis orientation relative to the first polarization state substantially equal to $\theta-\varepsilon$; and the second edge region has an average fast axis orientation relative to the first polarization state substantially equal to $\theta+\varepsilon$, wherein $\theta$ is in a range of 35 to 55 degrees and $\varepsilon$ is in a range of 0.5 to 20 degrees. In some embodiments, $\theta$ is at least 35 degrees, or at least 40 degrees. In some embodiments, θ is no more than 55 degrees, or no more than 50 degrees. In some embodiments, θ is about 45 degrees. In some embodiments, ε is at least 0.5 degrees, or at least 1 degree, or at least 2 degrees. In some embodiments, ε is no more than 20 degrees, or no more than 15 degrees, or no more than 10 degrees.

An average fast axis orientation of a region refers to the unweighted average of the fast axis orientation over the region. In some embodiments, a region has a substantially uniform fast axis orientation which may be understood to mean that the maximum variation of the fast axis orientation in the region (maximum minus minimum fast axis orientation in the region) is no more than 10% of the maximum variation of the fast axis orientation in the retarder. An average fast axis orientation of a region or a fast axis orientation at a location in a retarder may be said to be substantially equal to a specified value if it the magnitude of the difference between the specified value and the average fast axis orientation of the region or the fast axis orientation at the location is no more than 10 percent of the maximum variation of the fast axis orientation in the retarder. In some embodiments, the retarder has a fast axis at the first origin relative to a first polarization state for the at least one first wavelength $\lambda_o$ in the predetermined wavelength range, of $\theta_o$. In some embodiments, $\theta_o$ is equal to or substantially equal to θ. In some embodiments, for the at least one first wavelength $\lambda_o$ in the predetermined wavelength range, each of the first and second edge regions has a substantially uniform fast axis orientation In some embodiments, for the at least one first wavelength $\lambda_o$ in the predetermined wavelength range, at least one of the first and second edge regions has a varying fast axis orientation.

Figure 10C:
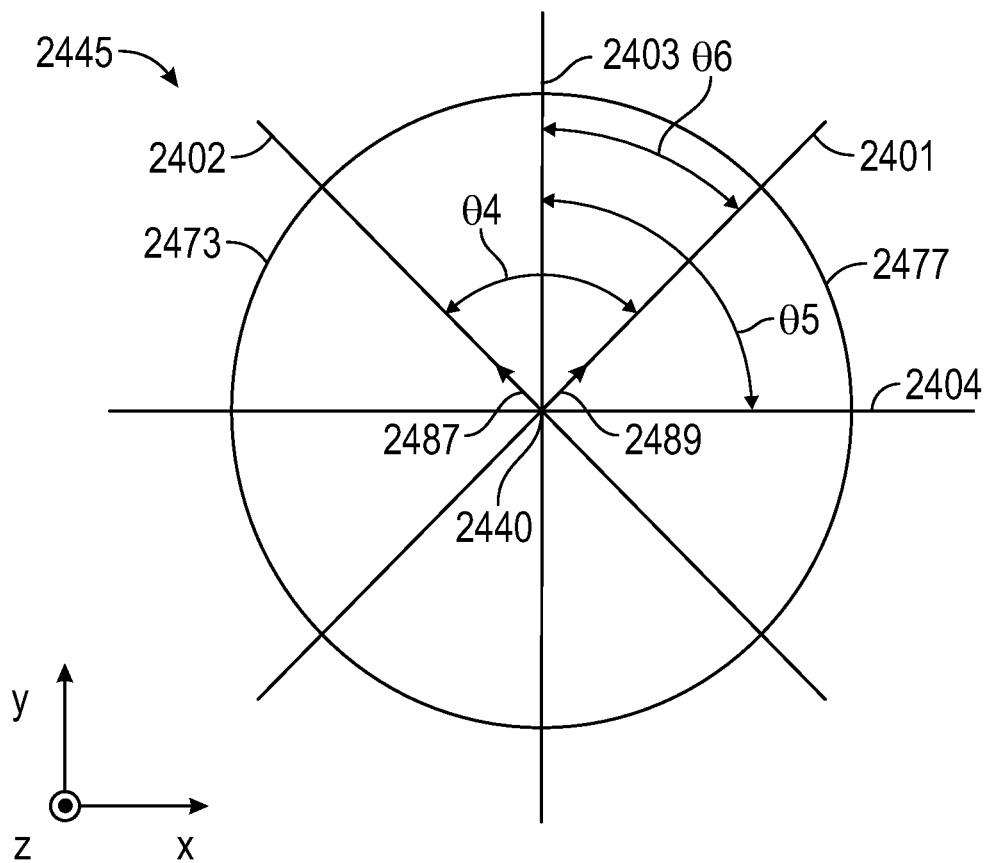

FIG. 10C is a plan view of retarder 2445 which may correspond to retarder layer 1027. Planes 2401, 2402, 2403 and 2404 are illustrated. These planes intersect each other along a line (parallel to the z-axis) which intersects the retarder 2445 at the point 2440. Each of the planes intersects the retarder 2445 along a respective curve passing through the point 2440. In some embodiments, a retardance of the first retarder increases in a first direction 2487 away from the center, which may be point 2440, to an edge 2473 of the retarder 2445 and decreases in a second direction 2489 away from the center to an edge 2477 of the retarder 2445. In some embodiments, the first and second directions 2487 and 2489 are along first and second intersections of the retarder 2445 with the planes 2402 and 2401, respectively. When used in an optical system, the line may be the optical axis of the optical system and the point 2440 may be the first origin of the retarder intersected by the optical axis. In this case, each of the planes 2401, 2402, 2403 and 2404 contain the optical axis. The retarder 2445 may include a central region corresponding to region 441 and first through fourth edge regions corresponding to regions 446a-446d, which are illustrated in FIG. 9C and are not labeled in FIG. 10C for ease of illustration. In some embodiments, plane 2401 intersects the retarder 2445 in the central region and in the first edge region and plane 2402 intersects the retarder 2445 in the central region and in the second edge region. In some embodiments, the angle θ4 between the planes 2401 and 2402 is in a range from about 60 degrees to about 120 degrees, or in a range from about 70 degrees to about 110 degrees. In some embodiments, the angle θ4 is about 90 degrees. In some embodiments, the angle θ5 between the planes 2403 and 2404 is in a range from about 60 degrees to about 120 degrees, or in a range of about 70 degrees to about 110 degrees. In some embodiments, the angle θ5 is about 90 degrees. In some embodiments, the angle θ6 between the planes 1401 and 1404 is in a range from about 30 degrees to about 60 degrees, or in a range from about 35 degrees to about 55 degrees. In some embodiments, the angle θ6 is about 45 degrees.

In some embodiments, retarder 2445 has a variable retardance as described for retarder 1445. The planes 2401, 2402, 2403 and 2404 may be the same or different from planes 1401, 1402, 1403, and 1404, respectively. In some embodiments, an angle between planes 1401 and 2401 is less than 30 degrees, or less than 20 degrees, or less than 10 degrees. Similarly, in some embodiments, an angle between planes 1402 and 2402, and/or between planes 1403 and 2403, and/or between planed 1404 and 2404, is less than 30 degrees, or less than 20 degrees, or less than 10 degrees.

In some embodiments, for the at least one first wavelength $\lambda_o$ in the predetermined wavelength range, the retarder 2445 has a fast axis orientation that is substantially symmetric under reflection about the plane 2401 and substantially symmetric under reflection about the plane 2402. The fast axis orientation may be described as substantially symmetric under reflection about a plane if the fast axis orientation at each point in at least 80 percent of a surface area of the retarder differs from the fast axis orientation at a corresponding point determined by reflecting the point about the plane by no more than 10 percent of the maximum variation in the fast axis orientation of the retarder. In some embodiments, the fast axis orientation at each point in at least 90 percent, or at least 95 percent, of a surface area of the retarder differs from the fast axis orientation at a corresponding point determined by reflecting the point about the plane by no more than 10 percent, or no more than 5 percent, of the maximum variation in the fast axis orientation of the retarder. In some embodiments, for the at least one first wavelength $\lambda_o$ in the predetermined wavelength range, the retarder 2445 has a fast axis orientation such that a difference in the fast axis orientation and the fast axis orientation at the point 2440 is substantially antisymmetric under reflection about the plane 2403 and substantially antisymmetric under reflection about the plane 2404. The difference in fast axis orientation may be described as substantially antisymmetric under reflection about a plane if the difference in fast axis orientation at each point in at least 80 percent of a surface area of the retarder differs from the negative of the difference in fast axis orientation at a corresponding point determined by reflecting the point about the plane by no more than 10 percent of the maximum variation in the fast axis orientation of the retarder. In some embodiments, the difference in fast axis orientation at each point in at least 90 percent, or at least 95 percent, of a surface area of the retarder differs from the negative of the difference in fast axis orientation at a corresponding point determined by reflecting the point about the plane by no more than 10 percent, or no more than 5 percent, of the maximum variation in the fast axis orientation of the retarder.

In some embodiments, a retarder may has the reflection symmetries and/or anti-symmetries of the retardance as described for retarder 1445 and the reflection symmetries and/or anti-symmetries of the fast axis orientation as described for retarder 2445. For example, in some embodiments, for the at least one first wavelength $\lambda_o$ in the predetermined wavelength range, a retarder has a retardance that is substantially symmetric under reflection about a first plane (e.g., plane 1401) and substantially symmetric under reflection about a second plane (e.g., plane 1403), and the retarder has a retardance of $\delta_o$ at an origin (e.g., point 1440 or 2440) and a difference between a retardance of the retarder and $\delta_o$ is substantially antisymmetric under reflection about a third plane (e.g., plane 1403) and substantially antisymmetric under reflection about a t fourth plane (e.g., plane 1404), and the retarder has a fast axis orientation relative to a first polarization state that is substantially symmetric under reflection about a fifth plane (e.g., plane 2401) and substantially symmetric under reflection about a different sixth plane (e.g., plane 2402), and the retarder has a fast axis orientation relative to the first polarization state at the first origin of $\theta_o$ and a difference between a fast axis orientation of the first retarder relative to the first polarization state and $\theta_o$ is substantially antisymmetric under reflection about a seventh plane (e.g., plane 2403) and substantially antisymmetric under reflection about a different eighth plane (e.g., plane 2404).

In some embodiments, an optical system for transmitting light includes: one or more optical lenses having at least one curved major surface; a partial reflector disposed on and conforming to a major surface of the one or more optical lenses and having an average optical reflectance of at least 20% in a predetermined wavelength range; a reflective polarizer disposed on and conforming to a major surface of the one or more optical lenses, the reflective polarizer substantially reflecting light having a first polarization state and substantially transmitting light having an orthogonal second polarization state in the predetermined wavelength range; and a first retarder disposed on and conforming to a major surface of the one or more optical lenses, such that for at least one first wavelength $\lambda_o$ in the predetermined wavelength range: a center of the first retarder has a fast axis orientation relative to the fast optical axis equal to $\theta_o$, $\theta_o$ being in a range of 35 to 55 degrees; and a fast axis orientation of the first retarder increases in a first direction away from the center to an edge of the retarder (e.g., in the $-\hat{x}+\hat{y}$ direction) and decreases in a second direction away from the center to an edge of the retarder (e.g., in the $\hat{x}+\hat{y}$ direction), an angle between the first and second directions being in a range from about 60 degrees to about 120 degrees, such that a maximum contrast ratio of the optical system in the predetermined wavelength range is at least 5% greater than that of a comparative optical system having the same construction except that the first retarder of the comparative optical system has a uniform fast axis orientation with respect to the first polarization state of $\theta_o$. For example, the optical system may correspond to optical system 1000 depicted in FIG. 1A and the first retarder may correspond to retarder 520. The comparative optical system may appear as depicted in FIG. 1A, with the retarder 520 replaced with a retarder having a uniform fast axis orientation with respect to the first polarization state of $\theta_o$. In some embodiments, the first retarder of the optical system is selected such that the contrast ratio is at least 10%, or at least 15% or at least 20%, or at least 25% greater than that of the comparative optical system.

In some embodiments, the first retarder of the optical system has a non-uniform retardance and a non-uniform fast axis orientation and the first retarder of the comparative optical system has a uniform retardance and a uniform fast axis orientation equal to the retardance and fast axis orientation of the first retarder of the optical system at the first origin. In this case the retardance distribution and the fast axis distribution of the first retarder may be selected such that the optical system has a contrast ratio at least 5%, or at least 10%, or at least 15%, or at least 20%, or at least 25%, or at least 30% greater than that of the comparative optical system.

In some embodiments, a retarder having a non-uniform retardance is provided. For at least one predetermined wavelength and for different first through fourth planes intersecting along a line through a first point in the first region of the retarder, the line being orthogonal to the retarder at the first point: the non-uniform retardance is substantially symmetric under each of a reflection about the first plane and a reflection about the second plane, and a difference between the non-uniform retardance and a retardance of the retarder at the first point is substantially antisymmetric under each of a reflection about the third plane and a reflection about the fourth plane. Such a retarder can be used at the retarder layer in any of the optical systems described herein (e.g., retarder layer 420 or 520).

In some embodiments, a retarder having a non-uniform fast axis orientation is provided. For at least one predetermined wavelength and for different first through fourth planes intersecting along a line through a first point in the first region of the retarder, the line being orthogonal to the retarder at the first point: the non-uniform fast axis orientation is substantially symmetric under each of a reflection about the first plane and a reflection about the second plane, and a difference between the non-uniform fast axis orientation and a fast axis orientation of the retarder at the first point is substantially antisymmetric under each of a reflection about the third plane and a reflection about the fourth plane. Such a retarder can be used at the retarder layer in any of the optical systems described herein (e.g., retarder layer 420 or 520). The fast axis orientation may be specified relative to a first polarization state of a reflective polarizer, for example.

In some embodiments, a retarder having a non-uniform retardance and a non-uniform fast axis orientation is provided. For at least one predetermined wavelength and for different first through fourth planes and different fifth through eight planes intersecting along a line through a first point in the first region of the retarder, the line being orthogonal to the retarder at the first point: the non-uniform retardance is substantially symmetric under each of a reflection about the first plane and a reflection about the second plane, and a difference between the non-uniform retardance and a retardance of the retarder at the first point is substantially antisymmetric under each of a reflection about the third plane and a reflection about the fourth plane, and the non-uniform fast axis orientation is substantially symmetric under each of a reflection about the fifth plane and a reflection about the sixth plane, and a difference between the non-uniform fast axis orientation and a fast axis orientation of the retarder at the first point is substantially antisymmetric under each of a reflection about the seventh plane and a reflection about the eighth plane. Such a retarder can be used at the retarder layer in any of the optical systems described herein (e.g., retarder layer 420 or 520). In some embodiments, an angle between the first and second planes is about 90 degrees, an angle between the third and fourth planes is about 90 degrees, and an angle between the first and third planes is about 45 degrees. In some embodiments, an angle between the fifth and sixth planes is about 90 degrees, an angle between the seventh and eighth planes is about 90 degrees, and an angle between the fifth and seventh planes is about 45 degrees. In some embodiments, the first and fifth planes are the same, the second and sixth planes are the same, the third and the seventh planes are the same, and the fourth and the eight planes are the same.

The retarder layer(s) used in the optical systems of the present description can be films or coatings or a combination of films and coating. Suitable films include birefringent polymer film retarders such as those available from Meadowlark Optics (Frederick, CO), for example. Suitable coatings for forming a retarder layer include the linear photopolymerizable polymer (LPP) materials and the liquid crystal polymer (LCP) materials described in U.S. Pat. App. Pub. Nos. 2002/0180916 (Schadt et al.), 2003/028048 (Cherkaoui et al.), 2005/0072959 (Moia et al.) and 2006/0197068 (Schadt et al.), and in U.S. Pat. No. 6,300,991 (Schadt et al.). Suitable LPP materials include ROP-131 EXP 306 LPP and suitable LCP materials include ROF-5185 EXP 410 LCP, both available from ROLIC Technologies Ltd. (Allschwil, Switzerland).

Such retarder layers can be made by depositing the LPP material onto a surface of a substrate (e.g., a reflective polarizer) or onto a lens. The LPP material can then be ultraviolet (UV) cured with a polarized light to orient the LPP material along the polarization axis which becomes the slow axis of the retarder layer. The orientation of the polarization of the UV light used to cure the LPP material can be patterned by varying the relative orientations of the polarization axis of the UV light and the retarder layer. For example, an orientation of a polarizer positioned between a UV light source and the LPP material can be varied as the LPP material is passed under the UV light source. In some embodiments, the LPP material is deposited (e.g., via spin coating) onto a major surface of a lens and the lens is mounted onto a multi-axis system (e.g., a three-axis system) that can move the lens under a polarized UV light source along a linear direction while changing the azimuthal and axial orientation of the lens. In this way, a continuously varying orientation of the LPP layer can be obtained.

An LCP layer is then applied (e.g., via spin coating) onto the LPP layer. The LCP molecules align with the LPP layer. The LCP layer can then be cured. In some embodiments, the LCP layer includes LPP materials as described in US 2006/0197068 (Schadt et al.). In this case, multiple LCP layers can be stacked on directly on each other with the surface of one LCP layer providing an alignment template for the adjacent layer due to the LPP materials included in the LCP layer which can be oriented by using a polarized UV light source after partially curing the LCP layer. An alternate to using an LPP layer as an alignment layer is to use a polymeric substrate that has been rubbed along the desired local alignment direction. However, it is typically preferred to use an LPP layer since this eliminates debris that can result from the rubbing process.

In some embodiments, the fast and slow axes are parallel to the surface of the retarder. In other embodiments, the fast or slow axis may be tilted and not parallel to the surface of the retarder. This can be achieve by exposing the LPP layer to linearly polarized UV at non-normal incidence. This causes the molecules of the LPP layer to tilt as described, for example, in U.S. Pat. No. 6,300,991 (Schadt et al.).

In describing the optical systems of the present description, it may be useful to refer to a predetermined wavelength at which the contrast ratio of the optical system is a maximum. The contrast ratio can be defined as in the ANSI/INFOCOMM 3M-2011 standard where the display emits a checkerboard pattern of 16 rectangles, eight white and eight black. The brightness values at the exit pupil of all of the white squares are determined and averaged, and the brightness values at the exit pupil of all of the black squares are determined and averaged. The ratio of the averaged white brightness to the averaged black brightness is the contrast ratio.

Figure 11:
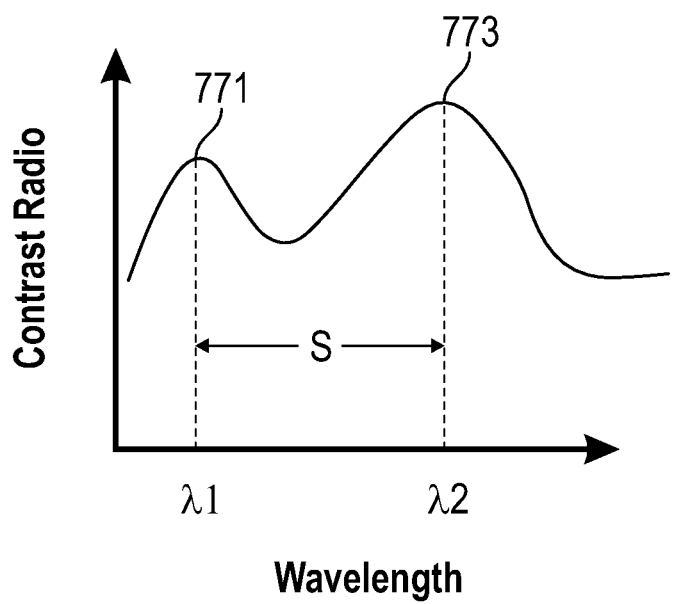
FIG. 11 is a schematic plot of contrast ratio versus wavelength.

FIG. 11 is a plot of the contrast ratio of an optical system as a function of wavelength. The contrast ratio has a maximum 771 at a wavelength $\lambda 1$ and a maximum 773 at a wavelength $\lambda 2$. Wavelengths $\lambda 1$ and $\lambda 2$ are separated by $S=\lambda 2-\lambda 1$. The wavelength chosen as the predetermined wavelength may be either $\lambda 1$ or $\lambda 2$. In some embodiments, the maximum contrast ratio at the predetermined wavelength is a local maximum within 20 nm of the predetermined wavelength. That is, the contrast ratio is a local maximum at the predetermined wavelength and no contrast ratio at a wavelength within S=20 nm of the predetermined wavelength is higher than the local maximum. Other local maxima may be present at wavelengths greater than 20 nm from the predetermined wavelength. In some embodiments, the maximum contrast ratio at the predetermined wavelength is a global maximum within 150 nm of the predetermined wavelength. That is, the contrast ratio is a maximum at the predetermined wavelength and no contrast ratio at a wavelength within S=150 nm of the predetermined wavelength is higher than the maximum. In some embodiments, the maximum contrast ratio at the predetermined wavelength is a global maximum within the visible range. That is, in some embodiments, there is no wavelength in the range of 400 nm to 700 nm where the contrast ratio is higher than it is at the predetermined wavelength. In some embodiments, the contrast ratio has a single maxima in the visible range and this maxima is the predetermined wavelength. In some embodiments, the predetermined wavelength is about 550 nm. In some embodiments, the predetermined wavelength is between about 545 nm and about 555 nm. In some embodiments, the predetermined wavelength is about 450 nm. In some embodiments, the predetermined wavelength is about 650 nm. In some embodiments, the predetermined wavelength is a primary color wavelength (e.g., a red, green or blue wavelength).

In some embodiments, a retarder layer is a single layer and in some embodiments, a retarder layer includes multiple stacked layers. Multiple layers can be used to tailor the spatial distribution of retardance and/or to give improved wavelength dispersion, and/or improved angular dispersion (e.g., reduced retardance variation within in a solid cone angle), for example.

Figure 12:
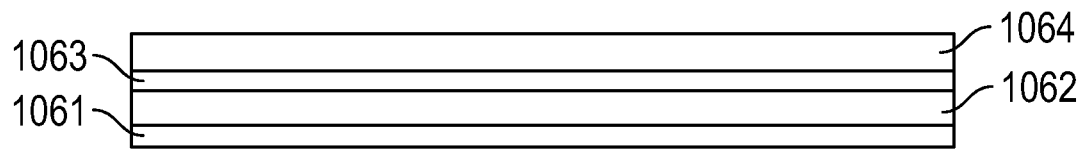
FIGS. 12-13 are schematic cross-sectional views of retarder layers.
Figure 12:
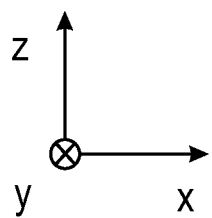

FIG. 12 is a schematic cross-sectional view of retarder layer 1065 which includes LPP layer 1061, LCP layer 1062 formed directly on LPP layer 1061, LPP layer 1063 formed directly on LCP layer 1062, and LCP layer 1064 formed directly on LPP layer 1063. The retarder layer 1065 includes at least first and second stacked retarder layers corresponding to LCP layers 1062 and 1064. As used herein, a first element "integrally formed" with a second element means that the first and second elements are formed together rather than being formed separately and then subsequently joined. Integrally formed includes forming a first element followed by forming the second element on the first element. For example, a liquid crystal retarder may be formed integrally with an oriented polymer retarder by first forming the oriented polymer retarder and then forming the liquid crystal retarder on the oriented polymer retarder (e.g., by coating and curing an LLP layer on the oriented polymer retarder and then coating and curing an LPP layer on the LLP layer). As used herein, a component is unitary if it is integrally formed from a single element or from multiple elements. For example, the retarder layer 1065 is unitary as it integrally formed from LPP layer 1061, LCP layer 1062, LPP layer 1063 and LCP layer 1064. In some embodiments, the LPP layer 1063 is omitted or is formed from the same material as the LCP layers 1062 and 1064, for example using the composition described US 2006/0197068 (Schadt et al.).

Figure 13:
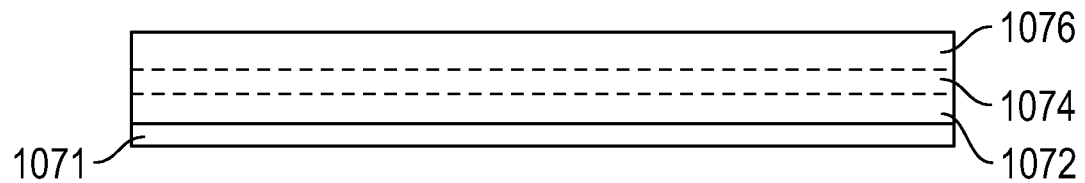
Figure 13:
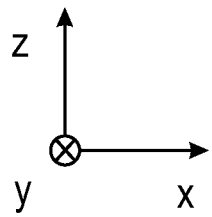

Utilizing multiple layers allows greater flexibility in patterning a retarder. FIG. 13 is a schematic illustration of a retarder layer 1075, which may be a unitary retarder, including a plurality of stacked retarder layers 1072, 1074, 1076 which may be patterned differently in order to produce a desired retardance variation. Layer 1071 is an alignment layer which may be an LPP layer or may be some other type of alignment layer (e.g., a substrate with a surface that has been rubbed in the alignment direction). Layers 1072, 1074 and 1076 may each be LCP layers. Layer 1072 is aligned by the alignment layer 1071. Layer 1074 is aligned by the alignment of the upper surface of layer 1072. This can be achieved by including LPP type materials in the LCP layer as described in US 2006/0197068 (Schadt et al.), or alternatively by rubbing the upper surface of layer 1072. Layer 1076 may be similarly aligned by the alignment of the upper surface of layer 1074.

Figure 14:
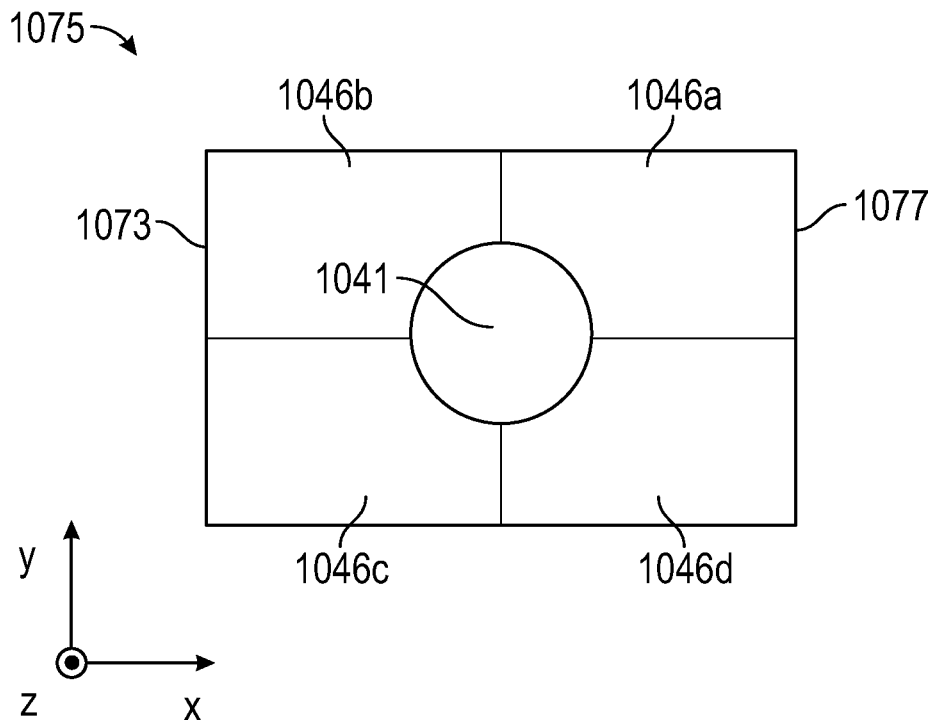
FIG. 14 is a schematic front view of a retarder layer.

FIG. 14 is a schematic front view of an example pattern for a layer of the retarder layer of FIG. 12 or 13. Retarder layer 1075 includes a central region 1041 surrounded by peripheral regions 1046a-1046d. In some embodiments, one of the retarder layers 1072, 1074 and 1076 is an unpatterned retarder layer having a retardance at a predetermined wavelength of ¼ of the predetermined wavelength and the other two of the retarder layers 1072, 1074 and 1076 are patterned as illustrated in FIG. 14. One of these two other retarder layers may have a positive retardance in the central region 1041 and the other may have a negative retardance in the central region 1041 having a magnitude equal to the positive retardance. In this case, the retardance of these layers refers to the thickness of the layer times the difference in refractive indices along effective slow and fast axes of the retarder which, in this case, are the axes defined by the slow and fast axes of the unpatterned layer. In some embodiments, each of the two patterned layers has a positive retardance in regions 1046b and 1046d and a negative birefringence in regions 1046a and 1046c. In this example, the central region of the retarder layer 1075 has a retardance of ¼ the predetermined wavelength, the regions of the retarder layer 1075 corresponding to regions 1046b and 1046d have a retardance greater than ¼ the predetermined wavelength, and the regions of the retarder layer 1075 corresponding to regions 1046a and 1046c have a retardance less than ¼ the predetermined wavelength.

Figure 15:
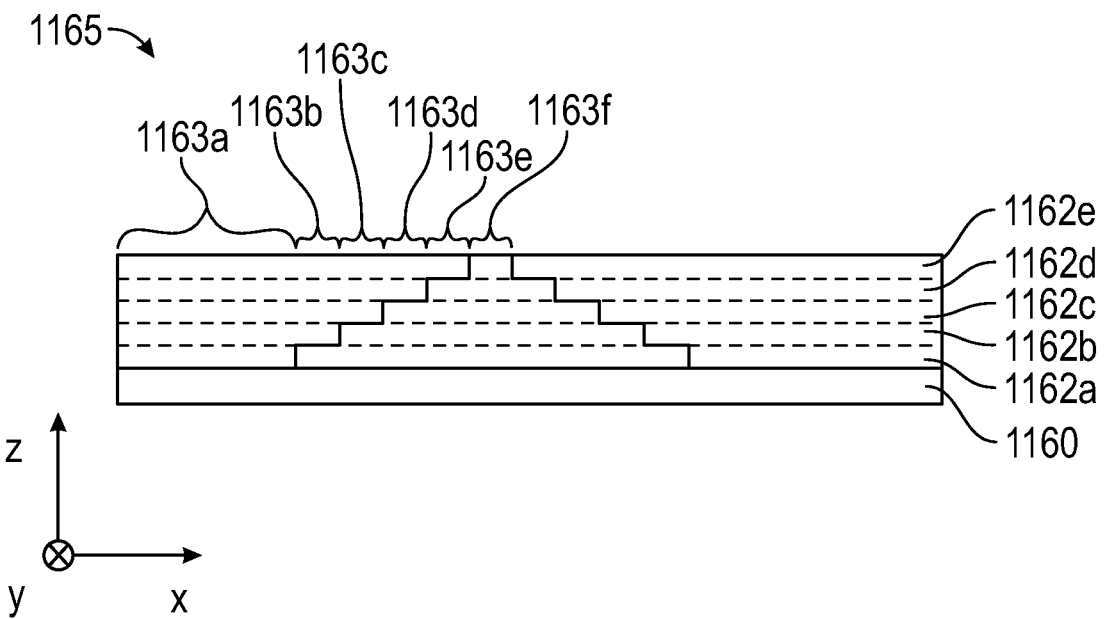
FIG. 15 is a schematic cross-sectional view of a retarder layer.

Another example is illustrated in FIG. 15 which is a schematic cross-sectional view of retarder layer 1165 which includes stacked retarder layers 1162a-1162e and is disposed on substrate 1160. In region 1163a, each of the retarder layers 1162a-1162e has a retardance of r1 relative to fixed effective fast and slow optical axes so that the retardance of region 1163a is 5 r1. In region 1163b, retarder layer 1162a has a retardance of −r1 and each of the retarder layers 1162b-1162e has a retardance of r1 so that the retardance of region 1163b is 3 r1. In region 1163c, each of retarder layers 1162a-1162b has a retardance of −r1 and each of the retarder layers 1162c-1162e has a retardance of r1 so that the retardance of region 1163c is r1. In region 1163d, each of retarder layers 1162a-1162c has a retardance of −r1 and each of the retarder layers 1162d-1162e has a retardance of r1 so that the retardance of region 1163d is −r1. In region 1163e, each of retarder layers 1162a-1162d has a retardance of −r1 and the retarder layer 1162e has a retardance of r1 so that the retardance of region 1163e is −3 r1. In region 1163f, each of retarder layers 1162a-1162e has a retardance of −r1 so that the retardance of region 1163f is −5 r1.

Figure 16A:
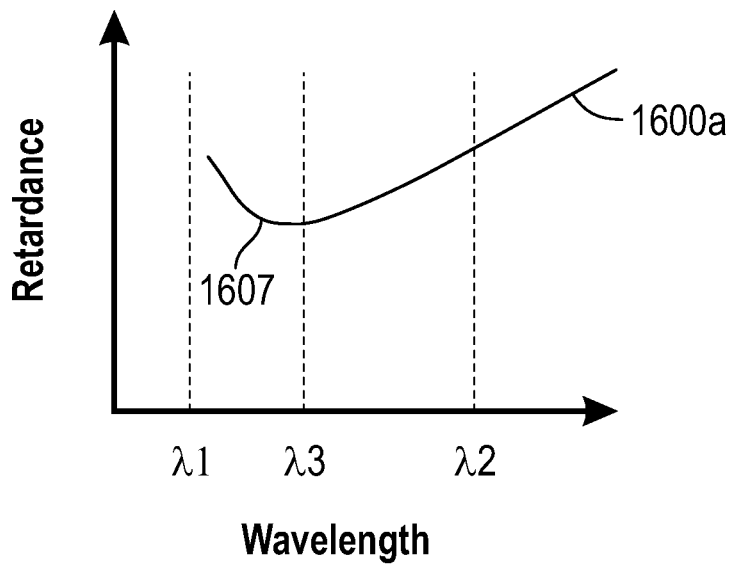
FIGS. 16A-16E are schematic illustrations of retardances versus wavelength.
Figure 16B:
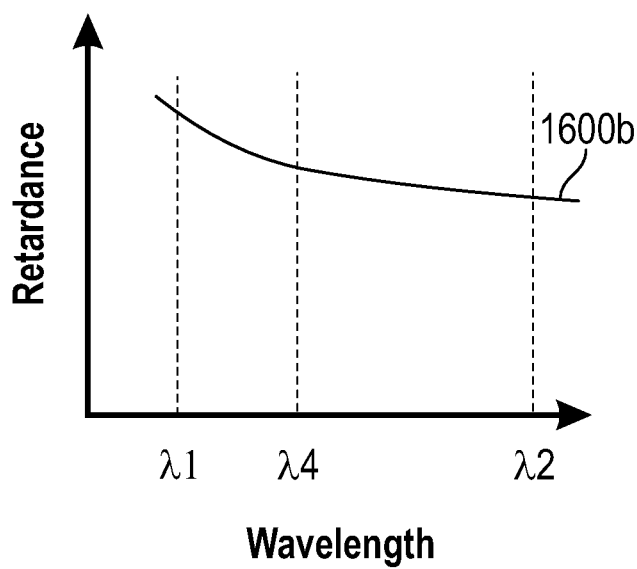

Multiple layers can also be utilized to produce a desired dispersion. FIG. 16A is a schematic illustration of retardance (e.g., in nm) versus wavelength for a retarder layer. The retardance versus wavelength is a wavelength dispersion curve 1600a. The dispersion curve 1600a is similar to the dispersion curve of the ROLIC LCMO achromatic retarders. The dispersion curve 1600a has a peak 1607 in and away from lower λ1 and upper λ2 limits of the predetermined wavelength range from λ1 to λ2. The retarder layer having the dispersion curve 1600a may be a substantially quarter-wave retarder at the wavelength λ3, for example, and may be substantially quarter-wave over a wavelength range (e.g., from λ3 to λ2) in the predetermined wavelength range. FIG. 16B is a schematic illustration of a wavelength dispersion curve 1600b for a different retarder layer. The dispersion curve 1600b is similar to a dispersion curve of a conventional retarder such as that of an oriented polymer layer. The dispersion curve 1600b changes monotonically with increasing wavelength in the predetermined wavelength range. The retarder layer having the dispersion curve 1600b may be a substantially quarter-wave retarder at the wavelength λ4, for example, which may be different from any wavelength at which the retarder layer having the dispersion curve 1600a is a substantially quarter-wave retarder.

Figure 16C:
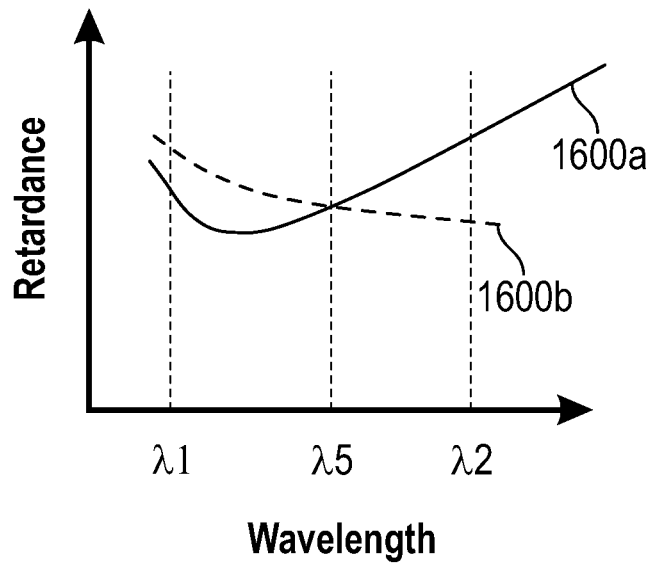
Figure 16D:
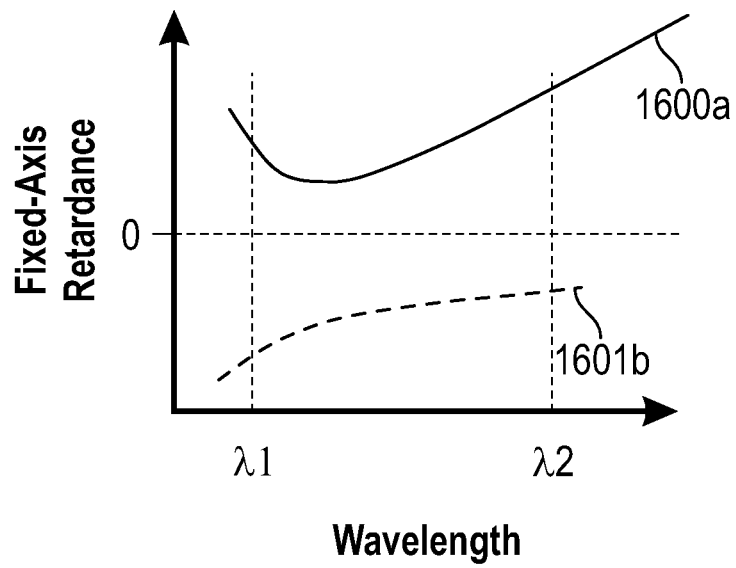

FIG. 16C is a schematic illustration of the dispersion curves 1600a and 1600b shown on a common plot. The wavelength dispersion curves 1600a and 1600b intersect each other at the wavelength λ5 in the predetermined wavelength range. If two retarder layers were combined where one of the retarder layers had the dispersion curve 1600a and the other had the dispersion curve 1600b, and the two retarder layers were aligned with the respective fast axes parallel to each other, the fixed-axis retardance relative to the common fast and slow axis directions would appear as in FIG. 16C. If the two retarder layers were aligned with the respective fast axes orthogonal to each other, the fixed-axis retardance relative to the fast and slow axes of the retarder layer having the dispersion curve 1600a would appear as in FIG. 16D which schematically illustrates the fixed-axis retardance versus wavelength for the two retarder layers. In this case, the retarder layer with the dispersion curve 1600b has a fixed-axis retardance 1601b as a function of wavelength which is the negative of the dispersion curve 1600b.

More generally, in some embodiments, an optical system includes a first retarder layer having a first wavelength dispersion curve in a predetermined wavelength range, which may be the visible range or the union of one or more disjoint ranges within the visible range, for example, and a second retarder layer disposed between a partial reflector and a reflective polarizer and having a second wavelength dispersion curve, different than the first wavelength dispersion curve, in the predetermined wavelength range. In some embodiments, the first and second wavelength dispersion curves intersect each other at at least one wavelength in the predetermined wavelength range. In some embodiments, at least one of the first and second dispersion curves changes monotonically with increasing wavelength in the predetermined wavelength range (e.g., both dispersion curves can appear generally as 1600b with differences between dispersion curves arising from the use of different materials for the retarder layers, for example). In some embodiments, at least one of the first and second dispersion curves comprises at least one peak in, and away from lower and upper limits of, the predetermined wavelength range (e.g., both dispersion curves can appear generally as 1600a with differences between the dispersion curves arising from the use of different materials for the retarder layers, for example).

In some embodiments, an optical system including first and second retarder layers having the wavelength dispersion curves 1600a and 1600b, respectively, has a maximum contrast ratio at a predetermined wavelength that is different than the wavelengths λ3 and λ4.

In some embodiments, both retarder layers have a chromatic wavelength dispersion curve. Such wavelength dispersion curves do not have continuous wavelength ranges where the retardance is ¼ of the wavelength. In some embodiments, each retarder layer has a retardance of ¼ of the wavelength at a single wavelength. In some embodiments, this single wavelength is different for the different retarder layers.

Figure 16E:
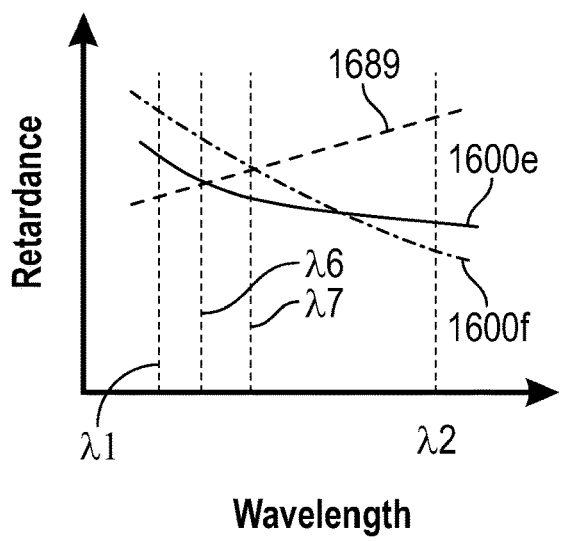

FIG. 16E is a schematic illustration of wavelength dispersion curves 1600e and 1600f for different first and second chromatic retarders, respectively. Each of the dispersion curves 1600e and 1600f changes monotonically with increasing wavelength in the predetermined wavelength range from λ1 to λ2. The curve 1689 indicates where the retardance is equal to a quarter of the wavelength. The first chromatic retarder has a quarter wave retardance at a first wavelength λ6 and the second chromatic retarder has a quarter wave retardance at a different second wavelength λ7.

A retarder layer described as substantially a quarter-wave retarder at a specified wavelength can be understood to mean that the retarder layer has a retardance within 5 percent of ¼ of the specified wavelength for normally incident unpolarized light for at least 80 percent of a surface area of the retarder layer. A retarder layer may be substantially a quarter-wave retarder at a first wavelength and have a retardance substantially different from quarter wave at a different second wavelength. A retardance substantially different from quarter wave at a second wavelength can be understood to mean that the retardance is not within 5 percent of ¼ of the second wavelength. A quarter-wave retarder may have a spatially uniform orientation or a spatially non-uniform orientation.

In some embodiments, an optical system includes first and second retarder layers having different wavelength dispersion curves where at least one of the first and second retarder layers has a spatially non-uniform retardance. In such embodiments, the wavelength dispersion curves refer to the dispersion curves at a centroid of the respective retarder layer, unless indicated differently. The centroid is the center of area of a surface of the retarder and may be the point intersected by an optical axis of the optical system. For example, apex 1057 is the centroid of retarder layer 1027 which is intersected by optical axis 1040. In some embodiments, the wavelength dispersion curves refer to the dispersion curves at an origin of the respective retarder layer intersected by the optical axis.

Stacking multiple retarder layers into a single overall retarder layers allows a net dispersion curve to be obtained which may provide improved optical properties in an optical system incorporating the overall retarder.

In some embodiments, an optical system includes different first and second retarder layers that are separated from each other. The first retarder layer can be selected such that it has a first wavelength dispersion curve and the second retarder layer can be selected such that it has a different second wavelength dispersion curve. The first and second dispersion curves may be selected so that deviations in the dispersion of one retarder layer from a desired dispersion is at least partially compensated by deviations in the dispersion in the other retarder layer from a desired dispersion. In some embodiments, one or both of the retarders may be a stacked retarder that includes two or more layers with different retardance and orientation. For example, in order to make the composite retarder achromatic or approximately achromatic.

Figure 17:
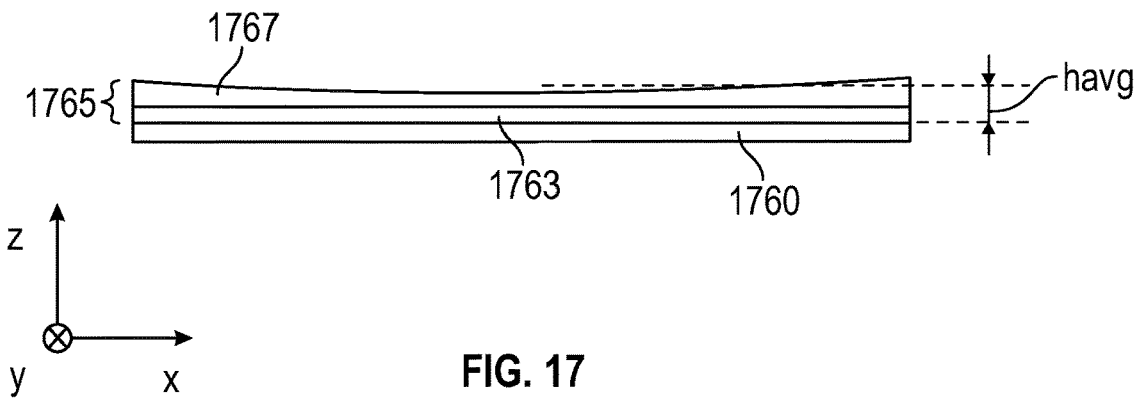
FIG. 17 is a schematic cross-sectional view of a retarder layer.

Another approach to providing a spatially varying retardance is to spatially vary the thickness of the retarder layer. FIG. 17 is a schematic cross-sectional view of a retarder layer 1765 disposed on a substrate 1760. Although the substrate 1760 is illustrated as a flat substrate in FIG. 17, it will be understood that the retarder layer 1765 can alternatively be disposed on a curved major surface of an optical lens. Retarder layer 1765 has a variable thickness and is thicker near the edge of the layer than near the center. Such a thickness distribution can be obtained using a spin-coater, for example, to despite the retarder layer. In the illustrated embodiment, retarder layer 1765 includes first and second stacked retarder layers 1763 and 1767. In other embodiments, a retarder layer having a variable thickness has only one layer. In some embodiments, first stacked retarder layer 1763 has a uniform physical thickness and a variable orientation, and the second stacked retarder layer 1767 has a uniform orientation and a variable physical thickness. In other embodiments, the retarder layer 1765 is thicker near the center of the layer and thinner near the edges. In some embodiments, the retarder layer 1765 has a first thickness near the center, has a higher second thickness in a portion of the retarder layer 1765 proximate an edge of the retarder layer 1765 and has a lower third thickness in a different portion of the retarder layer 1765 proximate an edge of the retarder layer 1765. For example, the retarder layer 1765 may have a thickness distribution selected to give the retardance distribution illustrated in FIG. 9C. The retarder layer 1765 has an average physical thickness of havg.

Any suitable method can be used to provide the variation in retarder layer thickness. In some embodiments, the layer thickness variation is provided by the coating method used to apply a retarder coating onto a surface of the substrate. For example, the retarder layer may be spin coated onto a curved surface of an optical lens and the thickness of the coating may vary with the radial position from an optical axis of the optical lens. Other methods of providing the desired thickness distribution include chemical etching, plasma etching, focused ion-beam etching, laser ablation, and embossing. Suitable selective plasma etching techniques are described, for example, in "Selective Plasma Etching of Polymeric Substrates for Advanced Applications", Puliyalil and Cvelbar, Nanomaterials 2016, 6, 108. Suitable chemical etchants may include alkali metal salts, e.g. potassium hydroxide; alkali metal salts with one or both of solubilizers, e.g., amines, and alcohols, such as ethylene glycol. The chemical etchant chosen may vary depending on the material of the retarder layer. Suitable chemical etchants for some embodiments include KOH/ethanol amine/ethylene glycol etchants such as those described in more detail in U.S. Pat. Pub. No. 2007/0120089 (Mao et al.). Other suitable chemical etchants include a KOH/glycine etchants such as those described in more detail in U.S. Pat. Pub. No. 2013/0207031 (Palaniswamy).

Spin-coating can be used to apply the retarder layer (e.g., an LPP layer followed by an LCP layer). The retarder layer can be spin-coated onto a lens by mounting the lens on a rotatory platform of a spin coater which rotates the lens while the uncured retarder material is applied near the apex of the lens. The rotation speed and amount of material can be adjusted to give a desired thickness. The thickness distribution can be further tailed by etching if desired. In some embodiments, an optical system includes spaced apart first and second retarder layers. In some embodiments, the first retarder layer includes a first spin-coated retarder layer having a smaller average first physical thickness and the second retarder layer includes a second spin-coated retarder layer having a greater average second physical thickness.

Figure 18:
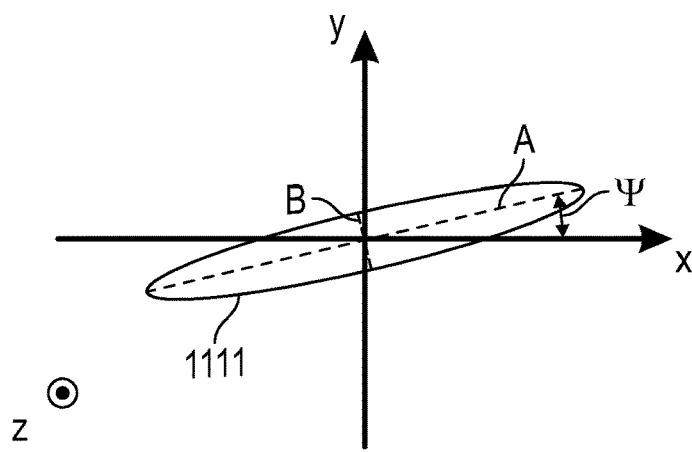
FIG. 18 is a schematic illustration of a polarization ellipse.

FIG. 18 schematically illustrates an elliptical polarization state where the polarization ellipse 1111 has a major axis of A and a minor axis of B. The major axis A is at an angle of ψ to the x-axis. Differences in polarization states can be characterized in terms of the Stokes parameters which are conventionally denoted I, Q, U and V and which may be combined into the Stokes vector $S=(I, Q, U, V)^T$. The parameter I represents the total radiance, Q represents the radiance linearly polarized parallel or perpendicular to a reference plane, U represents the radiance linearly polarized in directions 45 degrees to the reference plane, and V represents the radiance of circularly polarized light. The reference plane refers to the x-z plane in FIG. 18. A positive Q represents a portion of light linearly polarized along the x-axis and a negative Q represents a portion of light linearly polarized along the y-axis. A positive U represents a portion of light linearly polarized at an angle ψ of 45 degrees and a negative U represents a portion of light linearly polarized light at an angle ψ of −45 degrees. A positive V represents a portion of light right-hand circularly polarized and a negative V represents a portion of light left-hand circularly polarized.

The difference between first and second polarization states is defined herein as the fraction of the intensity of light having the first polarization state that is transmitted through a perfect polarizer having the second polarization state as its block state. For linear polarization states this difference can be expressed as $1-\cos^2 \alpha$, where α is the angle between the polarization states. In terms of Stokes parameters, this implies that the difference between the polarization state characterized by a Stokes vector, $S=(I, Q, U, V)^T$, and the linear polarization state along the x-axis is given by ½ (1−Q/I), and the difference between the polarization state characterized by the Stokes vector, S, and the linear polarization state along the y-axis is given by ½ (1+Q/I). Note that with this definition, differences in polarization states are between 0 (same polarization state) and 1 (orthogonal polarization states).

In some embodiments, an optical system includes a reflective polarizer, a partial reflector adjacent to and spaced apart from the reflective polarizer, a first retarder disposed proximate the partial reflector opposite the reflective polarizer, a second retarder disposed between the partial reflector and the reflective polarizer. In some embodiments, at least one of the first and second retarders has a spatially non-uniform retardance and/or a spatially non-uniform fast axis orientation. In some embodiments, the first and second retarders have differing wavelength dispersion curves. In some embodiments, the optical system includes one or more optical lenses and the reflective polarizer and partial reflector are disposed on and conforms to different major surfaces of the one or more optical lenses. In some embodiments, one or both of the first and second retarders are disposed on and conforms to a major surface of the one or more optical lenses. In some embodiments, the first retarder is disposed on a display panel. In some embodiments, the one or more optical lenses have at least one curved major surface. In some embodiments, the curved major surface is curved about two orthogonal directions. In other embodiments, the one or more optical lenses does not have a curved major surface (e.g., a gradient-index lens). In some embodiments, the one or more optical lenses has a nonzero optical power along at least one axis. In some embodiments, the optical system is a portion of a display system that further includes a display panel.

Figure 19:
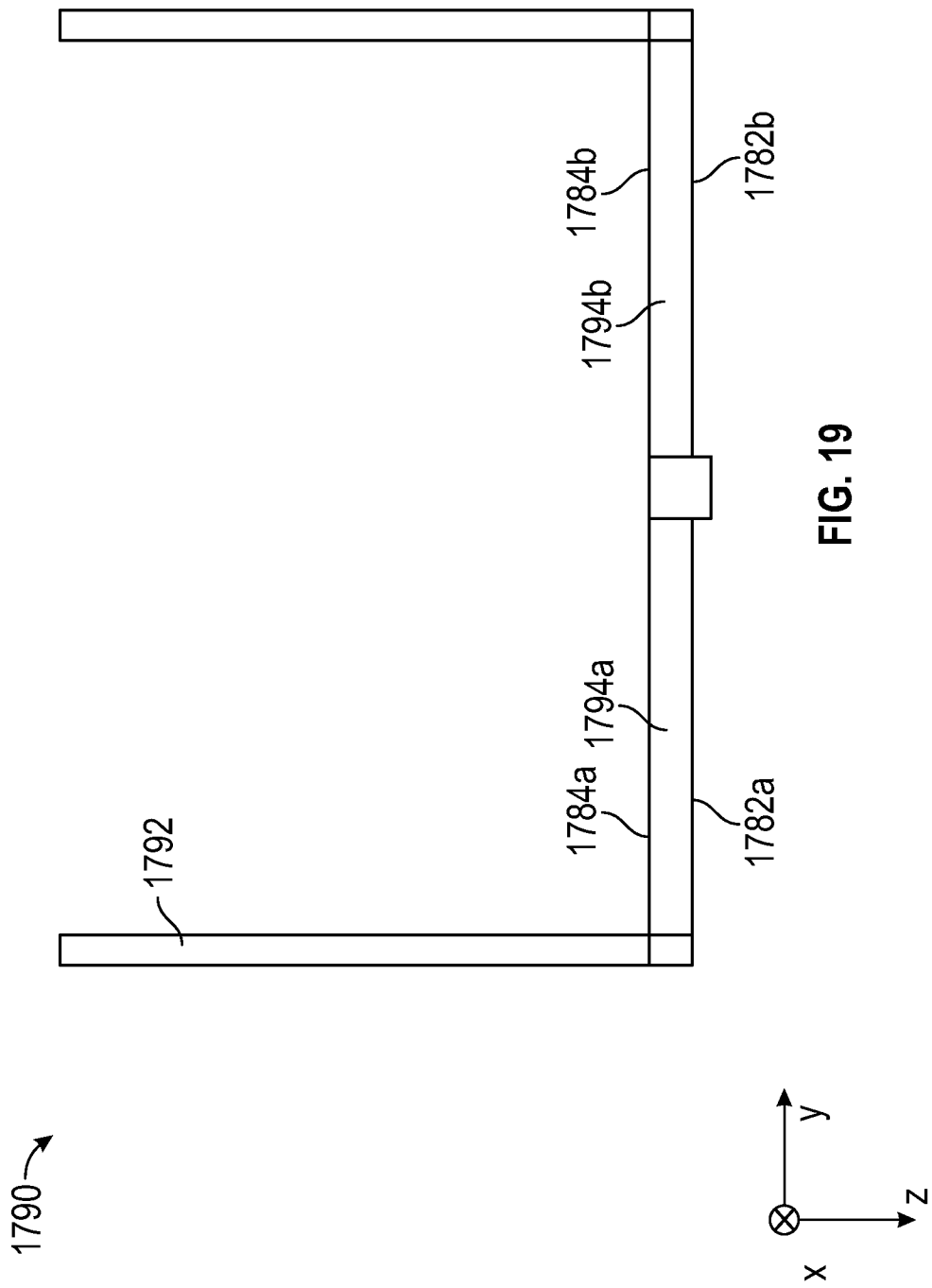
FIG. 19 is a schematic illustration of a head-mounted display.

Any of the optical systems or display systems of the present description may be used in a device such as a head-mounted display (e.g., a virtual reality display). FIG. 19 is a schematic top view of head-mounted display 1790 including a frame 1792, and first and second display portions 1794a and 1794b. First and second display portions 1794a and 1794b include outer surfaces 1782a and 1782b, respectively, and inner surfaces 1784a and 1784b, respectively. Each of the first and second display portions 1794a and 1794b may include an optical system or a display system of the present description. For example, first display portion 1794a (and similarly for second display portion 1794b) may include the optical system 1000 with a display panel (corresponding to object 100) adjacent the outer surface 1782a, and the optical lens 210 facing the inner surface 1784a. In some embodiments, a single display panel spanning portions 1794a and 1794b may be used instead of separate display panels. Head-mounted display 1790 may further include a camera and/or an eye tracking system as described further in U.S. Pat. Appl. Pub. No. 2017/0068100 (Ouderkirk et al.), previously incorporate herein by reference.

The following is a list of exemplary embodiments of the present description.

Embodiment 1 is an optical system for transmitting light, comprising:

one or more optical lenses having at least one curved major surface;

a first retarder layer having a first wavelength dispersion curve in a predetermined wavelength range;

a reflective polarizer disposed on and conforming to a major surface of the one or more optical lenses, the reflective polarizer substantially reflecting light having a first polarization state and substantially transmitting light having an orthogonal second polarization state in the predetermined wavelength range;

a partial reflector disposed on and conforming to a major surface of the one or more optical lenses between the first retarder layer and the reflective polarizer, the partial reflector having an average optical reflectance of at least 20% in the predetermined wavelength range; and a second retarder layer disposed between the partial reflector and the reflective polarizer and having a second wavelength dispersion curve, different than the first wavelength dispersion curve, in the predetermined wavelength range.

Embodiment 2 is the optical system of Embodiment 1, wherein the first and second wavelength dispersion curves intersect each other at at least one wavelength in the predetermined wavelength range.

Embodiment 3 is the optical system of Embodiment 1, wherein at least one of the first and second dispersion curves changes monotonically with increasing wavelength in the predetermined wavelength range.

Embodiment 4 is the optical system of Embodiment 1, wherein at least one of the first and second dispersion curves comprises at least one peak in, and away from lower and upper limits of, the predetermined wavelength range.

Embodiment 5 is the optical system of Embodiment 1, wherein for at least one wavelength in the predetermined wavelength range, at least one of the first and second retarder layers has a substantially uniform retardance across a first region of the retarder layer and a non-uniform retardance across a different second region of the retarder layer.

Embodiment 6 is the optical system of Embodiment 5, wherein the first region is an interior region and the second region is a perimeter region substantially surrounding the interior region.

Embodiment 7 is the optical system of Embodiment 1, wherein the first retarder layer is substantially a quarter-wave retarder for a first wavelength in the predetermined wavelength range, and the second retarder layer is substantially a quarter-wave retarder for a different second wavelength in the predetermined wavelength range.

Embodiment 8 is the optical system of Embodiment 7 having a maximum contrast ratio at a predetermined wavelength different than the first and second wavelengths.

Embodiment 9 is the optical system of Embodiment 7, wherein the first retarder layer has a retardance substantially different from quarter wave at the second wavelength.

Embodiment 10 is the optical system of Embodiment 7, wherein the second retarder layer has a retardance substantially different from quarter wave at the first wavelength.

Embodiment 11 is the optical system of Embodiment 1, wherein the optical system has a maximum contrast ratio at a predetermined wavelength in the predetermined wavelength range, the optical system having an optical axis intersecting the first retarder layer at an origin, a light ray propagating along the optical axis passing through the one or more optical lenses, the partial reflector, the reflective polarizer and the first and second retarder layers without being substantially refracted, such that for a light ray and having the first polarization state and the predetermined wavelength passing through the origin, the first retarder layer converts the light ray to an elliptically polarized light for the light ray propagating along the optical axis, and to a circularly polarized light for the light ray propagating along a direction oblique to the optical axis.

Embodiment 12 is the optical system of Embodiment 1 having an optical axis intersecting the first retarder layer at an origin, a light ray propagating along the optical axis passing through the one or more optical lenses, the partial reflector, the reflective polarizer and the first and second retarder layers without being substantially refracted, wherein at a predetermined wavelength in the predetermined wavelength range, the first retarder layer has a first retardance at the origin and a different second retardance at at least one other location.

Embodiment 13 is the optical system of Embodiment 1, wherein the first retarder layer has a first physical thickness at at least one first location and a different second physical thickness at at least one different second location.

Embodiment 14 is the optical system of Embodiment 1, wherein the first retarder layer is a unitary retarder.

Embodiment 15 is the optical system of Embodiment 1, wherein the second retarder layer is a unitary retarder.

Embodiment 16 is the optical system of Embodiment 1, wherein the one or more optical lenses has a non-zero optical power.

Embodiment 17 is the optical system of Embodiment 1, wherein the at least one curved major surface has a radius of curvature in a range from about 6 mm to about 1000 mm.

Embodiment 18 is the optical system of Embodiment 1, wherein the first retarder layer has at at least one first location, a first orientation relative to the first polarization state and a first retardance at a predetermined wavelength in the predetermined wavelength range, and at at least one different second location, a different second orientation relative to the first polarization state and a different second retardance at the predetermined wavelength.

Embodiment 19 is the optical system of Embodiment 1, wherein the first retarder layer comprises at least first and second stacked retarder layers, wherein at a predetermined wavelength in the predetermined wavelength range and for at least one location on the first retarder layer, one of the at least first and second stacked retarder layers has a positive retardance and the other of the of the at least first and second stacked retarder layers has a negative retardance.

Embodiment 20 is the optical system of Embodiment 1, wherein the second retarder layer comprises at least first and second stacked retarder layers, wherein at a predetermined wavelength in the predetermined wavelength range and for at least one location on the second retarder layer, one of the at least first and second stacked retarder layers has a positive retardance and the other of the of the at least first and second stacked retarder layers has a negative retardance.

Embodiment 21 is the optical system of Embodiment 1, wherein the first retarder layer has a uniform physical thickness and a variable orientation, and the second retarder layer has a uniform orientation and a variable physical thickness.

Embodiment 22 is the optical system of Embodiment 1, wherein the second retarder layer has a uniform physical thickness and a variable orientation, and the first retarder layer has a uniform orientation and a variable physical thickness.

Embodiment 23 is the optical system of Embodiment 1, wherein the predetermined wavelength range comprises at least one visible wavelength range.

Embodiment 24 is the optical system of Embodiment 1, wherein the predetermined wavelength range is from 400 nm to 700 nm.

Embodiment 25 is the optical system of Embodiment 1, wherein the predetermined wavelength range comprises an infrared wavelength range.

Embodiment 26 is the optical system of Embodiment 1, wherein at least one of the first and second retarder layers is substantially planar.

Embodiment 27 is the optical system of Embodiment 1, wherein each of the first and second retarder layers is substantially planar.

Embodiment 28 is the optical system of Embodiment 1, wherein at least one of the first and second retarder layers is curved about two orthogonal axes.

Embodiment 29 is the optical system of Embodiment 1, wherein at each of the first and second retarder layers is curved about two orthogonal axes.

Embodiment 30 is the optical system of Embodiment 1 further comprising a display emitting an image, wherein the optical system has a maximum contrast ratio at a predetermined wavelength in the predetermined wavelength range, the optical system having an optical axis, a light ray emitted by the display propagating along the optical axis passing through the one or more optical lenses, the partial reflector, the reflective polarizer and the first and second retarder layers without being substantially refracted, such that for an emitted chief light ray having the first polarization state at the predetermined wavelength, the first retarder layer converts the chief light ray to a circularly polarized light for the chief light ray emitted from an edge of the image, and to an elliptically polarized light for the chief light ray propagating along the optical axis.

Embodiment 31 is the optical system of Embodiment 1 further comprising a display, wherein the optical system has a maximum contrast ratio at a predetermined wavelength in the predetermined wavelength range, the optical system having an optical axis, a light ray emitted by the display propagating along the optical axis passing through the one or more optical lenses, the partial reflector, the reflective polarizer and the first and second retarder layers without being substantially refracted, such that for a plurality of chief light rays emitted by the display, each chief light ray having the first polarization state at the predetermined wavelength and a different separation from the optical axis, the first retarder layer converts the chief light ray to a circularly polarized light.

Embodiment 32 is the optical system of Embodiment 1 further comprising a display, wherein the optical system has a maximum contrast ratio at a predetermined wavelength in the predetermined wavelength range, the optical system having an optical axis, a light ray emitted by the display propagating along the optical axis passing through the one or more optical lenses, the partial reflector, the reflective polarizer and the first and second retarder layers without being substantially refracted, such that for a plurality of chief light rays emitted by the display, each chief light ray having the first polarization state at the predetermined wavelength and a different separation from the optical axis, the first retarder layer has a retardance within 10% of one fourth of the predetermined wavelength.

Embodiment 33 is the optical system of Embodiment 1, wherein the optical system has a maximum contrast ratio at a predetermined wavelength in the predetermined wavelength range, the optical system having an optical axis, a light ray propagating along the optical axis passing through the one or more optical lenses, the partial reflector, the reflective polarizer and the first and second retarder layers without being substantially refracted, such that relative to the first polarization state, the first retarder layer has a substantially uniform orientation and non-uniform retardance across the first retarder layer, and the second retarder layer has a substantially uniform retardance and non-uniform orientation across the second retarder layer.

Embodiment 34 is the optical system of Embodiment 1, wherein the optical system has a maximum contrast ratio at a predetermined wavelength in the predetermined wavelength range, the optical system having an optical axis, a light ray propagating along the optical axis passing through the one or more optical lenses, the partial reflector, the reflective polarizer and the first and second retarder layers without being substantially refracted, such that relative to the first polarization state, the first retarder layer has a substantially uniform orientation and uniform retardance across the first retarder layer, and the second retarder layer has a substantially non-uniform retardance and non-uniform orientation across the second retarder layer.

Embodiment 35 is the optical system of Embodiment 1, wherein each location on the reflective polarizer has corresponding mutually orthogonal pass and block polarization states, the optical system having a maximum contrast ratio at a predetermined wavelength in the predetermined wavelength range, the optical system having an optical axis intersecting the first retarder layer at a first origin and the reflective polarizer at a second origin, a light ray propagating along the optical axis passing through the one or more optical lenses, the partial reflector, the reflective polarizer and the first and second retarder layers without being substantially refracted, such that for a light ray having the predetermined wavelength and the block polarization state of the reflective polarizer at the second origin and first incident on the first retarder layer at the first origin and making an angle θ with the optical axis, the light ray is substantially reflected when first incident on the reflective polarizer at a first location and substantially transmitted when second incident on the reflective polarizer at a second location, a difference between the polarization state of the light ray and the pass polarization state of the reflective polarizer at the second location being greater when θ is zero and less when θ is not zero.

Embodiment 36 is the optical system of Embodiment 1 further comprising a display, wherein each location on the reflective polarizer has corresponding mutually orthogonal pass and block polarization states, the optical system having a maximum contrast ratio at a predetermined wavelength in the predetermined wavelength range, the optical system having an optical axis, a light ray emitted by the display propagating along the optical axis passing through the one or more optical lenses, the partial reflector, the reflective polarizer and the first and second retarder layers without being substantially refracted, such that for a plurality of chief light rays emitted by the display, each chief light ray having the predetermined wavelength and the first polarization state and emitted at a different separation from the optical axis, the chief ray is substantially reflected when first incident on the reflective polarizer at a first location thereon and substantially transmitted when second incident on the reflective polarizer at a second location thereon, a difference between the polarization state of the chief ray at the second location and the pass polarization state of the reflective polarizer at the second location being less than about 0.07.

Embodiment 37 is the optical system of Embodiment 1 further comprising:
a display; and
an exit pupil,
wherein the optical system has a maximum contrast ratio at a predetermined wavelength in the predetermined wavelength range, the optical system having an optical axis, a light ray emitted by the display propagating along the optical axis passing through the one or more optical lenses, the partial reflector, the reflective polarizer and the first and second retarder layers without being substantially refracted, such that at the predetermined wavelength and the first polarization state and for each location in a plurality of locations on the display, the display emits a cone of light rays substantially filling the exit pupil, the cone of light rays passing through the first and second retarder layers over respective first and second incident areas, such that an average retardance of each of the first and second retarder layers over the respective first and second incident areas is within 10% of one fourth of the predetermined wavelength.

Embodiment 38 is the optical system of Embodiment 1, wherein the optical system has a maximum contrast ratio at a predetermined wavelength in the predetermined wavelength range, the optical system having an optical axis intersecting the first retarder layer at a first origin and the reflective polarizer at a second origin, a light ray propagating along the optical axis passing through the one or more optical lenses, the partial reflector, the reflective polarizer and the first and second retarder layers without being substantially refracted, the reflective polarizer having orthogonal pass and block polarization states at the second origin, such that for a first light ray propagating along the optical axis and incident on the first retarder layer at the first origin having the predetermined wavelength and the block polarization state, the first light ray comprises the first polarization state when first incident on the reflective polarizer and the second polarization state when second incident on the reflective polarizer, a difference between the first polarization state and block polarization states being less than a difference between the second and pass polarization states.

Embodiment 39 is the optical system of Embodiment 1, wherein the optical system has an optical axis intersecting the first retarder layer at a first origin and the second retarder layer at a second origin, a light ray propagating along the optical axis passing through the one or more optical lenses, the partial reflector, the reflective polarizer and the first and second retarder layers without being substantially refracted, wherein a fast axis of the first retarder layer at the first origin is substantially parallel to a fast axis of the second retarder layer at the second origin.

Embodiment 40 is the optical system of Embodiment 1, wherein the optical system has an optical axis intersecting the first retarder layer at a first origin and the second retarder layer at a second origin, a light ray propagating along the optical axis passing through the one or more optical lenses, the partial reflector, the reflective polarizer and the first and second retarder layers without being substantially refracted, wherein a fast axis of the first retarder layer at the first origin is substantially perpendicular to a fast axis of the second retarder layer at the second origin.

Embodiment 41 is the optical system of Embodiment 1, wherein for at least one light ray incident on the optical system, the light ray intersects the first and second retarder layers at respective first and second locations, and wherein in plan view, a fast axis of the first retarder layer at the first location is substantially parallel to a fast axis of the second retarder layer at the second location.

Embodiment 42 is the optical system of Embodiment 1, wherein for at least one light ray incident on the optical system, the light ray intersects the first and second retarder layers at respective first and second locations, and wherein in plan view, a fast axis of the first retarder layer at the first location is substantially perpendicular to a fast axis of the second retarder layer at the second location.

Embodiment 43 is the optical system of Embodiment 1, wherein for at least a first and a second light ray incident on the optical system, the first light ray intersects the first and second retarder layers at respective first and second locations, the second light ray intersects the first and second retarder at respective third and fourth locations, and wherein in plan view: a fast axis of the first retarder layer at the first location and a fast axis of the second retarder layer at the second location make a first angle with each other, and a fast axis of the first retarder layer at the third location and a fast axis of the second retarder layer at the fourth location make a second angle with each other.

Embodiment 44 is the optical system of Embodiment 43, wherein the first and second angles are substantially equal.

Embodiment 45 is the optical system of Embodiment 43, wherein the first and second angles are different.

Embodiment 46 is the optical system of Embodiment 43, wherein the first and second angles are within 5 degrees of each other.

Embodiment 47 is the optical system of Embodiment 43, wherein each of the first and second angles is no more than 10 degrees.

Embodiment 48 is the optical system of Embodiment 43, wherein each of the first and second angles is in a range of 80 to 100 degrees.

Embodiment 49 is an optical system for displaying an object to a viewer, comprising:
one or more optical lenses having at least one curved major surface;
a reflective polarizer disposed on and conforming to a first major surface of the one or more optical lenses, the reflective polarizer substantially reflecting light having a first polarization state and substantially transmitting light having an orthogonal second polarization state in a predetermined wavelength range;
a partial reflector disposed on and conforming to a different second major surface of the one or more optical lenses, the partial reflector having an average optical reflectance of at least 20% in the predetermined wavelength range;
a first retarder layer disposed on and conforming to a third major surface of the one or more optical lenses; and
a second retarder layer disposed on and conforming to a fourth major surface, different than the third major surface, of the one or more optical lenses, wherein for at least one wavelength in the predetermined wavelength range, at least one of the first and second retarder layers has a substantially uniform retardance across a first region of the retarder layer and a non-uniform retardance across a different second region of the retarder layer.

Embodiment 50 is the optical system of Embodiment 49, wherein the first region is an interior region and the second region is a perimeter region substantially surrounding the interior region.

Embodiment 51 is the optical system of Embodiment 49, wherein the first retarder layer has a first wavelength dispersion curve in the predetermined wavelength range, and the second retarder layer has a second wavelength dispersion curve, different than the first wavelength dispersion curve, in the predetermined wavelength range.

Embodiment 52 is the optical system of Embodiment 49, wherein the optical system has a maximum contrast ratio at a predetermined wavelength in the predetermined wavelength range, the optical system having an optical axis intersecting the first retarder layer at an origin, a light ray propagating along the optical axis passing through the one or more optical lenses, the partial reflector, the reflective polarizer and the first and second retarder layers without being substantially refracted, such that for a light ray having the first polarization state at the predetermined wavelength passing through the origin, the first retarder layer converts the light ray to an elliptically polarized light for the light ray propagating along the optical axis, and to a circularly polarized light for the light ray propagating along a direction oblique to the optical axis.

Embodiment 53 is the optical system of Embodiment 49 having an optical axis intersecting the first retarder layer at an origin, a light ray propagating along the optical axis passing through the one or more optical lenses, the partial reflector, the reflective polarizer and the first and second retarder layers without being substantially refracted, wherein at a predetermined wavelength in the predetermined wavelength range, the first retarder layer has a first retardance at the origin and a different second retardance at at least one other location.

Embodiment 54 is the optical system of Embodiment 49, wherein the first retarder layer has a first physical thickness at at least one first location and a different second physical thickness at at least one different second locations.

Embodiment 55 is the optical system of Embodiment 49, wherein each of the first and second retarder layers is a unitary retarder.

Embodiment 56 is the optical system of Embodiment 49, wherein the one or more optical lenses has a non-zero optical power.

Embodiment 57 is the optical system of Embodiment 49, wherein the at least one curved major surface has a radius of curvature in a range from about 6 mm to about 1000 mm.

Embodiment 58 is the optical system of Embodiment 49, wherein at least one of the first and second retarder layers has at at least one first location, a first orientation relative to the first polarization state and a first retardance at a predetermined wavelength in the predetermined wavelength range, and at at least one different second location, a different second orientation relative to the first polarization state and a different second retardance at the predetermined wavelength.

Embodiment 59 is the optical system of Embodiment 49, wherein the first retarder layer comprises at least first and second stacked retarder layers, wherein at a predetermined wavelength in the predetermined wavelength range and for at least one location on the first retarder layer, one of the at least first and second stacked retarder layers has a positive retardance and the other of the of the at least first and second stacked retarder layers has a negative retardance.

Embodiment 60 is the optical system of Embodiment 49, wherein the first retarder layer has a uniform physical thickness and a variable orientation, and the second retarder layer has a uniform orientation and a variable physical thickness.

Embodiment 61 is the optical system of Embodiment 49 further comprising a display emitting an image, wherein the optical system has a maximum contrast ratio at a predetermined wavelength in the predetermined wavelength range, the optical system having an optical axis, a light ray emitted by the display propagating along the optical axis passing through the one or more optical lenses, the partial reflector, the reflective polarizer and the first and second retarder layers without being substantially refracted, such that for an emitted chief light ray having the first polarization state at the predetermined wavelength, the first retarder layer converts the chief light ray to a circularly polarized light for the chief light ray emitted from an edge of the image, and to an elliptically polarized light for the chief light ray propagating along the optical axis.

Embodiment 62 is the optical system of Embodiment 49 further comprising a display emitting, wherein the optical system has a maximum contrast ratio at a predetermined wavelength in the predetermined wavelength range, the optical system having an optical axis, a light ray emitted by the display propagating along the optical axis passing through the one or more optical lenses, the partial reflector, the reflective polarizer and the first and second retarder layers without being substantially refracted, such that for a plurality of chief light rays emitted by the display, each chief light ray having the first polarization state at the predetermined wavelength and a different separation from the optical axis, the first retarder layer converts the chief light ray to a circularly polarized light.

Embodiment 63 is the optical system of Embodiment 49 further comprising a display, wherein the optical system has a maximum contrast ratio at a predetermined wavelength in the predetermined wavelength range, the optical system having an optical axis, a light ray emitted by the display propagating along the optical axis passing through the one or more optical lenses, the partial reflector, the reflective polarizer and the first and second retarder layers without being substantially refracted, such that for a plurality of chief light rays emitted by the display, each chief light ray having the first polarization state at the predetermined wavelength and a different separation from the optical axis, the first retarder layer has a retardance within 10% of one fourth of the predetermined wavelength.

Embodiment 64 is the optical system of Embodiment 49, wherein the optical system has a maximum contrast ratio at a predetermined wavelength in the predetermined wavelength range, the optical system having an optical axis, a light ray propagating along the optical axis passing through the one or more optical lenses, the partial reflector, the reflective polarizer and the first and second retarder layers without being substantially refracted, such that relative to the first polarization state, the first retarder layer has a substantially uniform orientation and non-uniform retardance across the first retarder layer, and the second retarder layer has a substantially uniform retardance and non-uniform orientation across the second retarder layer.

Embodiment 65 is the optical system of Embodiment 49, wherein the optical system has a maximum contrast ratio at a predetermined wavelength in the predetermined wavelength range, the optical system having an optical axis, a light ray propagating along the optical axis passing through the one or more optical lenses, the partial reflector, the reflective polarizer and the first and second retarder layers without being substantially refracted, such that relative to the first polarization state, the first retarder layer has a substantially uniform orientation and uniform retardance across the first retarder layer, and the second retarder layer has a substantially non-uniform retardance and non-uniform orientation across the second retarder layer.

Embodiment 66 is the optical system of Embodiment 49, wherein each location on the reflective polarizer has corresponding mutually orthogonal pass and block polarization states, the optical system having a maximum contrast ratio at a predetermined wavelength in the predetermined wavelength range, the optical system having an optical axis intersecting the first retarder layer at a first origin and the reflective polarizer at a second origin, a light ray propagating along the optical axis passing through the one or more optical lenses, the partial reflector, the reflective polarizer and the first and second retarder layers without being substantially refracted, such that for a light ray having the predetermined wavelength and the block polarization state of the reflective polarizer at the second origin and first incident on the first retarder layer at the first origin and making an angle $\theta$ with the optical axis, the light ray is substantially reflected when first incident on the reflective polarizer at a first location and substantially transmitted when second incident on the reflective polarizer at a second location, a difference between the polarization state of the light ray and the pass polarization state of the reflective polarizer at the second location being greater when $\theta$ is zero and less when $\theta$ is not zero.

Embodiment 67 is the optical system of Embodiment 49 further comprising a display, wherein each location on the reflective polarizer has corresponding mutually orthogonal pass and block polarization states, the optical system having a maximum contrast ratio at a predetermined wavelength in the predetermined wavelength range, the optical system having an optical axis, a light ray emitted by the display propagating along the optical axis passing through the one or more optical lenses, the partial reflector, the reflective polarizer and the first and second retarder layers without being substantially refracted, such that for a plurality of chief light rays emitted by the display, each chief light ray having the predetermined wavelength and the first polarization state and emitted at a different separation from the optical axis, the chief ray is substantially reflected when first incident on the reflective polarizer at a first location thereon and substantially transmitted when second incident on the reflective polarizer at a second location thereon, a difference between the polarization state of the chief ray at the second location and the pass polarization state of the reflective polarizer at the second location being less than about 0.07.

Embodiment 68 is the optical system of Embodiment 49 further comprising:
- a display emitting; and
- an exit pupil,
- wherein the optical system has a maximum contrast ratio at a predetermined wavelength in the predetermined wavelength range, the optical system having an optical axis, a light ray emitted by the display propagating along the optical axis passing through the one or more optical lenses, the partial reflector, the reflective polarizer and the first and second retarder layers without being substantially refracted, such that at the predetermined wavelength and the first polarization state and for each location in a plurality of locations on the display, the display emits a cone of light rays substantially filling the exit pupil, the cone of light rays passing through the first and second retarder layers over respective first and second incident areas, such that an average retardance of each of the first and second retarder layers over the respective first and second incident areas is within 10% of one fourth of the predetermined wavelength.

Embodiment 69 is the optical system of Embodiment 49 having a maximum contrast ratio at a predetermined wavelength in the predetermined wavelength range, the optical system having an optical axis intersecting the first retarder layer at a first origin and the reflective polarizer at a second origin, a light ray propagating along the optical axis passing through the one or more optical lenses, the partial reflector, the reflective polarizer and the first and second retarder layers without being substantially refracted, the reflective polarizer having orthogonal pass and block polarization states at the second origin, such that for a first light ray propagating along the optical axis and incident on the first retarder layer at the first origin having the predetermined wavelength and the block polarization state, the first light ray comprises the first polarization state when first incident on the reflective polarizer and the second polarization state when second incident on the reflective polarizer, a difference between the first and block polarization states being less than a difference between the second and pass polarization states.

Embodiment 70 is the optical system of Embodiment 49, wherein for at least one light ray incident on the optical system, the light ray intersects the first and second retarder layers at respective first and second locations, and wherein in plan view, a fast axis of the first retarder layer at the first location is substantially parallel to a fast axis of the second retarder layer at the second location.

Embodiment 71 is the optical system of Embodiment 49, wherein for at least one light ray incident on the optical system, the light ray intersects the first and second retarder layers at respective first and second locations, and wherein in plan view, a fast axis of the first retarder layer at the first location is substantially perpendicular to a fast axis of the second retarder layer at the second location.

Embodiment 72 is the optical system of Embodiment 49, wherein for at least a first and a second light ray incident on the optical system, the first light ray intersects the first and second retarder layers at respective first and second locations, the second light ray intersects the first and second retarder at respective third and fourth locations, and wherein in plan view: a fast axis of the first retarder layer at the first location and a fast axis of the second retarder layer at the second location make a first angle with each other, and a fast axis of the first retarder layer at the third location and a fast axis of the second retarder layer at the fourth location make a second angle with each other.

Embodiment 73 is the optical system of Embodiment 72, wherein the first and second angles are substantially equal.

Embodiment 74 is the optical system of Embodiment 72, wherein the first and second angles are different.

Embodiment 75 is the optical system of Embodiment 72, wherein the first and second angles are within 5 degrees of each other.

Embodiment 76 is the optical system of Embodiment 72, wherein each of the first and second angles is no more than 10 degrees.

Embodiment 77 is the optical system of Embodiment 72, wherein each of the first and second angles is in a range of 80 to 100 degrees.

Embodiment 78 is an optical system for displaying an object to a viewer, comprising:
- one or more optical lenses having at least one curved major surface;
- a reflective polarizer disposed on and conforming to a major surface of the one or more optical lenses, the reflective polarizer substantially reflecting light having a first polarization state and substantially transmitting light having an orthogonal second polarization state in a predetermined wavelength range;
- a partial reflector disposed on and conforming to a major surface of the one or more optical lenses, the partial reflector having an average optical reflectance of at least 20% in the predetermined wavelength range;
- a first and second spaced apart retarder layers disposed on and conforming to different major surfaces of the one or more optical lenses, the first retarder layer being substantially a quarter-wave retarder for a first wavelength in the predetermined wavelength range, and the second retarder layer being substantially a quarter-wave retarder for a different second wavelength in the predetermined wavelength range.

Embodiment 79 is the optical system of Embodiment 78 having a maximum contrast ratio at a predetermined wavelength different than the first and second wavelengths.

Embodiment 80 is the optical system of Embodiment 78, wherein the first retarder layer has a retardance substantially different from quarter wave at the second wavelength.

Embodiment 81 is the optical system of Embodiment 78, wherein the second retarder layer has a retardance substantially different from quarter wave at the first wavelength.

Embodiment 82 is the optical system of Embodiment 78, wherein each of the first and second retarder layers are chromatic retarders.

Embodiment 83 is the optical system of Embodiment 78, wherein the first retarder layer has a first wavelength dispersion curve changing monotonically with increasing wavelength in the predetermined wavelength range, and the second retarder layer has a different second wavelength dispersion curve changing monotonically with increasing wavelength in the predetermined wavelength range.

Embodiment 84 is the optical system of Embodiment 78, wherein each of the first and second retarder layers has a uniform orientation.

Embodiment 85 is the optical system of Embodiment 78, wherein at least one of the first and second retarder layers has a non-uniform orientation.

Embodiment 86 is the optical system of Embodiment 78, wherein the optical system has a maximum contrast ratio at a predetermined wavelength in the predetermined wavelength range, the optical system having an optical axis intersecting the first retarder layer at an origin, a light ray propagating along the optical axis passing through the one or more optical lenses, the partial reflector, the reflective polarizer and the first and second retarder layers without being substantially refracted, such that for a light ray having the first polarization state at the predetermined wavelength passing through the origin, the first retarder layer converts the light ray to an elliptically polarized light for the light ray propagating along the optical axis, and to a circularly polarized light for the light ray propagating along a direction oblique to the optical axis.

Embodiment 87 is the optical system of Embodiment 78, wherein the one or more optical lenses has a non-zero optical power.

Embodiment 88 is the optical system of Embodiment 78, wherein the at least one curved major surface has a radius of curvature in a range from about 6 mm to about 1000 mm.

Embodiment 89 is the optical system of Embodiment 78 further comprising a display emitting the image, wherein the optical system has a maximum contrast ratio at a predetermined wavelength in the predetermined wavelength range, the optical system having an optical axis, a light ray emitted by the display propagating along the optical axis passing through the one or more optical lenses, the partial reflector, the reflective polarizer and the first and second retarder layers without being substantially refracted, such that for an emitted chief light ray having the first polarization state at the predetermined wavelength, the first retarder layer converts the chief light ray to a circularly polarized light for the chief light ray emitted from an edge of the image, and to an elliptically polarized light for the chief light ray propagating along the optical axis.

Embodiment 90 is the optical system of Embodiment 78 further comprising a display, wherein the optical system has a maximum contrast ratio at a predetermined wavelength in the predetermined wavelength range, the optical system having an optical axis, a light ray emitted by the display propagating along the optical axis passing through the one or more optical lenses, the partial reflector, the reflective polarizer and the first and second retarder layers without being substantially refracted, such that for a plurality of chief light rays emitted by the display, each chief light ray having the first polarization state at the predetermined wavelength and a different separation from the optical axis, the first retarder layer converts the chief light ray to a circularly polarized light.

Embodiment 91 is the optical system of Embodiment 78, wherein each location on the reflective polarizer has corresponding mutually orthogonal pass and block polarization states, the optical system having a maximum contrast ratio at a predetermined wavelength in the predetermined wavelength range, the optical system having an optical axis intersecting the first retarder layer at a first origin and the reflective polarizer at a second origin, a light ray propagating along the optical axis passing through the one or more optical lenses, the partial reflector, the reflective polarizer and the first and second retarder layers without being substantially refracted, such that for a light ray having the predetermined wavelength and the block polarization state of the reflective polarizer at the second origin and first incident on the first retarder layer at the first origin and making an angle θ with the optical axis, the light ray is substantially reflected when first incident on the reflective polarizer at a first location and substantially transmitted when second incident on the reflective polarizer at a second location, a difference between the polarization state of the light ray and the pass polarization state of the reflective polarizer at the second location being greater when θ is zero and less when θ is not zero.

Embodiment 92 is the optical system of Embodiment 78 further comprising a display, wherein each location on the reflective polarizer has corresponding mutually orthogonal pass and block polarization states, the optical system having a maximum contrast ratio at a predetermined wavelength in the predetermined wavelength range, the optical system having an optical axis, a light ray emitted by the display propagating along the optical axis passing through the one or more optical lenses, the partial reflector, the reflective polarizer and the first and second retarder layers without being substantially refracted, such that for a plurality of chief light rays emitted by the display, each chief light ray having the predetermined wavelength and the first polarization state and emitted at a different separation from the optical axis, the chief ray is substantially reflected when first incident on the reflective polarizer at a first location thereon and substantially transmitted when second incident on the reflective polarizer at a second location thereon, a difference between the polarization state of the chief ray at the second location and the pass polarization state of the reflective polarizer at the second location being less than about 0.07.

Embodiment 93 is the optical system of Embodiment 78 having a maximum contrast ratio at a predetermined wavelength in the predetermined wavelength range, the optical system having an optical axis intersecting the first retarder layer at a first origin and the reflective polarizer at a second origin, a light ray propagating along the optical axis passing through the one or more optical lenses, the partial reflector, the reflective polarizer and the first and second retarder layers without being substantially refracted, the reflective polarizer having orthogonal pass and block polarization states at the second origin, such that for a first light ray propagating along the optical axis and incident on the first retarder layer at the first origin having the predetermined wavelength and the block polarization state, the first light ray comprises the first polarization state when first incident on the reflective polarizer and the second polarization state when second incident on the reflective polarizer, a difference between the first and block polarization states being less than a difference between the second and pass polarization states.

Embodiment 94 is the optical system of Embodiment 78, wherein for at least one light ray incident on the optical system, the light ray intersects the first and second retarder layers at respective first and second locations, and wherein in plan view, a fast axis of the first retarder layer at the first location is substantially parallel to a fast axis of the second retarder layer at the second location.

Embodiment 95 is the optical system of Embodiment 78, wherein for at least one light ray incident on the optical system, the light ray intersects the first and second retarder layers at respective first and second locations, and wherein in plan view, a fast axis of the first retarder layer at the first location is substantially perpendicular to a fast axis of the second retarder layer at the second location.

Embodiment 96 is the optical system of Embodiment 78, wherein for at least a first and a second light ray incident on the optical system, the first light ray intersects the first and second retarder layers at respective first and second locations, the second light ray intersects the first and second retarder at respective third and fourth locations, and wherein in plan view: a fast axis of the first retarder layer at the first location and a fast axis of the second retarder layer at the second location make a first angle with each other, and a fast axis of the first retarder layer at the third location and a fast axis of the second retarder layer at the fourth location make a second angle with each other.

Embodiment 97 is the optical system of Embodiment 96, wherein the first and second angles are substantially equal.

Embodiment 98 is the optical system of Embodiment 96, wherein the first and second angles are different.

Embodiment 99 is the optical system of Embodiment 96, wherein the first and second angles are within 5 degrees of each other.

Embodiment 100 is the optical system of Embodiment 96, wherein each of the first and second angles is no more than 10 degrees.

Embodiment 101 is the optical system of Embodiment 96, wherein each of the first and second angles is in a range of 80 to 100 degrees.

Embodiment 102 is an optical system for displaying an object to a viewer and having a maximum contrast ratio at a predetermined wavelength, the optical system comprising:
one or more optical lenses having at least one curved major surface;
a reflective polarizer disposed on and conforming to a first major surface of the one or more optical lenses, the reflective polarizer substantially reflecting light having a first polarization state and substantially transmitting light having an orthogonal second polarization state at the predetermined wavelength;
a partial reflector disposed on and conforming to a different second major surface of the one or more optical lenses, the partial reflector having an average optical reflectance of at least 20% at the predetermined wavelength; and
a first retarder layer disposed on and conforming to a major surface of the one or more optical lenses, the optical system having an optical axis intersecting the first retarder layer at an origin, a light ray propagating along the optical axis passing through the one or more optical lenses, the partial reflector, the reflective polarizer and the first retarder layer without being substantially refracted, such that for a light ray having the first polarization state at the predetermined wavelength passing through the origin, the first retarder layer converts the light ray to an elliptically polarized light for the light ray propagating along the optical axis, and to a circularly polarized light for the light ray propagating along a direction oblique to the optical axis.

Embodiment 103 is the optical system of Embodiment 102, wherein at least one curved major surface of the one or more optical lenses has a radius of curvature in a range from about 6 mm to about 1000 mm.

Embodiment 104 is the optical system of Embodiment 102, wherein the maximum contrast ratio at the predetermined wavelength is a local maximum within 20 nm of the predetermined wavelength.

Embodiment 105 is the optical system of Embodiment 102, wherein the maximum contrast ratio at the predetermined wavelength is a global maximum within 150 nm of the predetermined wavelength.

Embodiment 106 is the optical system of Embodiment 102, wherein the predetermined wavelength is about 550 nm.

Embodiment 107 is the optical system of Embodiment 102, wherein the predetermined wavelength is between about 545 nm and about 555 nm.

Embodiment 108 is the optical system of Embodiment 102, wherein the predetermined wavelength is about 450 nm.

Embodiment 109 is the optical system of Embodiment 102, wherein the predetermined wavelength is a primary color wavelength.

Embodiment 110 is the optical system of Embodiment 102, wherein the first retarder layer has a fast optical axis making an angle $\beta$ with the first polarization state, $\beta$ being less than 45 degrees.

Embodiment 111 is the optical system of Embodiment 102, wherein at the predetermined wavelength, the first retarder layer has a first optical thickness at the origin and a different second optical thickness at at least one other location for one of an effective fast optical axis of the first retarder layer or an effective slow optical axis of the first retarder layer.

Embodiment 112 is the optical system of Embodiment 111, wherein the effective fast or slow optical axis is the effective fast optical axis.

Embodiment 113 is the optical system of Embodiment 111, wherein the effective fast or slow optical axis is the effective slow optical axis.

Embodiment 114 is the optical system of Embodiment 111, wherein the first retarder layer has a first physical thickness at the origin and a different second physical thickness at at least one of the at least one other location.

Embodiment 115 is the optical system of Embodiment 111, wherein the first retarder layer has a first fast optical axis refractive index at the origin and a different second fast optical axis refractive index at at least one of the at least one other location.

Embodiment 116 is the optical system of Embodiment 111, wherein the first retarder layer has a first slow optical axis refractive index at the origin and a different second slow optical axis refractive index at at least one of the at least one other location.

Embodiment 117 is the optical system of Embodiment 102, wherein at the predetermined wavelength, the first retarder layer has a first retardance at the origin and a different second retardance at at least one other location.

Embodiment 118 is the optical system of Embodiment 102, wherein the one or more optical lenses has a non-zero optical power.

Embodiment 119 is the optical system of Embodiment 102 further comprising a second retarder layer disposed between the partial reflector and the reflective polarizer.

Embodiment 120 is the optical system of Embodiment 119, wherein the first retarder layer has a first wavelength dispersion curve and the second retarder layer has a different second wavelength dispersion curve.

Embodiment 121 is the optical system of Embodiment 119, wherein at the predetermined wavelength, at least one of the first and second retarder layers has a substantially uniform retardance across a first region of the retarder layer and a non-uniform retardance across a different second region of the retarder layer.

Embodiment 122 is the optical system of Embodiment 119, wherein the first retarder layer is substantially a quarter-wave retarder for a first wavelength in a predetermined wavelength range containing the predetermined wavelength, and the second retarder layer is substantially a quarter-wave retarder for a different second wavelength in the predetermined wavelength range.

Embodiment 123 is the optical system of Embodiment 119, wherein the first retarder layer has a uniform physical thickness and a variable orientation, and the second retarder layer has a uniform orientation and a variable physical thickness.

Embodiment 124 is the optical system of Embodiment 119, wherein the second retarder layer has a uniform physical thickness and a variable orientation, and the first retarder layer has a uniform orientation and a variable physical thickness.

Embodiment 125 is the optical system of Embodiment 119, wherein relative to the first polarization state, the first retarder layer has a substantially uniform orientation and non-uniform retardance across the first retarder layer, and the second retarder layer has a substantially uniform retardance and non-uniform orientation across the second retarder layer.

Embodiment 126 is the optical system of Embodiment 119, wherein relative to the first polarization state, the first retarder layer has a substantially uniform orientation and uniform retardance across the first retarder layer, and the second retarder layer has a substantially non-uniform retardance and non-uniform orientation across the second retarder layer.

Embodiment 127 is the optical system of Embodiment 119 further comprising:
a display; and
an exit pupil,
wherein at the predetermined wavelength and the first polarization state and for each location in a plurality of locations on the display, the display emits a cone of light rays substantially filling the exit pupil, the cone of light rays passing through the first and second retarder layers over respective first and second incident areas, such that an average retardance of each of the first and second retarder layers over the respective first and second incident areas is within 10% of one fourth of the predetermined wavelength.

Embodiment 128 is the optical system of Embodiment 102, wherein the optical axis intersect the reflective polarizer at a second origin, the reflective polarizer having orthogonal pass and block polarization states at the second origin, and wherein for a first light ray propagating along the optical axis and incident on the first retarder layer at the origin having the predetermined wavelength and the block polarization state, the first light ray comprises the first polarization state when first incident on the reflective polarizer and the second polarization state when second incident on the reflective polarizer, a difference between the first and block polarization states being less than a difference between the second and pass polarization states.

Embodiment 129 is the optical system of Embodiment 102, wherein at the predetermined wavelength, the first retarder layer has a first retardance at the origin and a different second retardance at at least one other location.

Embodiment 130 is the optical system of Embodiment 102, wherein the first retarder layer has a first physical thickness at at least one first location and a different second physical thickness at at least one different second location.

Embodiment 131 is the optical system of Embodiment 102, wherein the first retarder layer has at at least one first location, a first orientation relative to the first polarization state and a first retardance at a predetermined wavelength, and at at least one different second location, a different second orientation relative to the first polarization state and a different second retardance at the predetermined wavelength.

Embodiment 132 is the optical system of Embodiment 102, wherein the first retarder layer comprises at least first and second stacked retarder layers, wherein at the predetermined wavelength and for at least one location on the first retarder layer, one of the at least first and second stacked retarder layers has a positive retardance and the other of the of the at least first and second stacked retarder layers has a negative retardance.

Embodiment 133 is the optical system of Embodiment 102 further comprising a display emitting the image, wherein for an emitted chief light ray having the first polarization state at the predetermined wavelength, the first retarder layer converts the chief light ray to a circularly polarized light for the chief light ray emitted from an edge of the image, and to an elliptically polarized light for the chief light ray propagating along the optical axis.

Embodiment 134 is the optical system of Embodiment 102 further comprising a display, wherein for a plurality of chief light rays emitted by the display, each chief light ray having the first polarization state at the predetermined wavelength and a different separation from the optical axis, the first retarder layer converts the chief light ray to a circularly polarized light.

Embodiment 135 is the optical system of Embodiment 102 further comprising a display, wherein for a plurality of chief light rays emitted by the display, each chief light ray having the first polarization state at the predetermined wavelength and a different separation from the optical axis, the first retarder layer has a retardance within 10% of one fourth of the predetermined wavelength.

Embodiment 136 is the optical system of Embodiment 102, wherein the optical axis intersects the reflective polarizer at a second origin, wherein each location on the reflective polarizer has corresponding mutually orthogonal pass and block polarization states, and wherein for a light ray having the predetermined wavelength and the block polarization state of the reflective polarizer at the second origin and first incident on the first retarder layer at the origin and making an angle $\theta$ with the optical axis, the light ray is substantially reflected when first incident on the reflective polarizer at a first location and substantially transmitted when second incident on the reflective polarizer at a second location,
a difference between the polarization state of the light ray and the pass polarization state of the reflective polarizer at the second location being greater when $\theta$ is zero and less when $\theta$ is not zero.

Embodiment 137 is the optical system of Embodiment 102 further comprising a display, wherein each location on the reflective polarizer has corresponding mutually orthogonal pass and block polarization states, the optical system having an optical axis, a light ray emitted by the display propagating along the optical axis passing through the one or more optical lenses, the partial reflector, the reflective polarizer and the first retarder layer without being substantially refracted, such that for a plurality of chief light rays emitted by the display, each chief light ray having the predetermined wavelength and the first polarization state and emitted at a different separation from the optical axis, the chief ray is substantially reflected when first incident on the reflective polarizer at a first location thereon and substantially transmitted when second incident on the reflective polarizer at a second location thereon, a difference between the polarization state of the chief ray at the second location and the pass polarization state of the reflective polarizer at the second location being less than about 0.07.

Embodiment 138 is an optical system for displaying an object to a viewer, comprising:
one or more optical lenses having at least one curved major surface;
a reflective polarizer substantially reflecting light having a first polarization state and substantially transmitting light having an orthogonal second polarization state at a predetermined wavelength;
a partial reflector having an average optical reflectance of at least 20% at the predetermined wavelength; and
a first unitary retarder having at at least one first location, a first orientation relative to the first polarization state and a first retardance at the predetermined wavelength, and at at least one different second location, a different second orientation relative to the first polarization state and a different second retardance at the predetermined wavelength.

Embodiment 139 is the optical system of Embodiment 138, wherein the first unitary retarder has a first physical thickness at at least one of the at least one first location and a different second physical thickness at at least one of the at least one different second location.

Embodiment 140 is the optical system of Embodiment 138, wherein the first unitary retarder has a same physical thickness at at least one of the at least one first location and at at least one of the at least one different second location.

Embodiment 141 is the optical system of Embodiment 138, wherein the first unitary retarder has a first fast optical axis having the first orientation at the at least one first location and a second fast optical axis having the second orientation at the at least one second location, at least one of the first and second optical axes not parallel to a plane defined by the first and second polarization states.

Embodiment 142 is the optical system of Embodiment 138 having an optical axis, a light ray propagating along the optical axis passing through the one or more optical lenses, the reflective polarizer, the partial reflector, and the first unitary retarder without being substantially refracted, wherein at least one of the first and second orientations is not perpendicular to the optical axis.

Embodiment 143 is the optical system of Embodiment 138, wherein the first unitary retarder comprises at least first and second stacked retarder layers, wherein at the predetermined wavelength and for at least one location on the first unitary retarder, one of the at least first and second stacked retarder layers has a positive retardance and the other of the of the at least first and second stacked retarder layers has a negative retardance.

Embodiment 144 is the optical system of Embodiment 143, wherein the first stacked retarder layer has a uniform physical thickness and a variable orientation, and the second stacked retarder layer has a uniform orientation and a variable physical thickness.

Embodiment 145 is the optical system of Embodiment 138 having an optical axis intersecting the first unitary retarder at an origin, a light ray propagating along the optical axis passing through the one or more optical lenses, the reflective polarizer, the partial reflector, and the first unitary retarder without being substantially refracted, and wherein for a light ray having the first polarization state at the predetermined wavelength passing through the origin, the first unitary retarder converts the light ray to an elliptically polarized light for the light ray propagating along the optical axis, and to a circularly polarized light for the light ray propagating along a direction oblique to the optical axis.

Embodiment 146 is the optical system of Embodiment 138 further comprising a second unitary retarder disposed between the partial reflector and the reflective polarizer.

Embodiment 147 is the optical system of Embodiment 146, wherein the first unitary retarder has a first wavelength dispersion curve and the second unitary retarder has a different second wavelength dispersion curve.

Embodiment 148 is the optical system of Embodiment 146, wherein at the predetermined wavelength, at least one of the first and second unitary retarders has a substantially uniform retardance across a first region of the retarder and a non-uniform retardance across a different second region of the retarder.

Embodiment 149 is the optical system of Embodiment 146, wherein the first unitary retarder is substantially a quarter-wave retarder for a first wavelength in a predetermined wavelength range containing the predetermined wavelength, and the second unitary retarder layer is substantially a quarter-wave retarder for a different second wavelength in the predetermined wavelength range.

Embodiment 150 is the optical system of Embodiment 146, wherein the first unitary retarder has a uniform physical thickness and a variable orientation, and the second unitary retarder has a uniform orientation and a variable physical thickness.

Embodiment 151 is the optical system of Embodiment 146, wherein the second unitary retarder has a uniform physical thickness and a variable orientation, and the first unitary retarder has a uniform orientation and a variable physical thickness.

Embodiment 152 is the optical system of Embodiment 146, wherein relative to the first polarization state, the first unitary retarder has a substantially uniform orientation and non-uniform retardance across the first unitary retarder, and the second unitary retarder has a substantially uniform retardance and non-uniform orientation across the second unitary retarder.

Embodiment 153 is the optical system of Embodiment 146, wherein relative to the first polarization state, the first unitary retarder has a substantially uniform orientation and uniform retardance across the first unitary retarder, and the second unitary retarder has a substantially non-uniform retardance and non-uniform orientation across the second unitary retarder.

Embodiment 154 is the optical system of Embodiment 146 further comprising:
a display; and
an exit pupil,
wherein at the predetermined wavelength and the first polarization state and for each location in a plurality of locations on the display, the display emits a cone of light rays substantially filling the exit pupil, the cone of light rays passing through the first and second retarder layers over respective first and second incident areas, such that an average retardance of each of the first and second unitary retarders over the respective first and second incident areas is within 10% of one fourth of the predetermined wavelength.

Embodiment 155 is the optical system of Embodiment 138 having an optical axis intersecting the first unitary retarder at a first origin and the reflective polarizer at a second origin, a light ray propagating along the optical axis passing through the one or more optical lenses, the partial reflector, the reflective polarizer and the first unitary retarder without being substantially refracted, the reflective polarizer having orthogonal pass and block polarization states at the second origin, and wherein for a first light ray propagating along the optical axis and incident on the first unitary retarder at the first origin having the predetermined wavelength and the block polarization state, the first light ray comprises the first polarization state when first incident on the reflective polarizer and the second polarization state when second incident on the reflective polarizer, a difference between the first and block polarization states being less than a difference between the second and pass polarization states.

Embodiment 156 is the optical system of Embodiment 138 having an optical axis intersecting the first unitary retarder at a first origin, a light ray propagating along the optical axis passing through the one or more optical lenses, the partial reflector, the reflective polarizer and the first unitary retarder without being substantially refracted.

Embodiment 157 is the optical system of Embodiment 156, wherein for a light ray having the first polarization state at the predetermined wavelength passing through the first origin, the first unitary retarder converts the light ray to an elliptically polarized light for the light ray propagating along the optical axis, and to a circularly polarized light for the light ray propagating along a direction oblique to the optical axis.

Embodiment 158 is the optical system of Embodiment 156, wherein the first unitary retarder comprises at least first and second stacked retarder layers, wherein at the predetermined wavelength and for at least one location on the first unitary retarder, one of the at least first and second stacked retarder layers has a positive retardance and the other of the of the at least first and second stacked retarder layers has a negative retardance.

Embodiment 159 is the optical system of Embodiment 156 further comprising a display emitting an image, wherein for an emitted chief light ray having the first polarization state at the predetermined wavelength, the first unitary retarder converts the chief light ray to a circularly polarized light for the chief light ray emitted from an edge of the image, and to an elliptically polarized light for the chief light ray propagating along the optical axis.

Embodiment 160 is the optical system of Embodiment 156 further comprising a display, wherein for a plurality of chief light rays emitted by the display, each chief light ray having the first polarization state at the predetermined wavelength and a different separation from the optical axis, the first unitary retarder converts the chief light ray to a circularly polarized light.

Embodiment 161 is the optical system of Embodiment 156 further comprising a display, wherein for a plurality of chief light rays emitted by the display, each chief light ray having the first polarization state at the predetermined wavelength and a different separation from the optical axis, the first unitary retarder has a retardance within 10% of one fourth of the predetermined wavelength.

Embodiment 162 is the optical system of Embodiment 156, wherein the optical axis intersects the reflective polarizer at a second origin, wherein each location on the reflective polarizer has corresponding mutually orthogonal pass and block polarization states, and wherein for a light ray having the predetermined wavelength and the block polarization state of the reflective polarizer at the second origin and first incident on the first retarder layer at the first origin and making an angle $\theta$ with the optical axis, the light ray is substantially reflected when first incident on the reflective polarizer at a first location and substantially transmitted when second incident on the reflective polarizer at a second location, a difference between the polarization state of the light ray and the pass polarization state of the reflective polarizer at the second location being greater when $\theta$ is zero and less when $\theta$ is not zero.

Embodiment 163 is the optical system of Embodiment 138 further comprising a display, wherein each location on the reflective polarizer has corresponding mutually orthogonal pass and block polarization states, the optical system having a maximum contrast ratio at the predetermined wavelength, the optical system having an optical axis, a light ray emitted by the display propagating along the optical axis passing through the one or more optical lenses, the partial reflector, the reflective polarizer and the first retarder layer without being substantially refracted, such that for a plurality of chief light rays emitted by the display, each chief light ray having the predetermined wavelength and the first polarization state and emitted at a different separation from the optical axis, the chief ray is substantially reflected when first incident on the reflective polarizer at a first location thereon and substantially transmitted when second incident on the reflective polarizer at a second location thereon, a difference between the polarization state of the chief ray at the second location and the pass polarization state of the reflective polarizer at the second location being less than about 0.07.

Embodiment 164 is a display system for displaying an image to a viewer and having a maximum contrast ratio at a predetermined wavelength, comprising:

a display emitting an image; and an optical system for displaying the emitted image to the viewer, comprising:

one or more optical lenses having at least one curved major surface;

a reflective polarizer substantially reflecting light having a first polarization state and substantially transmitting light having an orthogonal second polarization state at a predetermined wavelength;

a partial reflector having an average optical reflectance of at least 20% at the predetermined wavelength; and a unitary first retarder layer, the display system having an optical axis, a light ray emitted by the display propagating along the optical axis passing through the one or more optical lenses, the partial reflector, the reflective polarizer and the first retarder layer without being substantially refracted, such that for an emitted chief light ray having the first polarization state at the predetermined wavelength, the first retarder layer converts the chief light ray to a circularly polarized light for the chief light ray emitted from an edge of the image, and to an elliptically polarized light for the chief light ray propagating along the optical axis.

Embodiment 165 is the display system of Embodiment 164, wherein at the predetermined wavelength and the first polarization state and for at least one location on the display, the first retarder layer converts the emitted chief and marginal light rays to elliptically polarized light, and at least one other emitted light ray to a circularly polarized light.

Embodiment 166 is the display system of Embodiment 164, wherein the first retarder layer has at least one of a non-uniform retardance at the predetermined wavelength and a non-uniform orientation relative to the first polarization state.

Embodiment 167 is the display system of Embodiment 164 further comprising a unitary second retarder layer disposed between the partial reflector and the reflective polarizer.

Embodiment 168 is the display system of Embodiment 167, wherein the first retarder layer has a first wavelength dispersion curve and the second retarder layer has a different second wavelength dispersion curve.

Embodiment 169 is the display system of Embodiment 167, wherein at the predetermined wavelength, at least one of the first and second retarder layers has a substantially uniform retardance across a first region of the retarder layer and a non-uniform retardance across a different second region of the retarder layer.

Embodiment 170 is the display system of Embodiment 167, wherein the first retarder layer is substantially a quarter-wave retarder for a first wavelength in a predetermined wavelength range containing the predetermined wavelength but not for a different second wavelength in the predetermined wavelength range, and the second retarder layer is substantially a quarter-wave retarder for the second wavelength but not for the first wavelength.

Embodiment 171 is the display system of Embodiment 167, wherein the first retarder layer has a uniform physical thickness and a variable orientation, and the second retarder layer has a uniform orientation and a variable physical thickness.

Embodiment 172 is the display system of Embodiment 167, wherein the second retarder layer has a uniform physical thickness and a variable orientation, and the first retarder layer has a uniform orientation and a variable physical thickness.

Embodiment 173 is the display system of Embodiment 167, wherein relative to the first polarization state, the first retarder layer has a substantially uniform orientation and non-uniform retardance across the first retarder layer, and the second retarder layer has a substantially uniform retardance and non-uniform orientation across the second retarder layer.

Embodiment 174 is the display system of Embodiment 167, wherein relative to the first polarization state, the first retarder layer has a substantially uniform orientation and uniform retardance across the first retarder layer, and the second retarder layer has a substantially non-uniform retardance and non-uniform orientation across the second retarder layer.

Embodiment 175 is the display system of Embodiment 167 further comprising an exit pupil, wherein at the predetermined wavelength and the first polarization state and for each location in a plurality of locations on the display, the display emits a cone of light rays substantially filling the exit pupil, the cone of light rays passing through the first and second retarder layers over respective first and second incident areas, such that an average retardance of each of the first and second retarder layers over the respective first and second incident areas is within 10% of one fourth of the predetermined wavelength.

Embodiment 176 is the display system of Embodiment 167, wherein for at least one light ray emitted by the display, the light ray intersects the first and second retarder layers at respective first and second locations, and wherein in plan view, a fast axis of the first retarder layer at the first location is substantially parallel to a fast axis of the second retarder layer at the second location.

Embodiment 177 is the display system of Embodiment 167, wherein for at least one light ray milted by the display, the light ray intersects the first and second retarder layers at respective first and second locations, and wherein in plan view, a fast axis of the first retarder layer at the first location is substantially perpendicular to a fast axis of the second retarder layer at the second location.

Embodiment 178 is the display system of Embodiment 167, wherein for at least a first and a second light ray emitted by the display, the first light ray intersects the first and second retarder layers at respective first and second locations, the second light ray intersects the first and second retarder at respective third and fourth locations, and wherein in plan view: a fast axis of the first retarder layer at the first location and a fast axis of the second retarder layer at the second location make a first angle with each other, and a fast axis of the first retarder layer at the third location and a fast axis of the second retarder layer at the fourth location make a second angle with each other.

Embodiment 179 is the display system of Embodiment 178, wherein the first and second angles are substantially equal.

Embodiment 180 is the display system of Embodiment 178, wherein the first and second angles are different.

Embodiment 181 is the display system of Embodiment 178, wherein the first and second angles are within 5 degrees of each other.

Embodiment 182 is the display system of Embodiment 178, wherein each of the first and second angles is no more than 10 degrees.

Embodiment 183 is the display system of Embodiment 178, wherein each of the first and second angles is in a range of 80 to 100 degrees.

Embodiment 184 is the display system of Embodiment 167, wherein the display emits light having the first polarization state.

Embodiment 185 is the display system of Embodiment 167, wherein the display emits light having the second polarization state.

Embodiment 186 is the display system of Embodiment 164, wherein the optical axis intersects the first retarder layer at a first origin and the reflective polarizer at a second origin, wherein the reflective polarizer has orthogonal pass and block polarization states at the second origin, and wherein for a first light ray propagating along the optical axis and incident on the first retarder layer at the first origin having the predetermined wavelength and the block polarization state, the first light ray comprises the first polarization state when first incident on the reflective polarizer and the second polarization state when second incident on the reflective polarizer, a difference between the first and block polarization states being less than a difference between the second and pass polarization states.

Embodiment 187 is the display system of Embodiment 164, wherein at the predetermined wavelength, the first retarder layer has a first retardance at at least one first location and a different second retardance at at least one different second location.

Embodiment 188 is the display system of Embodiment 164, wherein the first retarder layer has a first physical thickness at at least one first location and a different second physical thickness at at least one different second location.

Embodiment 189 is the display system of Embodiment 164, wherein the first retarder layer has at at least one first location, a first orientation relative to the first polarization state and a first retardance at a predetermined wavelength, and at at least one different second location, a different second orientation relative to the first polarization state and a different second retardance at the predetermined wavelength.

Embodiment 190 is the display system of Embodiment 164, wherein the first retarder layer comprises at least first and second stacked retarder layers, wherein at the predetermined wavelength and for at least one location on the first retarder layer, one of the at least first and second stacked retarder layers has a positive retardance and the other of the of the at least first and second stacked retarder layers has a negative retardance.

Embodiment 191 is the display system of Embodiment 164, wherein for a plurality of chief light rays emitted by the display, each chief light ray having the first polarization state at the predetermined wavelength and a different separation from the optical axis, the first retarder layer has a retardance within 10% of one fourth of the predetermined wavelength.

Embodiment 192 is the display system of Embodiment 164, wherein the optical axis intersects first retarder layer at a first origin and the reflective polarizer at a second origin, wherein each location on the reflective polarizer has corresponding mutually orthogonal pass and block polarization states, and wherein for a light ray having the predetermined wavelength and the block polarization state of the reflective polarizer at the second origin and first incident on the first retarder layer at the first origin and making an angle $\theta$ with the optical axis, the light ray is substantially reflected when first incident on the reflective polarizer at a first location and substantially transmitted when second incident on the reflective polarizer at a second location, a difference between the polarization state of the light ray and the pass polarization state of the reflective polarizer at the second location being greater when $\theta$ is zero and less when $\theta$ is not zero.

Embodiment 193 is the display system of Embodiment 164, wherein each location on the reflective polarizer has corresponding mutually orthogonal pass and block polarization states, the display system having an optical axis, a light ray emitted by the display propagating along the optical axis passing through the one or more optical lenses, the partial reflector, the reflective polarizer and the first retarder layer without being substantially refracted, such that for a plurality of chief light rays emitted by the display, each chief light ray having the predetermined wavelength and the first polarization state and emitted at a different separation from the optical axis, the chief ray is substantially reflected when first incident on the reflective polarizer at a first location thereon and substantially transmitted when second incident on the reflective polarizer at a second location thereon, a difference between the polarization state of the chief ray at the second location and the pass polarization state of the reflective polarizer at the second location being less than about 0.07.

Embodiment 194 is a display system for displaying an image to a viewer and having a maximum contrast ratio at a predetermined wavelength, comprising:
 a display emitting an image; and
 an optical system for displaying the emitted image to the viewer, comprising:
 one or more optical lenses having at least one curved major surface;
 a reflective polarizer substantially reflecting light having a first polarization state and substantially transmitting light having an orthogonal second polarization state at a predetermined wavelength;
 a partial reflector having an average optical reflectance of at least 20% at the predetermined wavelength; and
 a unitary first retarder layer, the display system having an optical axis, a light ray emitted by the display propagating along the optical axis passing through the one or more optical lenses, the partial reflector, the reflective polarizer and the first retarder layer without being substantially refracted, such that for a plurality of chief light rays emitted by the display, each chief light ray having the first polarization state at the predetermined wavelength and a different separation from the optical axis, the first retarder layer converts the chief light ray to a circularly polarized light.

Embodiment 195 is the display system of Embodiment 194, such that for each chief light ray emitted by the display having the first polarization state at the predetermined wavelength, the first retarder layer converts the chief light ray to a circularly polarized light.

Embodiment 196 is the display system of Embodiment 194, wherein the first retarder layer has at least one of a non-uniform retardance at the predetermined wavelength and a non-uniform orientation relative to the first polarization state.

Embodiment 197 is the display system of Embodiment 194 further comprising a unitary second retarder layer disposed between the partial reflector and the reflective polarizer.

Embodiment 198 is the display system of Embodiment 197, wherein the first retarder layer has a first wavelength dispersion curve and the second retarder layer has a different second wavelength dispersion curve.

Embodiment 199 is the display system of Embodiment 197, wherein at the predetermined wavelength, at least one of the first and second retarder layers has a substantially uniform retardance across a first region of the retarder layer and a non-uniform retardance across a different second region of the retarder layer.

Embodiment 200 is the display system of Embodiment 197, wherein the first retarder layer is substantially a quarter-wave retarder for a first wavelength in a predetermined wavelength range containing the predetermined wavelength but not for a different second wavelength in the predetermined wavelength range, and the second retarder layer is substantially a quarter-wave retarder for the second wavelength but not for the first wavelength.

Embodiment 201 is the display system of Embodiment 197, wherein the first retarder layer has a uniform physical thickness and a variable orientation, and the second retarder layer has a uniform orientation and a variable physical thickness.

Embodiment 202 is the display system of Embodiment 197, wherein the second retarder layer has a uniform physical thickness and a variable orientation, and the first retarder layer has a uniform orientation and a variable physical thickness.

Embodiment 203 is the display system of Embodiment 197, wherein relative to the first polarization state, the first retarder layer has a substantially uniform orientation and non-uniform retardance across the first retarder layer, and the second retarder layer has a substantially uniform retardance and non-uniform orientation across the second retarder layer.

Embodiment 204 is the display system of Embodiment 197, wherein relative to the first polarization state, the first retarder layer has a substantially uniform orientation and uniform retardance across the first retarder layer, and the second retarder layer has a substantially non-uniform retardance and non-uniform orientation across the second retarder layer.

Embodiment 205 is the display system of Embodiment 197 further comprising an exit pupil, wherein at the predetermined wavelength and the first polarization state and for each location in a plurality of locations on the display, the display emits a cone of light rays substantially filling the exit pupil, the cone of light rays passing through the first and second retarder layers over respective first and second incident areas, such that an average retardance of each of the first and second retarder layers over the respective first and second incident areas is within 10% of one fourth of the predetermined wavelength.

Embodiment 206 is the display system of Embodiment 194, wherein the optical axis intersects the retarder layer at a first origin and the reflective polarizer at a second origin, wherein the reflective polarizer has orthogonal block and pass polarization states at the second origin, and wherein for a first light ray propagating along the optical axis and incident on the first retarder layer at the first origin having the predetermined wavelength and the block polarization state, the first light ray comprises the first polarization state when first incident on the reflective polarizer and the second polarization state when second incident on the reflective polarizer, a difference between the first and block polarization states being less than a difference between the second and pass polarization states.

Embodiment 207 is the display system of Embodiment 194, wherein at the predetermined wavelength, the first retarder layer has a first retardance at at least one first location and a different second retardance at at least one different second location.

Embodiment 208 is the display system of Embodiment 194, wherein the first retarder layer has a first physical thickness at at least one first location and a different second physical thickness at at least one different second location.

Embodiment 209 is the display system of Embodiment 194, wherein the first retarder layer has at at least one first location, a first orientation relative to the first polarization state and a first retardance at a predetermined wavelength, and at at least one different second location, a different second orientation relative to the first polarization state and a different second retardance at the predetermined wavelength.

Embodiment 210 is the display system of Embodiment 194, wherein the first retarder layer comprises at least first and second stacked retarder layers, wherein at the predetermined wavelength and for at least one location on the first retarder layer, one of the at least first and second stacked retarder layers has a positive retardance and the other of the of the at least first and second stacked retarder layers has a negative retardance.

Embodiment 211 is the display system of Embodiment 194, wherein for a plurality of chief light rays emitted by the display, each chief light ray having the first polarization state at the predetermined wavelength and a different separation from the optical axis, the first retarder layer has a retardance within 10% of one fourth of the predetermined wavelength.

Embodiment 212 is the display system of Embodiment 194, wherein the optical axis intersects first retarder layer at a first origin and the reflective polarizer at a second origin, wherein each location on the reflective polarizer has corresponding mutually orthogonal pass and block polarization states, and wherein for a light ray having the predetermined wavelength and the block polarization state of the reflective polarizer at the second origin and first incident on the first retarder layer at the first origin and making an angle θ with the optical axis, the light ray is substantially reflected when first incident on the reflective polarizer at a first location and substantially transmitted when second incident on the reflective polarizer at a second location, a difference between the polarization state of the light ray and the pass polarization state of the reflective polarizer at the second location being greater when θ is zero and less when θ is not zero.

Embodiment 213 is the display system of Embodiment 194, wherein each location on the reflective polarizer has corresponding mutually orthogonal pass and block polarization states, the display system having an optical axis, a light ray emitted by the display propagating along the optical axis passing through the one or more optical lenses, the partial reflector, the reflective polarizer and the first retarder layer without being substantially refracted, such that for a plurality of chief light rays emitted by the display, each chief light ray having the predetermined wavelength and the first polarization state and emitted at a different separation from the optical axis, the chief ray is substantially reflected when first incident on the reflective polarizer at a first location thereon and substantially transmitted when second incident on the reflective polarizer at a second location thereon, a difference between the polarization state of the chief ray at the second location and the pass polarization state of the reflective polarizer at the second location being less than about 0.07.

Embodiment 214 is a display system for displaying an image to a viewer and having a maximum contrast ratio at a predetermined wavelength, comprising:
  a display emitting an image; and
  an optical system for displaying the emitted image to the viewer, comprising:
  one or more optical lenses having at least one curved major surface;
  a reflective polarizer substantially reflecting light having a first polarization state and substantially transmitting light having an orthogonal second polarization state at the predetermined wavelength;
  a partial reflector having an average optical reflectance of at least 20% at the predetermined wavelength; and
  a unitary first retarder layer, the display system having an optical axis, a light ray emitted by the display propagating along the optical axis passing through the one or more optical lenses, the partial reflector, the reflective polarizer and the first unitary retarder layer without being substantially refracted, such that for a plurality of chief light rays emitted by the display, each chief light ray having the first polarization state at the predetermined wavelength and a different separation from the optical axis, the first retarder layer has a retardance within 10% of one fourth of the predetermined wavelength.

Embodiment 215 is the display system of Embodiment 214, wherein for the plurality of chief light rays emitted by the display, each chief light ray having the first polarization state at the predetermined wavelength and a different separation from the optical axis, the first retarder layer converts the chief light ray to a circularly polarized light.

Embodiment 216 is the display system of Embodiment 214, wherein for a chief light ray in the plurality of chief light rays emitted by the display and having the first polarization state at the predetermined wavelength, the first retarder layer converts the chief light ray to a circularly polarized light for the chief light ray emitted from an edge of an image emitted by the display, and to an elliptically polarized light for the chief light ray propagating along the optical axis.

Embodiment 217 is the display system of Embodiment 214, wherein the first retarder layer has at least one of a non-uniform retardance at the predetermined wavelength and a non-uniform orientation relative to the first polarization state.

Embodiment 218 is the display system of Embodiment 214 further comprising a unitary second retarder layer disposed between the partial reflector and the reflective polarizer.

Embodiment 219 is the display system of Embodiment 218, wherein the first retarder layer has a first wavelength dispersion curve and the second retarder layer has a different second wavelength dispersion curve.

Embodiment 220 is the display system of Embodiment 218, wherein at the predetermined wavelength, at least one of the first and second retarder layers has a substantially uniform retardance across a first region of the retarder layer and a non-uniform retardance across a different second region of the retarder layer.

Embodiment 221 is the display system of Embodiment 218, wherein the first retarder layer is substantially a quarter-wave retarder for a first wavelength in a predetermined wavelength range containing the predetermined wavelength but not for a different second wavelength in the predetermined wavelength range, and the second retarder layer is substantially a quarter-wave retarder for the second wavelength but not for the first wavelength.

Embodiment 222 is the display system of Embodiment 218, wherein the first retarder layer has a uniform physical thickness and a variable orientation, and the second retarder layer has a uniform orientation and a variable physical thickness.

Embodiment 223 is the display system of Embodiment 218, wherein the second retarder layer has a uniform physical thickness and a variable orientation, and the first retarder layer has a uniform orientation and a variable physical thickness.

Embodiment 224 is the display system of Embodiment 218, wherein relative to the first polarization state, the first retarder layer has a substantially uniform orientation and non-uniform retardance across the first retarder layer, and the second retarder layer has a substantially uniform retardance and non-uniform orientation across the second retarder layer.

Embodiment 225 is the display system of Embodiment 218, wherein relative to the first polarization state, the first retarder layer has a substantially uniform orientation and uniform retardance across the first retarder layer, and the second retarder layer has a substantially non-uniform retardance and non-uniform orientation across the second retarder layer.

Embodiment 226 is the display system of Embodiment 218 further comprising an exit pupil, wherein at the predetermined wavelength and the first polarization state and for each location in a plurality of locations on the display, the display emits a cone of light rays substantially filling the exit pupil, the cone of light rays passing through the first and second retarder layers over respective first and second incident areas, such that an average retardance of each of the first and second retarder layers over the respective first and second incident areas is within 10% of one fourth of the predetermined wavelength.

Embodiment 227 is the display system of Embodiment 218, wherein for at least one light ray emitted by the display, the light ray intersects the first and second retarder layers at respective first and second locations, and wherein in plan view, a fast axis of the first retarder layer at the first location is substantially parallel to a fast axis of the second retarder layer at the second location.

Embodiment 228 is the display system of Embodiment 218, wherein for at least one light ray milted by the display, the light ray intersects the first and second retarder layers at respective first and second locations, and wherein in plan view, a fast axis of the first retarder layer at the first location is substantially perpendicular to a fast axis of the second retarder layer at the second location.

Embodiment 229 is the display system of Embodiment 218, wherein for at least a first and a second light ray emitted by the display, the first light ray intersects the first and second retarder layers at respective first and second locations, the second light ray intersects the first and second retarder at respective third and fourth locations, and wherein in plan view: a fast axis of the first retarder layer at the first location and a fast axis of the second retarder layer at the second location make a first angle with each other, and a fast axis of the first retarder layer at the third location and a fast axis of the second retarder layer at the fourth location make a second angle with each other.

Embodiment 230 is the display system of Embodiment 229, wherein the first and second angles are substantially equal.

Embodiment 231 is the display system of Embodiment 229, wherein the first and second angles are different.

Embodiment 232 is the display system of Embodiment 229, wherein the first and second angles are within 5 degrees of each other.

Embodiment 233 is the display system of Embodiment 229, wherein each of the first and second angles is no more than 10 degrees.

Embodiment 234 is the display system of Embodiment 229, wherein each of the first and second angles is in a range of 80 to 100 degrees.

Embodiment 235 is the display system of Embodiment 214, wherein the optical axis intersects the retarder layer at a first origin and the reflective polarizer at a second origin, wherein the reflective polarizer has orthogonal block and pass polarization states at the second origin, and wherein for a first light ray propagating along the optical axis and incident on the first retarder layer at the first origin having the predetermined wavelength and the block polarization state, the first light ray comprises the first polarization state when first incident on the reflective polarizer and the second polarization state when second incident on the reflective polarizer, a difference between the first and block polarization states being less than a difference between the second and pass polarization states.

Embodiment 236 is the display system of Embodiment 214, wherein at the predetermined wavelength, the first retarder layer has a first retardance at at least one first location and a different second retardance at at least one different second location.

Embodiment 237 is the display system of Embodiment 214, wherein the first retarder layer has a first physical thickness at at least one first location and a different second physical thickness at at least one different second location.

Embodiment 238 is the display system of Embodiment 214, wherein the first retarder layer has at at least one first location, a first orientation relative to the first polarization state and a first retardance at the predetermined wavelength, and at at least one different second location, a different second orientation relative to the first polarization state and a different second retardance at the predetermined wavelength.

Embodiment 239 is the display system of Embodiment 214, wherein the first retarder layer comprises at least first and second stacked retarder layers, wherein at the predetermined wavelength and for at least one location on the first retarder layer, one of the at least first and second stacked retarder layers has a positive retardance and the other of the of the at least first and second stacked retarder layers has a negative retardance.

Embodiment 240 is the display system of Embodiment 214, wherein for a plurality of chief light rays emitted by the display, each chief light ray having the first polarization state at the predetermined wavelength and a different separation from the optical axis, the first retarder layer has a retardance within 10% of one fourth of the predetermined wavelength.

Embodiment 241 is the display system of Embodiment 214, wherein the optical axis intersects first retarder layer at a first origin and the reflective polarizer at a second origin, wherein each location on the reflective polarizer has corresponding mutually orthogonal pass and block polarization states, and wherein for a light ray having the predetermined wavelength and the block polarization state of the reflective polarizer at the second origin and first incident on the first retarder layer at the first origin and making an angle θ with the optical axis, the light ray is substantially reflected when first incident on the reflective polarizer at a first location and substantially transmitted when second incident on the reflective polarizer at a second location,
  a difference between the polarization state of the light ray and the pass polarization state of the reflective polarizer at the second location being greater when θ is zero and less when θ is not zero.

Embodiment 242 is the display system of Embodiment 214, wherein each location on the reflective polarizer has corresponding mutually orthogonal pass and block polarization states, the display system having an optical axis, a light ray emitted by the display propagating along the optical axis passing through the one or more optical lenses, the partial reflector, the reflective polarizer and the first retarder layer without being substantially refracted, such that for a plurality of chief light rays emitted by the display, each chief light ray having the predetermined wavelength and the first polarization state and emitted at a different separation from the optical axis, the chief ray is substantially reflected when first incident on the reflective polarizer at a first location thereon and substantially transmitted when second incident on the reflective polarizer at a second location thereon, a difference between the polarization state of the chief ray at the second location and the pass polarization state of the reflective polarizer at the second location being less than about 0.07.

Embodiment 243 is the display system of Embodiment 214 further comprising an exit pupil having a diameter in a range from about 4.5 mm to about 6 mm.

Embodiment 244 is the display system of Embodiment 243, wherein the optical system has an f-number in a range from about 0.2 to about 2.5.

Embodiment 245 is an optical system for displaying an object to a viewer, comprising:
  one or more optical lenses having at least one curved major surface;
  a reflective polarizer disposed on and conforming to a first major surface of the one or more optical lenses, the reflective polarizer substantially reflecting light having a first polarization state and substantially transmitting light having an orthogonal second polarization state;
  a partial reflector disposed on and conforming to a different second major surface of the one or more optical lenses, the partial reflector having an average optical reflectance of at least 20%; a first retarder layer disposed on and conforming to a third major surface of the one or more optical lenses; and
  a second retarder layer disposed on and conforming to a fourth major surface, different than the third major surface, of the one or more optical lenses, such that relative to the first polarization state, the first retarder layer has a substantially uniform orientation and non-uniform retardance across the first retarder layer, and the second retarder layer has a substantially uniform retardance and non-uniform orientation across the second retarder layer.

Embodiment 246 is the optical system of Embodiment 245, wherein the first retarder layer comprises a first spin-coated retarder layer having a smaller average first physical thickness and the second retarder layer comprises a second spin-coated retarder layer having a greater average second physical thickness.

Embodiment 247 is the optical system of Embodiment 245, wherein each of the first and second retarder layers is a unitary retarder layer.

Embodiment 248 is the optical system of Embodiment 245, wherein the first retarder layer has a first wavelength dispersion curve and the second retarder layer has a different second wavelength dispersion curve.

Embodiment 249 is the optical system of Embodiment 245, wherein the second retarder layer is disposed between the partial reflector and the reflective polarizer.

Embodiment 250 is the optical system of Embodiment 245, wherein the first retarder layer is disposed between the partial reflector and the reflective polarizer.

Embodiment 251 is the optical system of Embodiment 245 further comprising a display and an exit pupil, wherein at the predetermined wavelength and the first polarization state and for each location in a plurality of locations on the display, the display emits a cone of light rays substantially filling the exit pupil, the cone of light rays passing through the first and second retarder layers over respective first and second incident areas, such that an average retardance of each of the first and second retarder layers over the respective first and second incident areas is within 10% of one fourth of the predetermined wavelength.

Embodiment 252 is the optical system of Embodiment 245, wherein the first retarder layer has at at least one first location, a first orientation relative to the first polarization state and a first retardance at a predetermined wavelength, and at at least one different second location, a different second orientation relative to the first polarization state and a different second retardance at the predetermined wavelength.

Embodiment 253 is the optical system of Embodiment 245, wherein the first retarder layer comprises at least first and second stacked retarder layers, wherein at the predetermined wavelength and for at least one location on the first retarder layer, one of the at least first and second stacked retarder layers has a positive retardance and the other of the of the at least first and second stacked retarder layers has a negative retardance.

Embodiment 254 is the optical system of Embodiment 245 having an optical axis intersecting the first retarder layer at a first origin and the reflective polarizer at a second origin, a light ray propagating along the optical axis passing through the one or more optical lenses, the partial reflector, the reflective polarizer and the first retarder layer without being substantially refracted.

Embodiment 255 is the optical system of Embodiment 254, wherein the reflective polarizer has orthogonal block and pass polarization states at the second origin, and wherein for a first light ray propagating along the optical axis and incident on the first retarder layer at the first origin having the predetermined wavelength and the block polarization state, the first light ray comprises the first polarization state when first incident on the reflective polarizer and the second polarization state when second incident on the reflective polarizer, a difference between the first and block polarization states being less than a difference between the second and pass polarization states.

Embodiment 256 is the optical system of Embodiment 254, wherein for a light ray having the first polarization state at the predetermined wavelength passing through the first origin, the first retarder layer converts the light ray to an elliptically polarized light for the light ray propagating along the optical axis, and to a circularly polarized light for the light ray propagating along a direction oblique to the optical axis.

Embodiment 257 is the optical system of Embodiment 254 further comprising a display, wherein for a plurality of chief light rays emitted by the display, each chief light ray having the first polarization state at the predetermined wavelength and a different separation from the optical axis, the first retarder layer converts the chief light ray to a circularly polarized light.

Embodiment 258 is the optical system of Embodiment 254 further comprising a display, wherein for a plurality of chief light rays emitted by the display, each chief light ray having the first polarization state at the predetermined wavelength and a different separation from the optical axis, the first retarder layer has a retardance within 10% of one fourth of the predetermined wavelength.

Embodiment 259 is the optical system of Embodiment 254, wherein each location on the reflective polarizer has corresponding mutually orthogonal pass and block polarization states, and wherein for a light ray having the predetermined wavelength and the block polarization state of the reflective polarizer at the second origin and first incident on the first retarder layer at the origin and making an angle θ with the optical axis, the light ray is substantially reflected when first incident on the reflective polarizer at a first location and substantially transmitted when second incident on the reflective polarizer at a second location,
  a difference between the polarization state of the light ray and the pass polarization state of the reflective polarizer at the second location being greater when θ is zero and less when θ is not zero.

Embodiment 260 is the optical system of Embodiment 254 further comprising a display, wherein each location on the reflective polarizer has corresponding mutually orthogonal pass and block polarization states, wherein for a plurality of chief light rays emitted by the display, each chief light ray having the predetermined wavelength and the first polarization state and emitted at a different separation from the optical axis, the chief ray is substantially reflected when first incident on the reflective polarizer at a first location thereon and substantially transmitted when second incident on the reflective polarizer at a second location thereon, a difference between the polarization state of the chief ray at the second location and the pass polarization state of the reflective polarizer at the second location being less than about 0.07.

Embodiment 261 is an optical system for displaying an object to a viewer, comprising:
  one or more optical lenses having at least one curved major surface;
  a reflective polarizer disposed on and conforming to a first major surface of the one or more optical lenses, the reflective polarizer substantially reflecting light having a first polarization state and substantially transmitting light having an orthogonal second polarization state;
  a partial reflector disposed on and conforming to a different second major surface of the one or more optical lenses, the partial reflector having an average optical reflectance of at least 20%;
  a first retarder layer disposed on and conforming to a third major surface of the one or more optical lenses; and
  a second retarder layer disposed on and conforming to a fourth major surface, different than the third major surface, of the one or more optical lenses, such that relative to the first polarization state, the first retarder has a substantially uniform orientation and uniform retardance across the first retarder layer, and the second retarder layer has a substantially non-uniform retardance and non-uniform orientation across the second retarder layer.

Embodiment 262 is the optical system of Embodiment 261, wherein the second retarder layer is disposed between the reflective polarizer and the partial reflector.

Embodiment 263 is the optical system of Embodiment 261, wherein the first retarder layer is disposed between the reflective polarizer and the partial reflector.

Embodiment 264 is the optical system of Embodiment 261, wherein the first retarder layer has a first wavelength dispersion curve and the second retarder layer has a different second wavelength dispersion curve.

Embodiment 265 is the optical system of Embodiment 261, wherein the first retarder layer comprises a first spin-coated retarder layer having a smaller average first physical thickness and the second retarder layer comprises a second spin-coated retarder layer having a greater average second physical thickness.

Embodiment 266 is the optical system of Embodiment 261, wherein each of the first and second retarder layers is a unitary retarder layer.

Embodiment 267 is the optical system of Embodiment 261, wherein the second retarder layer is disposed between the partial reflector and the reflective polarizer.

Embodiment 268 is the optical system of Embodiment 261, wherein the first retarder layer is disposed between the partial reflector and the reflective polarizer.

Embodiment 269 is the optical system of Embodiment 261 further comprising a display and an exit pupil, wherein at the predetermined wavelength and the first polarization state and for each location in a plurality of locations on the display, the display emits a cone of light rays substantially filling the exit pupil, the cone of light rays passing through the first and second retarder layers over respective first and second incident areas, such that an average retardance of each of the first and second retarder layers over the respective first and second incident areas is within 10% of one fourth of the predetermined wavelength.

Embodiment 270 is the optical system of Embodiment 261, wherein the first retarder layer has at at least one first location, a first orientation relative to the first polarization state and a first retardance at a predetermined wavelength, and at at least one different second location, a different second orientation relative to the first polarization state and a different second retardance at the predetermined wavelength.

Embodiment 271 is the optical system of Embodiment 261, wherein the first retarder layer comprises at least first and second stacked retarder layers, wherein at the predetermined wavelength and for at least one location on the first retarder layer, one of the at least first and second stacked retarder layers has a positive retardance and the other of the of the at least first and second stacked retarder layers has a negative retardance.

Embodiment 272 is the optical system of Embodiment 261 having an optical axis intersecting the first retarder layer at a first origin and the reflective polarizer at a second origin, a light ray propagating along the optical axis passing through the one or more optical lenses, the partial reflector, the reflective polarizer and the first retarder layer without being substantially refracted.

Embodiment 273 is the optical system of Embodiment 272, wherein the reflective polarizer has orthogonal block and pass polarization states at the second origin, and wherein for a first light ray propagating along the optical axis and incident on the first retarder layer at the first origin having the predetermined wavelength and the block polarization state, the first light ray comprises the first polarization state when first incident on the reflective polarizer and the second polarization state when second incident on the reflective polarizer, a difference between the first and block polarization states being less than a difference between the second and pass polarization states.

Embodiment 274 is the optical system of Embodiment 272, wherein for a light ray having the first polarization state at the predetermined wavelength passing through the first origin, the first retarder layer converts the light ray to an elliptically polarized light for the light ray propagating along the optical axis, and to a circularly polarized light for the light ray propagating along a direction oblique to the optical axis.

Embodiment 275 is the optical system of Embodiment 272 further comprising a display, wherein for a plurality of chief light rays emitted by the display, each chief light ray having the first polarization state at the predetermined wavelength and a different separation from the optical axis, the first retarder layer converts the chief light ray to a circularly polarized light.

Embodiment 276 is the optical system of Embodiment 272 further comprising a display, wherein for a plurality of chief light rays emitted by the display, each chief light ray having the first polarization state at the predetermined wavelength and a different separation from the optical axis, the first retarder layer has a retardance within 10% of one fourth of the predetermined wavelength.

Embodiment 277 is the optical system of Embodiment 272, wherein each location on the reflective polarizer has corresponding mutually orthogonal pass and block polarization states, and wherein for a light ray having the predetermined wavelength and the block polarization state of the reflective polarizer at the second origin and first incident on the first retarder layer at the origin and making an angle θ with the optical axis, the light ray is substantially reflected when first incident on the reflective polarizer at a first location and substantially transmitted when second incident on the reflective polarizer at a second location,
a difference between the polarization state of the light ray and the pass polarization state of the reflective polarizer at the second location being greater when θ is zero and less when θ is not zero.

Embodiment 278 is the optical system of Embodiment 272 further comprising a display, wherein each location on the reflective polarizer has corresponding mutually orthogonal pass and block polarization states, wherein for a plurality of chief light rays emitted by the display, each chief light ray having the predetermined wavelength and the first polarization state and emitted at a different separation from the optical axis, the chief ray is substantially reflected when first incident on the reflective polarizer at a first location thereon and substantially transmitted when second incident on the reflective polarizer at a second location thereon, a difference between the polarization state of the chief ray at the second location and the pass polarization state of the reflective polarizer at the second location being less than about 0.07.

Embodiment 279 is an optical system for displaying an object to a viewer and having a maximum contrast ratio at a predetermined wavelength, the optical system comprising:
one or more optical lenses having at least one curved major surface;
a reflective polarizer disposed on and conforming to a first major surface of the one or more optical lenses, each location on the reflective polarizer having corresponding mutually orthogonal pass and block polarization states, such that at the location, the reflective polarizer substantially reflects light having the block polarization state and substantially transmits light having the pass polarization state at the predetermined wavelength;
a partial reflector disposed on and conforming to a different second major surface of the one or more optical lenses, the partial reflector having an average optical reflectance of at least 20% at the predetermined wavelength;
a first retarder layer disposed on and conforming to a third major surface of the one or more optical lenses; and
a second retarder layer disposed on and conforming to a fourth major surface, different than the third major surface, of the one or more optical lenses between the partial reflector and the reflective polarizer, the optical system having an optical axis intersecting the first retarder layer at a first origin and the reflective polarizer at a second origin, a light ray propagating along the optical axis passing through the one or more optical lenses, the partial reflector, the reflective polarizer and the first and second retarder layers without being substantially refracted,
such that for a light ray having the predetermined wavelength and the block polarization state of the reflective polarizer at the second origin and first incident on the first retarder layer at the first origin and making an angle θ with the optical axis, the light ray is substantially reflected when first incident on the reflective polarizer at a first location and substantially transmitted when second incident on the reflective polarizer at a second location,
a difference between the polarization state of the light ray and the pass polarization state of the reflective polarizer at the second location being greater when θ is zero and less when θ is not zero.

Embodiment 280 is the optical system of Embodiment 279, wherein the block polarization states of at least two different locations on the reflective polarizer are oriented differently.

Embodiment 281 is the optical system of Embodiment 279, wherein the first retarder layer has a substantially uniform orientation and non-uniform retardance across the first retarder layer, and the second retarder layer has a substantially uniform retardance and non-uniform orientation across the second retarder layer.

Embodiment 282 is the optical system of Embodiment 279, wherein the first retarder layer has a spatially non-uniform orientation and a spatially non-uniform retardance across the first retarder layer.

Embodiment 283 is the optical system of Embodiment 279, wherein at least one of the first and second retarder layers has a substantially uniform retardance across a first region of the retarder layer and a non-uniform retardance across a different second region of the retarder layer.

Embodiment 284 is the optical system of Embodiment 279, wherein the first retarder layer has a first wavelength dispersion curve and the second retarder layer has a different second wavelength dispersion curve.

Embodiment 285 is the optical system of Embodiment 279, wherein the first retarder layer comprises a first spin-coated retarder layer having a smaller average first physical thickness and the second retarder layer comprises a second spin-coated retarder layer having a greater average second physical thickness.

Embodiment 286 is the optical system of Embodiment 279, wherein each of the first and second retarder layers is a unitary retarder layer.

Embodiment 287 is the optical system of Embodiment 279, wherein the second retarder layer is disposed between the partial reflector and the reflective polarizer.

Embodiment 288 is the optical system of Embodiment 279, wherein the first retarder layer is disposed between the partial reflector and the reflective polarizer.

Embodiment 289 is the optical system of Embodiment 279 further comprising a display and an exit pupil, wherein at the predetermined wavelength and for each location in a plurality of locations on the display, the display emits a cone of light rays substantially filling the exit pupil, the cone of light rays passing through the first and second retarder layers over respective first and second incident areas, such that an average retardance of each of the first and second retarder layers over the respective first and second incident areas is within 10% of one fourth of the predetermined wavelength.

Embodiment 290 is the optical system of Embodiment 279, wherein the first retarder layer comprises at least first and second stacked retarder layers, wherein at the predetermined wavelength and for at least one location on the first retarder layer, one of the at least first and second stacked retarder layers has a positive retardance and the other of the of the at least first and second stacked retarder layers has a negative retardance.

Embodiment 291 is the optical system of Embodiment 279 further comprising a display, wherein for a plurality of chief light rays emitted by the display, each chief light ray having the predetermined wavelength and a different separation from the optical axis, the first retarder layer converts the chief light ray to a circularly polarized light.

Embodiment 292 is the optical system of Embodiment 279 further comprising a display, wherein for a plurality of chief light rays emitted by the display, each chief light ray having the predetermined wavelength and a different separation from the optical axis, the first retarder layer has a retardance within 10% of one fourth of the predetermined wavelength.

Embodiment 293 is the optical system of Embodiment 279 further comprising a display, wherein for a plurality of chief light rays emitted by the display, each chief light ray having the predetermined wavelength and emitted at a different separation from the optical axis, the chief ray is substantially reflected when first incident on the reflective polarizer at a first location thereon and substantially transmitted when second incident on the reflective polarizer at a second location thereon, a difference between the polarization state of the chief ray at the second location and the pass polarization state of the reflective polarizer at the second location being less than about 0.07.

Embodiment 294 is the optical system of any one of Embodiments 245 to 293, wherein for at least one light ray incident on the optical system, the light ray intersects the first and second retarder layers at respective first and second locations, and wherein in plan view, a fast axis of the first retarder layer at the first location is substantially parallel to a fast axis of the second retarder layer at the second location.

Embodiment 295 is the optical system of any one of Embodiments 245 to 293, wherein for at least one light ray incident on the optical system, the light ray intersects the first and second retarder layers at respective first and second locations, and wherein in plan view, a fast axis of the first retarder layer at the first location is substantially perpendicular to a fast axis of the second retarder layer at the second location.

Embodiment 296 is the optical system of any one of Embodiments 245 to 293, wherein for at least a first and a second light ray incident on the optical system, the first light ray intersects the first and second retarder layers at respective first and second locations, the second light ray intersects the first and second retarder at respective third and fourth locations, and wherein in plan view: a fast axis of the first retarder layer at the first location and a fast axis of the second retarder layer at the second location make a first angle with each other, and a fast axis of the first retarder layer at the third location and a fast axis of the second retarder layer at the fourth location make a second angle with each other.

Embodiment 297 is the optical system of Embodiment 296, wherein the first and second angles are substantially equal.

Embodiment 298 is the optical system of Embodiment 296, wherein the first and second angles are different.

Embodiment 299 is the optical system of Embodiment 296, wherein the first and second angles are within 5 degrees of each other.

Embodiment 300 is the optical system of Embodiment 296, wherein each of the first and second angles is no more than 10 degrees.

Embodiment 301 is the optical system of Embodiment 296, wherein each of the first and second angles is in a range of 80 to 100 degrees.

Embodiment 302 is a display system for displaying an image to a viewer and having a maximum contrast ratio at a predetermined wavelength, comprising:
  a display emitting an image; and
  an optical system for displaying the emitted image to the viewer, comprising:
  one or more optical lenses having at least one curved major surface;
  a reflective polarizer disposed on and conforming to a first major surface of the one or more optical lenses, each location on the reflective polarizer having corresponding mutually orthogonal pass and block polarization states, such that at the location, the reflective polarizer substantially reflects light having the block polarization state and substantially transmits light having the pass polarization state at the predetermined wavelength;
  a partial reflector disposed on and conforming to a different second major surface of the one or more optical lenses, the partial reflector having an average optical reflectance of at least 20% at the predetermined wavelength; and
  spaced apart first and second retarder layers disposed on and conforming to different major surfaces of the one or more optical lenses, each of the first and second retarder layers having at least one of a variable retardance and orientation; the optical system having an optical axis, a light ray propagating along the optical axis passing through the one or more optical lenses, the partial reflector, the reflective polarizer and the first and second retarder layers without being substantially refracted, such that for a plurality of chief light rays emitted by the display, each chief light ray having the predetermined wavelength and emitted at a different separation from the optical axis, the chief ray is substantially reflected when first incident on the reflective polarizer at a first location thereon and substantially transmitted when second incident on the reflective polarizer at a second location thereon, a difference between the polarization state of the chief ray at the second location and the pass polarization state of the reflective polarizer at the second location being less than about 0.07.

Embodiment 303 is the display system of Embodiment 302, wherein for at least one chief ray in the plurality of chief rays, the first and second locations on the reflective polarizer are different locations.

Embodiment 304 is the display system of Embodiment 302, wherein the difference between the polarization state of the chief ray at the second location and the pass polarization state of the reflective polarizer at the second location being less than about 0.05.

Embodiment 305 is the display system of Embodiment 302, wherein the difference between the polarization state of the chief ray at the second location and the pass polarization state of the reflective polarizer at the second location being less than about 0.03.

Embodiment 306 is the display system of Embodiment 302, wherein the difference between the polarization state of the chief ray at the second location and the pass polarization state of the reflective polarizer at the second location being less than about 0.02.

Embodiment 307 is the display system of Embodiment 302, wherein the display emits polarized light having a first polarization state.

Embodiment 308 is the display system of Embodiment 307, wherein the reflective polarizer is intersected by the optical axis at an origin of the reflective polarizer, the first polarization state being the block state of the reflective polarizer at the origin.

Embodiment 309 is the display system of Embodiment 307, wherein the reflective polarizer is intersected by the optical axis at an origin of the reflective polarizer, the first polarization state being the pass state of the reflective polarizer at the origin.

Embodiment 310 is the display system of Embodiment 302, wherein for each chief ray in the plurality of chief light rays emitted by the display, the first retarder layer has a retardance within 10% of one fourth of the predetermined wavelength.

Embodiment 311 is the display system of Embodiment 302, wherein for an emitted chief light ray in the plurality of chief light rays, the first retarder layer converts the chief light ray to a circularly polarized light for the chief light ray emitted from an edge of an image emitted by the display, and to an elliptically polarized light for the chief light ray propagating along the optical axis.

Embodiment 312 is the display system of Embodiment 302, wherein the first retarder layer has at least one of a non-uniform retardance at the predetermined wavelength and a non-uniform fast optical axis orientation.

Embodiment 313 is the display system of Embodiment 302, wherein the first retarder layer has a first wavelength dispersion curve and the second retarder layer has a different second wavelength dispersion curve.

Embodiment 314 is the display system of Embodiment 302, wherein at the predetermined wavelength, at least one of the first and second retarder layers has a substantially uniform retardance across a first region of the retarder layer and a non-uniform retardance across a different second region of the retarder layer.

Embodiment 315 is the display system of Embodiment 302, wherein the first retarder layer is substantially a quarter-wave retarder for a first wavelength in a predetermined wavelength range containing the predetermined wavelength but not for a different second wavelength in the predetermined wavelength range, and the second retarder layer is substantially a quarter-wave retarder for the second wavelength but not for the first wavelength.

Embodiment 316 is the display system of Embodiment 302, wherein the first retarder layer has a uniform physical thickness and a variable orientation, and the second retarder layer has a uniform orientation and a variable physical thickness.

Embodiment 317 is the display system of Embodiment 302, wherein the second retarder layer has a uniform physical thickness and a variable orientation, and the first retarder layer has a uniform orientation and a variable physical thickness.

Embodiment 318 is the display system of Embodiment 302, wherein the first retarder layer has a substantially uniform orientation and non-uniform retardance across the first retarder layer, and the second retarder layer has a substantially uniform retardance and non-uniform orientation across the second retarder layer.

Embodiment 319 is the display system of Embodiment 302, wherein the first retarder layer has a substantially uniform orientation and uniform retardance across the first retarder layer, and the second retarder layer has a substantially non-uniform retardance and non-uniform orientation across the second retarder layer.

Embodiment 320 is the display system of Embodiment 302 further comprising an exit pupil, wherein at the predetermined wavelength and for each location in a plurality of locations on the display, the display emits a cone of light rays substantially filling the exit pupil, the cone of light rays passing through the first and second retarder layers over respective first and second incident areas, such that an average retardance of each of the first and second retarder layers over the respective first and second incident areas is within 10% of one fourth of the predetermined wavelength.

Embodiment 321 is the display system of Embodiment 302, wherein the optical axis intersects the retarder layer at a first origin and the reflective polarizer at a second origin, wherein the reflective polarizer has orthogonal block and pass polarization states at the second origin, and wherein for a first light ray propagating along the optical axis and incident on the first retarder layer at the first origin having the predetermined wavelength and the block polarization state, the first light ray comprises a first polarization state when first incident on the reflective polarizer and a second polarization state when second incident on the reflective polarizer, a difference between the first and block polarization states being less than a difference between the second and pass polarization states.

Embodiment 322 is the display system of Embodiment 302, wherein at the predetermined wavelength, the first retarder layer has a first retardance at at least one first location and a different second retardance at at least one different second location.

Embodiment 323 is the display system of Embodiment 302, wherein the first retarder layer has a first physical thickness at at least one first location and a different second physical thickness at at least one different second location.

Embodiment 324 is the display system of Embodiment 302, wherein the first retarder layer has at at least one first location, a first orientation and a first retardance at the predetermined wavelength, and at at least one different second location, a different second orientation and a different second retardance at the predetermined wavelength.

Embodiment 325 is the display system of Embodiment 302, wherein the first retarder layer comprises at least first and second stacked retarder layers, wherein at the predetermined wavelength and for at least one location on the first retarder layer, one of the at least first and second stacked retarder layers has a positive retardance and the other of the of the at least first and second stacked retarder layers has a negative retardance.

Embodiment 326 is the display system of Embodiment 302, wherein the optical axis intersects first retarder layer at a first origin and the reflective polarizer at a second origin, and wherein for a light ray having the predetermined wavelength and the block polarization state of the reflective polarizer at the second origin and first incident on the first retarder layer at the first origin and making an angle θ with the optical axis, the light ray is substantially reflected when first incident on the reflective polarizer at a first location and substantially transmitted when second incident on the reflective polarizer at a second location,
- a difference between the polarization state of the light ray and the pass polarization state of the reflective polarizer at the second location being greater when θ is zero and less when θ is not zero.

Embodiment 327 is the display system of Embodiment 302 comprising an exit pupil having a diameter in a range from about 4.5 mm to about 6 mm.

Embodiment 328 is the display system of Embodiment 302, wherein the optical system has an f-number in a range from about 0.2 to about 2.5.

Embodiment 329 is a display system for displaying an image to a viewer and having a maximum contrast ratio at a predetermined wavelength, comprising:
- an exit pupil having a diameter in a range from about 4.5 mm to about 6 mm;
- a display emitting an image; and
- an optical system for displaying the emitted image to the viewer, comprising:
  one or more optical lenses having an f-number in a range from about 0.2 to about 2.5;
  a reflective polarizer substantially reflecting light having a first polarization state and substantially transmitting light having an orthogonal second polarization state at the predetermined wavelength;
  a partial reflector disposed on and conforming to a different second major surface of the one or more optical lenses, the partial reflector having an average optical reflectance of at least 20% at the predetermined wavelength; and
  spaced apart first and second retarder layers disposed on and conforming to different major surfaces of the one or more optical lenses, such that at the predetermined wavelength and the first polarization state and for each location in a plurality of locations on the display, the display emits a cone of light rays substantially filling the exit pupil, the cone of light rays passing through the first and second retarder layers over respective first and second incident areas, such that an average retardance of each of the first and second retarder layers over the respective first and second incident areas is within 10% of one fourth of the predetermined wavelength.

Embodiment 330 is the display system of Embodiment 329, wherein the first retarder layer has at least one of a non-uniform retardance at the predetermined wavelength and a non-uniform fast optical axis orientation.

Embodiment 331 is the display system of Embodiment 329, wherein the first retarder layer has a first wavelength dispersion curve and the second retarder layer has a different second wavelength dispersion curve.

Embodiment 332 is the display system of Embodiment 329, wherein at the predetermined wavelength, at least one of the first and second retarder layers has a substantially uniform retardance across a first region of the retarder layer and a non-uniform retardance across a different second region of the retarder layer.

Embodiment 333 is the display system of Embodiment 329, wherein the first retarder layer is substantially a quarter-wave retarder for a first wavelength in a predetermined wavelength range containing the predetermined wavelength but not for a different second wavelength in the predetermined wavelength range, and the second retarder layer is substantially a quarter-wave retarder for the second wavelength but not for the first wavelength.

Embodiment 334 is the display system of Embodiment 329, wherein the first retarder layer has a uniform physical thickness and a variable orientation, and the second retarder layer has a uniform orientation and a variable physical thickness.

Embodiment 335 is the display system of Embodiment 329, wherein the second retarder layer has a uniform physical thickness and a variable orientation, and the first retarder layer has a uniform orientation and a variable physical thickness.

Embodiment 336 is the display system of Embodiment 329, wherein the first retarder layer has a substantially uniform orientation and non-uniform retardance across the first retarder layer, and the second retarder layer has a substantially uniform retardance and non-uniform orientation across the second retarder layer.

Embodiment 337 is the display system of Embodiment 329, wherein the first retarder layer has a substantially uniform orientation and uniform retardance across the first retarder layer, and the second retarder layer has a substantially non-uniform retardance and non-uniform orientation across the second retarder layer.

Embodiment 338 is the display system of Embodiment 329, wherein at the predetermined wavelength, the first retarder layer has a first retardance at at least one first location and a different second retardance at at least one different second location.

Embodiment 339 is the display system of Embodiment 329, wherein the first retarder layer has a first physical thickness at at least one first location and a different second physical thickness at at least one different second location.

Embodiment 340 is the display system of Embodiment 329, wherein the first retarder layer has at at least one first location, a first orientation and a first retardance at the predetermined wavelength, and at at least one different second location, a different second orientation and a different second retardance at the predetermined wavelength.

Embodiment 341 is the display system of Embodiment 329, wherein the first retarder layer comprises at least first and second stacked retarder layers, wherein at the predetermined wavelength and for at least one location on the first retarder layer, one of the at least first and second stacked retarder layers has a positive retardance and the other of the of the at least first and second stacked retarder layers has a negative retardance.

Embodiment 342 is the display system of Embodiment 329 having an optical axis intersecting the first retarder layer at a first origin and the reflective polarizer at a second origin, a light ray propagating along the optical axis passing through the one or more optical lenses, the partial reflector, the reflective polarizer and the first and second retarder layers without being substantially refracted.

Embodiment 343 is the display system of Embodiments 342, wherein for a plurality of chief light rays emitted by the display, each chief light ray having the predetermined wavelength and the first polarization state and emitted at a different separation from the optical axis, the chief ray is substantially reflected when first incident on the reflective polarizer at a first location thereon and substantially transmitted when second incident on the reflective polarizer at a second location thereon, a difference between the polarization state of the chief ray at the second location and the pass polarization state of the reflective polarizer at the second location being less than about 0.07.

Embodiment 344 is the display system of Embodiment 342, wherein for a chief light ray emitted by the display, the first retarder layer converts the chief light ray to a circularly polarized light for the chief light ray emitted from an edge of an image emitted by the display, and to an elliptically polarized light for the chief light ray propagating along the optical axis.

Embodiment 345 is the display system of Embodiment 342, wherein the optical axis intersects first retarder layer at a first origin and the reflective polarizer at a second origin, wherein each location on the reflective polarizer has corresponding mutually orthogonal pass and block polarization states, and wherein for a light ray having the predetermined wavelength and the block polarization state of the reflective polarizer at the second origin and first incident on the first retarder layer at the first origin and making an angle θ with the optical axis, the light ray is substantially reflected when first incident on the reflective polarizer at a first location and substantially transmitted when second incident on the reflective polarizer at a second location,
  a difference between the polarization state of the light ray and the pass polarization state of the reflective polarizer at the second location being greater when θ is zero and less when θ is not zero.

Embodiment 346 is the optical system of Embodiment 329, wherein the one or more optical lenses have at least one curved surface.

Embodiment 347 is the optical system of Embodiment 329, wherein the one or more optical lenses have at least one curved surface having a radius of curvature between 6 mm and 1000 mm.

Embodiment 348 is an optical system for displaying an image to a viewer and having a maximum contrast ratio at a predetermined wavelength, the optical system comprising:
  one or more optical lenses having at least one curved major surface;
  a first retarder layer;
  a reflective polarizer disposed on and conforming to a major surface of the one or more optical lenses;
  a partial reflector disposed on and conforming to a major surface of the one or more optical lenses between the first retarder layer and the reflective polarizer, the partial reflector having an average optical reflectance of at least 20% at the predetermined wavelength; and
  a second retarder layer disposed between the partial reflector and the reflective polarizer;
  the optical system having an optical axis intersecting the first retarder layer at a first origin and the reflective polarizer at a second origin, a light ray propagating along the optical axis passing through the one or more optical lenses, the partial reflector, the reflective polarizer and the first and second retarder layers without being substantially refracted, such that at the second origin, the reflective polarizer substantially reflects light having a block polarization state and substantially transmits light having an orthogonal pass polarization state at the predetermined wavelength;
  such that for a first light ray propagating along the optical axis and incident on the first retarder layer at the first origin having the predetermined wavelength and the block polarization state, the first light ray comprises a first polarization state when first incident on the reflective polarizer and a second polarization state when second incident on the reflective polarizer, a difference between the first and block polarization states being less than a difference between the second and pass polarization states.

Embodiment 349 is the optical system of Embodiment 348, wherein the first retarder layer has a substantially uniform orientation and non-uniform retardance across the first retarder layer, and the second retarder layer has a substantially uniform retardance and non-uniform orientation across the second retarder layer.

Embodiment 350 is the optical system of Embodiment 348, wherein the first retarder layer has a spatially non-uniform orientation and a spatially non-uniform retardance across the first retarder layer.

Embodiment 351 is the optical system of Embodiment 348, wherein at least one of the first and second retarder layers has a substantially uniform retardance across a first region of the retarder layer and a non-uniform retardance across a different second region of the retarder layer.

Embodiment 352 is the optical system of Embodiment 348, wherein the first retarder layer has a first wavelength dispersion curve and the second retarder layer has a different second wavelength dispersion curve.

Embodiment 353 is the optical system of Embodiment 348, wherein the first retarder layer comprises a first spin-coated retarder layer having a smaller average first physical thickness and the second retarder layer comprises a second spin-coated retarder layer having a greater average second physical thickness.

Embodiment 354 is the optical system of Embodiment 348, wherein each of the first and second retarder layers is a unitary retarder layer.

Embodiment 355 is the optical system of Embodiment 348 further comprising a display and an exit pupil, wherein at the predetermined wavelength and for each location in a plurality of locations on the display, the display emits a cone of light rays substantially filling the exit pupil, the cone of light rays passing through the first and second retarder layers over respective first and second incident areas, such that an average retardance of each of the first and second retarder layers over the respective first and second incident areas is within 10% of one fourth of the predetermined wavelength.

Embodiment 356 is the optical system of Embodiment 348, wherein the first retarder layer comprises at least first and second stacked retarder layers, wherein at the predetermined wavelength and for at least one location on the first retarder layer, one of the at least first and second stacked retarder layers has a positive retardance and the other of the of the at least first and second stacked retarder layers has a negative retardance.

Embodiment 357 is the optical system of Embodiment 348 further comprising a display, wherein for a plurality of chief light rays emitted by the display, each chief light ray having the predetermined wavelength and a different separation from the optical axis, the first retarder layer converts the chief light ray to a circularly polarized light.

Embodiment 358 is the optical system of Embodiment 348 further comprising a display, wherein for a plurality of chief light rays emitted by the display, each chief light ray having the predetermined wavelength and a different separation from the optical axis, the first retarder layer has a retardance within 10% of one fourth of the predetermined wavelength.

Embodiment 359 is the optical system of Embodiment 348 further comprising a display, wherein for a plurality of chief light rays emitted by the display, each chief light ray having the predetermined wavelength and emitted at a different separation from the optical axis, the chief ray is substantially reflected when first incident on the reflective polarizer at a first location thereon and substantially transmitted when second incident on the reflective polarizer at a second location thereon, a difference between the polarization state of the chief ray at the second location and the pass polarization state of the reflective polarizer at the second location being less than about 0.07.

Embodiment 360 is the display system of any one of Embodiments 302 to 359, wherein for at least one light ray emitted by the display, the light ray intersects the first and second retarder layers at respective first and second locations, and wherein in plan view, a fast axis of the first retarder layer at the first location is substantially parallel to a fast axis of the second retarder layer at the second location.

Embodiment 361 is the display system of any one of Embodiments 302 to 359, wherein for at least one light ray mitted by the display, the light ray intersects the first and second retarder layers at respective first and second locations, and wherein in plan view, a fast axis of the first retarder layer at the first location is substantially perpendicular to a fast axis of the second retarder layer at the second location.

Embodiment 362 is the display system of any one of Embodiments 302 to 359, wherein for at least a first and a second light ray emitted by the display, the first light ray intersects the first and second retarder layers at respective first and second locations, the second light ray intersects the first and second retarder at respective third and fourth locations, and wherein in plan view: a fast axis of the first retarder layer at the first location and a fast axis of the second retarder layer at the second location make a first angle with each other, and a fast axis of the first retarder layer at the third location and a fast axis of the second retarder layer at the fourth location make a second angle with each other.

Embodiment 363 is the display system of Embodiment 362, wherein the first and second angles are substantially equal.

Embodiment 364 is the display system of Embodiment 362, wherein the first and second angles are different.

Embodiment 365 is the display system of Embodiment 362, wherein the first and second angles are within 5 degrees of each other.

Embodiment 366 is the display system of Embodiment 362, wherein each of the first and second angles is no more than 10 degrees.

Embodiment 367 is the display system of Embodiment 362, wherein each of the first and second angles is in a range of 80 to 100 degrees.

Embodiment 368 is the display system of any one of Embodiments 302 to 359, wherein the display emits light having the first polarization state.

Embodiment 369 is the display system of any one of Embodiments 302 to 359, wherein the display emits light having the second polarization state.

Embodiment 370 is an optical system for transmitting light, comprising:
one or more optical lenses having at least one curved major surface;
a partial reflector disposed on and conforming to a major surface of the one or more optical lenses and having an average optical reflectance of at least 20% in a predetermined wavelength range;
a reflective polarizer disposed on and conforming to a major surface of the one or more optical lenses, the reflective polarizer substantially reflecting light having a first polarization state and substantially transmitting light having an orthogonal second polarization state in the predetermined wavelength range; and
a first retarder disposed on and conforming to a major surface of the one or more optical lenses, the optical system having an optical axis intersecting the first retarder at a first origin, a light ray propagating along the optical axis passing through the one or more optical lenses, the partial reflector, the reflective polarizer and the first retarder without being substantially refracted, the first retarder comprising non-overlapping central and first and second edge regions, the central region comprising the first origin, the first and second edge regions disposed at or near respective first and second edges of the first retarder, such that for at least one first wavelength $\lambda_o$ in the predetermined wavelength range:
the central region has an average retardance substantially equal to $\delta$;
the first edge region has an average retardance substantially equal to $\delta-\xi$; and
the second edge region has an average retardance substantially equal to $\delta+\xi$;
wherein for an integer n, $\lambda_o (n+\frac{1}{8}) \leq \delta \leq \lambda_o (n+\frac{1}{2})$ and $\delta/50 \leq \xi \leq \delta/2$.

Embodiment 371 is the optical system of Embodiment 370, wherein n is 0.

Embodiment 372 is the optical system of Embodiment 370, wherein for the at least one first wavelength $\lambda_o$ in the predetermined wavelength range, the central region has a substantially uniform retardance.

Embodiment 373 is the optical system of Embodiment 370, wherein for the at least one first wavelength $\lambda_o$ in the predetermined wavelength range, each of the first and second edge regions has a substantially uniform retardance.

Embodiment 374 is the optical system of Embodiment 370, wherein for the at least one first wavelength $\lambda_o$ in the predetermined wavelength range, at least one of the first and second edge regions has a varying retardance.

Embodiment 375 is the optical system of Embodiment 370, wherein $\delta$ is substantially equal $\lambda_o/4$ and $\delta/20 \leq \xi \leq \delta/5$.

Embodiment 376 is the optical system of Embodiment 370, wherein $\delta$ is substantially equal $\lambda_o (n+\frac{1}{4})$ and $\delta/20 \leq \xi \leq \delta/5$.

Embodiment 377 is the optical system of Embodiment 370, wherein the partial reflector is disposed between the first retarder and the one or more lenses.

Embodiment 378 is the optical system of Embodiment 370, wherein for the at least one first wavelength $\lambda_o$ in the predetermined wavelength range, the retardance of the first edge region decreases in a direction away from the first origin toward the first edge, and the retardance of the second edge region increases in a direction away from the first origin toward the second edge.

Embodiment 379 is the optical system of 301, wherein the first retarder has a retardance which varies such that a maximum contrast ratio of the optical system in the predetermined wavelength range is at least 5% greater than that of a comparative optical system having the same construction except that the first retarder of the comparative optical system has a uniform retardance of δ.

Embodiment 380 is the optical system of Embodiment 370, wherein the first retarder further comprises third and fourth edge regions, the central region between the first and third edge regions and between the second and fourth edge regions, wherein for the at least one first wavelength $\lambda_o$ in the predetermined wavelength range, the third edge region has an average retardance substantially equal to δ−ξ, and the fourth edge region has an average retardance substantially equal to δ+ξ.

Embodiment 381 is the optical system of Embodiment 380, wherein in a plan view, the first retarder has an area A, the central region has an area in a range from about A/10 to about 2A/3, and each of the first through fourth edge regions has an area in a range from about A/12 to about A/3.

Embodiment 382 is the optical system of Embodiment 381, wherein for the at least one first wavelength $\lambda_o$ in the predetermined wavelength range, the central region has a substantially uniform retardance.

Embodiment 383 is the optical system of Embodiment 382, wherein for the at least one first wavelength $\lambda_o$ in the predetermined wavelength range, at least one of the first through fourth edge regions has a substantially uniform retardance.

Embodiment 384 is the optical system of Embodiment 382, wherein for the at least one first wavelength $\lambda_o$ in the predetermined wavelength range, each of the first through fourth edge regions has a substantially uniform retardance.

Embodiment 385 is the optical system of Embodiment 370, wherein a first plane containing the optical axis intersects the first retarder in the central region and in the first edge region and a second plane containing the optical axis intersects the first retarder in the central region and in the second edge region, an angle between the first and second planes being in a range from about 60 degrees to about 120 degrees.

Embodiment 386 is the optical system of Embodiment 385, wherein for the at least one first wavelength $\lambda_o$ in the predetermined wavelength range, the first retarder has a retardance that is substantially symmetric under reflection about the first plane and substantially symmetric under reflection about the second plane.

Embodiment 387 is the optical system of any one of Embodiments 370 to 386, wherein for the at least one first wavelength $\lambda_o$ in the predetermined wavelength range, the first retarder has a retardance of $\delta_o$ at the first origin and a difference between a retardance of the first retarder and $\delta_o$ is substantially antisymmetric under reflection about a third plane containing the optical axis and substantially antisymmetric under reflection about a different fourth plane containing the optical axis.

Embodiment 388 is the optical system of Embodiment 387, wherein an angle between the third and fourth planes is in a range from about 60 degrees to about 120 degrees.

Embodiment 389 is the optical system of any one of Embodiments 370 to 388, wherein for the at least one first wavelength $\lambda_o$ in the predetermined wavelength range, the central region has an average fast axis orientation relative to the first polarization state substantially equal to θ, the first edge region has an average fast axis orientation relative to the first polarization state substantially equal to θ−ε, and the second edge region has an average fast axis orientation relative to the first polarization state substantially equal to θ+ε, wherein θ is in a range of 35 to 55 degrees and ε is in a range of 0.5 to 20 degrees.

Embodiment 390 is the optical system of any one of Embodiments 370 to 389, wherein for the at least one first wavelength $\lambda_o$ in the predetermined wavelength range, the first retarder has a fast axis orientation relative to the first polarization state that is substantially symmetric under reflection about a fifth plane containing the optical axis and substantially symmetric under reflection about a different sixth plane containing the optical axis.

Embodiment 391 is the optical system of any one of Embodiments 370 to 390, wherein for the at least one first wavelength $\lambda_o$ in the predetermined wavelength range, the first retarder has a fast axis orientation relative to the first polarization state at the first origin of $\theta_o$ and a difference between a fast axis orientation of the first retarder relative to the first polarization state and $\theta_o$ is substantially antisymmetric under reflection about a seventh plane containing the optical axis and substantially antisymmetric under reflection about a different eighth plane containing the optical axis.

Embodiment 392 is an optical system for transmitting light, comprising:
one or more optical lenses having at least one curved major surface;
a partial reflector disposed on and conforming to a major surface of the one or more optical lenses and having an average optical reflectance of at least 20% in a predetermined wavelength range;
a reflective polarizer disposed on and conforming to a major surface of the one or more optical lenses, the reflective polarizer substantially reflecting light having a first polarization state and substantially transmitting light having an orthogonal second polarization state in the predetermined wavelength range; and
a first retarder disposed on and conforming to a major surface of the one or more optical lenses, such that for at least one first wavelength $\lambda_o$ in the predetermined wavelength range:
a center of the first retarder has a retardance equal to $\delta_o$, wherein for an integer n, $\lambda_o(n+\frac{1}{8}) \leq \delta_o \leq \lambda_o(n+\frac{1}{2})$; and a retardance of the first retarder increases in a first direction away from the center to an edge of the first retarder and decreases in a second direction away from the center to an edge of the first retarder, an angle between the first and second directions being in a range from about 60 degrees to about 120 degrees, such that a maximum contrast ratio of the optical system in the predetermined wavelength range is at least 5% greater than that of a comparative optical system having the same construction except that the first retarder of the comparative optical system has a uniform retardance of $\delta_o$.

Embodiment 393 is the optical system of Embodiment 392, wherein the maximum contrast ratio of the optical system in the predetermined wavelength range is at least 10% greater than that of the comparative optical system.

Embodiment 394 is the optical system of Embodiment 392, wherein the maximum contrast ratio of the optical system in the predetermined wavelength range is at least 20% greater than that of the comparative optical system.

395. The optical system of Embodiment 392, wherein the angle between the first and second directions is about 90 degrees.

Embodiment 396 is the optical system of Embodiment 392, wherein the first and second directions are along first and second intersections of the first retarder with respective first and second planes containing the optical axis, and wherein for the at least one first wavelength $\lambda_o$ in the predetermined wavelength range, the first retarder has a retardance that is substantially symmetric under each of a reflection about the first plane and a reflection about the second plane.

Embodiment 397 is the optical system of any one of Embodiments 392 to 396, wherein for the at least one first wavelength $\lambda_o$ in the predetermined wavelength range, a difference between a retardance of the first retarder and $\delta$ is substantially antisymmetric under each of a reflection about a third plane containing the optical axis and a reflection about a different fourth plane containing the optical axis.

Embodiment 398 is the optical system of Embodiment 392, wherein n is 0.

Embodiment 399 is the optical system of Embodiment 392, wherein the first retarder comprises non-overlapping central and first and second edge regions, the central region comprising the center of the first retarder, the first and second edge regions disposed at or near respective first and second edges of the first retarder, such that for at least one first wavelength $\lambda_o$ in the predetermined wavelength range:
the central region has an average retardance substantially equal to $\delta$;
the first edge region has an average retardance substantially equal to $\delta-\xi$; and
the second edge region has an average retardance substantially equal to $\delta+\xi$,
wherein for an integer n, $\lambda_o (n+\frac{1}{8}) \leq \delta \leq \lambda_o (n+\frac{1}{2})$ and $\delta/50 \leq \xi \leq \delta/2$.

Embodiment 400 is the optical system of Embodiment 392, wherein the first retarder comprises non-overlapping central and first and second edge regions, the central region comprising the center of the first retarder, the first and second edge regions disposed at or near respective first and second edges of the first retarder, such that for at least one first wavelength $\lambda_o$ in the predetermined wavelength range:
the central region has an average fast axis orientation relative to the first polarization state substantially equal to $\theta$;
the first edge region has an average fast axis orientation relative to the first polarization state substantially equal to $\theta-\varepsilon$; and
the second edge region has an average fast axis orientation relative to the first polarization state substantially equal to $\theta+\Sigma$,
wherein $\theta$ is in a range of 35 to 55 degrees and $\varepsilon$ is in a range of 0.5 to 20 degrees.

Embodiment 401 is an optical system for transmitting light, comprising:
one or more optical lenses having at least one curved major surface;
a partial reflector disposed on and conforming to a major surface of the one or more optical lenses and having an average optical reflectance of at least 20% in a predetermined wavelength range;
a reflective polarizer disposed on and conforming to a major surface of the one or more optical lenses, the reflective polarizer substantially reflecting light having a first polarization state and substantially transmitting light having an orthogonal second polarization state in the predetermined wavelength range; and
a first retarder disposed on and conforming to a major surface of the one or more optical lenses, such that for at least one first wavelength $\lambda_o$ in the predetermined wavelength range:
a center of the first retarder has a fast axis orientation relative to the fast optical axis equal to $\theta_o$, $\theta_o$ being in a range of 35 to 55 degrees; and
a fast axis orientation of the first retarder increases in a first direction away from the center to an edge of the retarder and decreases in a second direction away from the center to an edge of the retarder, an angle between the first and second directions being in a range from about 60 degrees to about 120 degrees, such that a maximum contrast ratio of the optical system in the predetermined wavelength range is at least 5% greater than that of a comparative optical system having the same construction except that the first retarder of the comparative optical system has a uniform fast axis orientation with respect to the first polarization state of $\theta_o$.

Embodiment 402 is the optical system of Embodiment 401, wherein the maximum contrast ratio of the optical system in the predetermined wavelength range is at least 10% greater than that of the comparative optical system.

Embodiment 403 is the optical system of Embodiment 401, wherein the maximum contrast ratio of the optical system in the predetermined wavelength range is at least 20% greater than that of the comparative optical system.

Embodiment 404 is the optical system of Embodiment 401, wherein the angle between the first and second directions is about 90 degrees.

Embodiment 405 is the optical system of Embodiment 401, wherein the first and second directions are along first and second intersections of the first retarder with respective first and second planes containing the optical axis, and wherein for the at least one first wavelength $\lambda_o$ in the predetermined wavelength range, the first retarder has a fast axis orientation relative to the first polarization state that is substantially symmetric under each of a reflection about the first plane and a reflection about the second plane.

Embodiment 406 is the optical system of any one of Embodiments 401 to 405, wherein for the at least one first wavelength $\lambda_o$ in the predetermined wavelength range, a difference between a retardance of the first retarder and $\delta$ is substantially antisymmetric under each of reflection about a third plane containing the optical axis and a reflection about a different fourth plane containing the optical axis.

Embodiment 407 is the optical system of Embodiment 401, wherein the first retarder comprises non-overlapping central and first and second edge regions, the central region comprising the center of the first retarder, the first and second edge regions disposed at or near respective first and second edges of the first retarder, such that for at least one first wavelength $\lambda_o$ in the predetermined wavelength range:
the central region has an average retardance substantially equal to $\delta$;
the first edge region has an average retardance substantially equal to $\delta-\xi$; and
the second edge region has an average retardance substantially equal to $\delta+\xi$,
wherein for an integer n, $\lambda_o (n+\frac{1}{8}) \leq \delta \leq \lambda_o (n+\frac{1}{2})$ and $\delta/50 \leq \xi \leq \delta/2$.

Embodiment 408 is the optical system of Embodiment 401, wherein the first retarder comprises non-overlapping central and first and second edge regions, the central region comprising the center of the first retarder, the first and second edge regions disposed at or near respective first and second edges of the first retarder, such that for at least one first wavelength $\lambda_o$ in the predetermined wavelength range:

the central region has an average fast axis orientation relative to the first polarization state substantially equal to θ;
the first edge region has an average fast axis orientation relative to the first polarization state substantially equal to θ−ε; and
the second edge region has an average fast axis orientation relative to the first polarization state substantially equal to θ+ε,
wherein θ is in a range of 35 to 55 degrees and ε is in a range of 0.5 to 20 degrees.

Embodiment 409 is an optical system for transmitting light, comprising:
one or more optical lenses having at least one curved major surface;
a partial reflector disposed on and conforming to a major surface of the one or more optical lenses and having an average optical reflectance of at least 20% in a predetermined wavelength range;
a reflective polarizer disposed on and conforming to a major surface of the one or more optical lenses, the reflective polarizer substantially reflecting light having a first polarization state and substantially transmitting light having an orthogonal second polarization state in the predetermined wavelength range; and
a first retarder disposed on and conforming to a major surface of the one or more optical lenses, the optical system having an optical axis intersecting the first retarder at a first origin, a light ray propagating along the optical axis passing through the one or more optical lenses, the partial reflector, the reflective polarizer and the first retarder without being substantially refracted, the first retarder comprising non-overlapping central and first and second edge regions, the central region comprising the first origin, the first and second edge regions disposed at or near respective first and second edges of the first retarder, such that for at least one first wavelength $\lambda_o$ in the predetermined wavelength range:
the central region has an average fast axis orientation relative to the first polarization state substantially equal to θ;
the first edge region has an average fast axis orientation relative to the first polarization state substantially equal to θ−ε; and
the second edge region has an average fast axis orientation relative to the first polarization state substantially equal to θ+ε,
wherein θ is in a range of 35 to 55 degrees and ε is in a range of 0.5 to 20 degrees.

Embodiment 410 is the optical system of Embodiment 409, wherein θ is in a range of 40 to 50 degrees and ε is in a range of 1 to 15 degrees.

Embodiment 411 is the optical system of Embodiment 410, wherein ε is in a range of 2 to 10 degrees.

Embodiment 412 is the optical system of Embodiment 409, wherein a first plane containing the optical axis intersects the first retarder in the central region and in the first edge region and a second plane containing the optical axis intersects the first retarder in the central region and in the second edge region, an angle between the first and second planes being in a range from about 60 degrees to about 120 degrees.

Embodiment 413 is the optical system of Embodiment 412, wherein for the at least one first wavelength $\lambda_o$ in the predetermined wavelength range, the first retarder has a fast axis orientation relative to the first polarization state that is substantially symmetric under reflection about the first plane and substantially symmetric under reflection about the second plane.

Embodiment 414 is the optical system of any one of Embodiments 409 to 413, wherein for the at least one first wavelength $\lambda_o$ in the predetermined wavelength range, a difference between a fast axis orientation relative to the first polarization state and θ is substantially antisymmetric under reflection about a third plane containing the optical axis and substantially antisymmetric under reflection about a different fourth plane containing the optical axis.

Embodiment 415 is the optical system of Embodiment 414, wherein an angle between the third and fourth planes is in a range from about 60 degrees to about 120 degrees.

Embodiment 416 is the optical system of any one of Embodiments 409 to 415, wherein for the at least one first wavelength $\lambda_o$ in the predetermined wavelength range, the first retarder has a retardance that is substantially symmetric under reflection about a fifth plane containing the optical axis and substantially symmetric under reflection about a sixth plane containing the optical axis.

Embodiment 417 is the optical system of any one of Embodiments 409 to 416, wherein for the at least one first wavelength $\lambda_o$ in the predetermined wavelength range, a difference between a retardance of the first retarder and an average retardance of the central region is substantially antisymmetric under reflection about a seventh plane containing the optical axis and substantially antisymmetric under reflection about a different eighth plane containing the optical axis.

Embodiment 418 is the optical system of Embodiment 409, wherein for the at least one first wavelength $\lambda_o$ in the predetermined wavelength range, the central region has a substantially uniform fast axis orientation.

Embodiment 419 is the optical system of Embodiment 409, wherein for the at least one first wavelength $\lambda_o$ in the predetermined wavelength range, each of the first and second edge regions has a substantially uniform fast axis orientation.

Embodiment 420 is the optical system of Embodiment 409, wherein for the at least one first wavelength $\lambda_o$ in the predetermined wavelength range, at least one of the first and second edge regions has a varying fast axis orientation.

Embodiment 421 is the optical system of Embodiment 409, wherein the partial reflector is disposed between the first retarder and the one or more lenses.

Embodiment 422 is the optical system of Embodiment 409, wherein for the at least one first wavelength $\lambda_o$ in the predetermined wavelength range, the fast axis orientation of the first edge region decreases in a direction away from the first origin toward the first edge, and the retardance of the second edge region increases in a direction away from the first origin toward the second edge.

Embodiment 423 is the optical system of 340, wherein the first retarder has a fast axis orientation relative to the first polarization state which varies such that a maximum contrast ratio of the optical system in the predetermined wavelength range is at least 5% greater than that of a comparative optical system having the same construction except that the first retarder of the comparative optical system has a uniform fast axis orientation relative to the first polarization state of θ.

Embodiment 424 is the optical system of Embodiment 409, wherein the first retarder further comprises third and fourth edge regions, the central region between the first and third edge regions and between the second and fourth edge regions, wherein the third edge region has an average fast axis orientation relative to the first polarization state substantially equal to θ−ε, and the fourth edge region has an average fast axis orientation relative to the first polarization state substantially equal to θ+ε.

Embodiment 425 is the optical system of Embodiment 424, wherein in a plan view, the first retarder has an area A, the central region has an area in a range from about A/10 to about 2A/3, and each of the first through fourth edge regions has an area in a range from about A/12 to about A/3.

Embodiment 426 is the optical system of Embodiment 425, wherein for the at least one first wavelength $\lambda_o$ in the predetermined wavelength range, the central region has a substantially uniform fast axis orientation.

Embodiment 427 is the optical system of Embodiment 425, wherein at least one of the first through fourth edge regions has a substantially uniform fast axis orientation.

Embodiment 428 is the optical system of Embodiment 425, wherein each of the first through fourth edge regions has a substantially uniform fast axis orientation.

Embodiment 429 is an optical system for transmitting light, comprising:
  one or more optical lenses having at least one curved major surface;
  a partial reflector disposed on and conforming to a major surface of the one or more optical lenses and having an average optical reflectance of at least 20% in a predetermined wavelength range;
  a reflective polarizer disposed on and conforming to a major surface of the one or more optical lenses, the reflective polarizer substantially reflecting light having a first polarization state and substantially transmitting light having an orthogonal second polarization state in the predetermined wavelength range; and
  a first retarder disposed on and conforming to a major surface of the one or more optical lenses, the first retarder comprising a first region having a substantially uniform retardance and a non-overlapping second region having a non-uniform retardance, the first region having a surface area of least 10 percent of a total surface area of the first retarder, the second region being a remaining portion of the first retarder.

Embodiment 430 is an optical system for transmitting light, comprising:
  one or more optical lenses having at least one curved major surface;
  a partial reflector disposed on and conforming to a major surface of the one or more optical lenses and having an average optical reflectance of at least 20% in a predetermined wavelength range;
  a reflective polarizer disposed on and conforming to a major surface of the one or more optical lenses, the reflective polarizer substantially reflecting light having a first polarization state and substantially transmitting light having an orthogonal second polarization state in the predetermined wavelength range; and
  a first retarder disposed on and conforming to a major surface of the one or more optical lenses, the first retarder comprising a first region having a substantially uniform fast axis orientation and a non-overlapping second region having a non-uniform fast axis-orientation, the first region having a surface area of least 10 percent of a total surface area of the first retarder, the second region being a remaining portion of the first retarder.

Embodiment 431 is the optical system of Embodiment 429 or 430, wherein the optical system has an optical axis intersecting the first retarder at a first origin, a light ray propagating along the optical axis passing through the one or more optical lenses, the partial reflector, the reflective polarizer and the first retarder without being substantially refracted.

Embodiment 432 is the optical system of Embodiment 431, wherein the first region includes the first origin.

Embodiment 433 is the optical system of Embodiment 432, wherein the first region is a central region and the second region is a peripheral region substantially surrounding the central region.

Embodiment 434 is the optical system of Embodiment 433, wherein the second region includes non-overlapping first and second edge regions.

Embodiment 435 is the optical system of Embodiment 434, such that for at least one first wavelength $\lambda_o$ in the predetermined wavelength range:
  the central region has an average retardance substantially equal to δ;
  the first edge region has an average retardance substantially equal to δ−ξ; and
  the second edge region has an average retardance substantially equal to δ+ξ,
wherein for an integer n, $\lambda_o (n+1/8) \leq \delta \leq \lambda_o (n+1/2)$ and $\delta/50 \leq \xi \leq \delta/2$.

Embodiment 436 is the optical system of Embodiment 434, such that for at least one first wavelength $\lambda_o$ in the predetermined wavelength range:
  the central region has an average fast axis orientation relative to the first polarization state substantially equal to θ;
  the first edge region has an average fast axis orientation relative to the first polarization state substantially equal to θ−ε; and
  the second edge region has an average fast axis orientation relative to the first polarization state substantially equal to θ+ε,
wherein θ is in a range of 35 to 55 degrees and ε is in a range of 0.5 to 20 degrees.

Embodiment 437 is the optical system of any one of Embodiments 370 to 436 further comprising a second retarder disposed between the reflective polarizer and the partial reflector.

Embodiment 438 is the optical system of Embodiment 437, wherein the first retarder has a first wavelength dispersion curve and the second retarder has a different second wavelength dispersion curve.

Embodiment 439 is the optical system of Embodiment 437, wherein the second retarder has a substantially uniform retardance and non-uniform orientation across the second retarder.

Embodiment 440 is the optical system of Embodiment 437, wherein the second retarder has a substantially non-uniform retardance and uniform fast axis orientation across the second retarder.

Embodiment 441 is the optical system of Embodiment 437, wherein the second retarder has a substantially non-uniform retardance and non-uniform fast axis orientation across the second retarder.

Embodiment 442 is the optical system of Embodiment 437, wherein the second retarder has a substantially uniform retardance and uniform fast axis orientation across the second retarder.

Embodiment 443 is the optical system of Embodiment 437, wherein the optical axis intersects the second retarder at a second origin, and wherein a fast axis of the first retarder at the first origin is substantially parallel to a fast axis of the second retarder at the second origin.

Embodiment 444 is the optical system of Embodiment 437, wherein the optical axis intersects the second retarder at a second origin, and wherein a fast axis of the first retarder at the first origin is substantially perpendicular to a fast axis of the second retarder at the second origin.

Embodiment 445 is the optical system of Embodiment 437, wherein for at least one light ray incident on the optical system, the light ray intersects the first and second retarders at respective first and second locations, and wherein in plan view, a fast axis of the first retarder at the first location is substantially parallel to a fast axis of the second retarder at the second location.

Embodiment 446 is the optical system of Embodiment 437, wherein for at least one light ray incident on the optical system, the light ray intersects the first and second retarders at respective first and second locations, and wherein in plan view, a fast axis of the first retarder at the first location is substantially perpendicular to a fast axis of the second retarder at the second location.

Embodiment 447 is the optical system of Embodiment 437, wherein for at least a first and a second light ray incident on the optical system, the first light ray intersects the first and second retarder layers at respective first and second locations, the second light ray intersects the first and second retarder at respective third and fourth locations, and wherein in plan view: a fast axis of the first retarder layer at the first location and a fast axis of the second retarder layer at the second location make a first angle with each other, and a fast axis of the first retarder layer at the third location and a fast axis of the second retarder layer at the fourth location make a second angle with each other.

Embodiment 448 is the optical system of Embodiment 447, wherein the first and second angles are substantially equal.

Embodiment 449 is the optical system of Embodiment 447, wherein the first and second angles are different.

Embodiment 450 is the optical system of Embodiment 447, wherein the first and second angles are within 5 degrees of each other.

Embodiment 451 is the optical system of Embodiment 447, wherein each of the first and second angles is no more than 10 degrees.

Embodiment 452 is the optical system of Embodiment 447, wherein each of the first and second angles is in a range of 80 to 100 degrees.

Embodiment 453 is the optical system of Embodiment 437, wherein at least one of the first and second retarders is substantially planar.

Embodiment 454 is the optical system of Embodiment 437, wherein each of the first and second retarders is substantially planar.

Embodiment 455 is the optical system of Embodiment 437, wherein at least one of the first and second retarder layers is curved about two orthogonal axes.

Embodiment 456 is the optical system of Embodiment 437, wherein at each of the first and second retarder layers is curved about two orthogonal axes.

Embodiment 457 is the optical system of any one of Embodiments 370 to 456, wherein the predetermined wavelength range comprises at least one visible wavelength range.

Embodiment 458 is the optical system of any one of Embodiments 370 to 456, wherein the predetermined wavelength range is from 400 nm to 700 nm.

Embodiment 459 is the optical system of any one of Embodiments 370 to 456, wherein the predetermined wavelength range comprises an infrared wavelength range.

Embodiment 460 is an optical system according to any one of the previous Embodiments directed to an optical system, wherein the average optical reflectance is at least 30 percent.

Embodiment 461 is an optical system according to any one of the previous Embodiments directed to an optical system, wherein the average optical reflectance is no more than 70 percent.

Embodiment 462 is a display system according to any one of the previous Embodiments directed to a display system, wherein the average optical reflectance is at least 30 percent.

Embodiment 463 is a display system according to any one of the previous Embodiments directed to a display system, wherein the average optical reflectance is no more than 70 percent.

Embodiment 464 is a head-mounted display comprising at least one display system, the at least one display system comprising an optical system according to any one of the previous Embodiments directed to an optical system or a display system according to any one of the previous Embodiments directed to a display system.

EXAMPLES

Example 1

An optical system similar to optical system 1000 having, in sequence, a backlight and absorbing display polarizer (corresponding to object 100), a first retarder layer (corresponding to retarder layer 520 and disposed adjacent the display polarizer), a partial reflector (corresponding to partial reflector 320), a second retarder layer (corresponding to retarder layer 420), and a reflective polarizer (corresponding to reflective polarizer 220) was modeled. The absorbing polarizer was modeled as a Sanritz SR5518 commercial display polarizer available from Sanritz Corporation (Toyama, Japan), the partial reflector was modeled as a half mirror utilizing a vapor deposited 5-layer coating of alternating $TiO_2$ and $MgF_2$ layers, and the reflective polarizer was modeled as Advanced Polarizing Film available from 3M Company (St. Paul, MN). The system was modeled in two independent steps. In the first step, the fast axis orientation of the second retarder layer was selected to minimize leakage through the reflective polarizer when light incident on the second retarder layer is circularly polarized. In the second step, the retardance and the fast axis orientation of the first retarder layer was selected to maximize the degree of circular polarization of the light transmitted through the first retarder layer.

Figure 20:
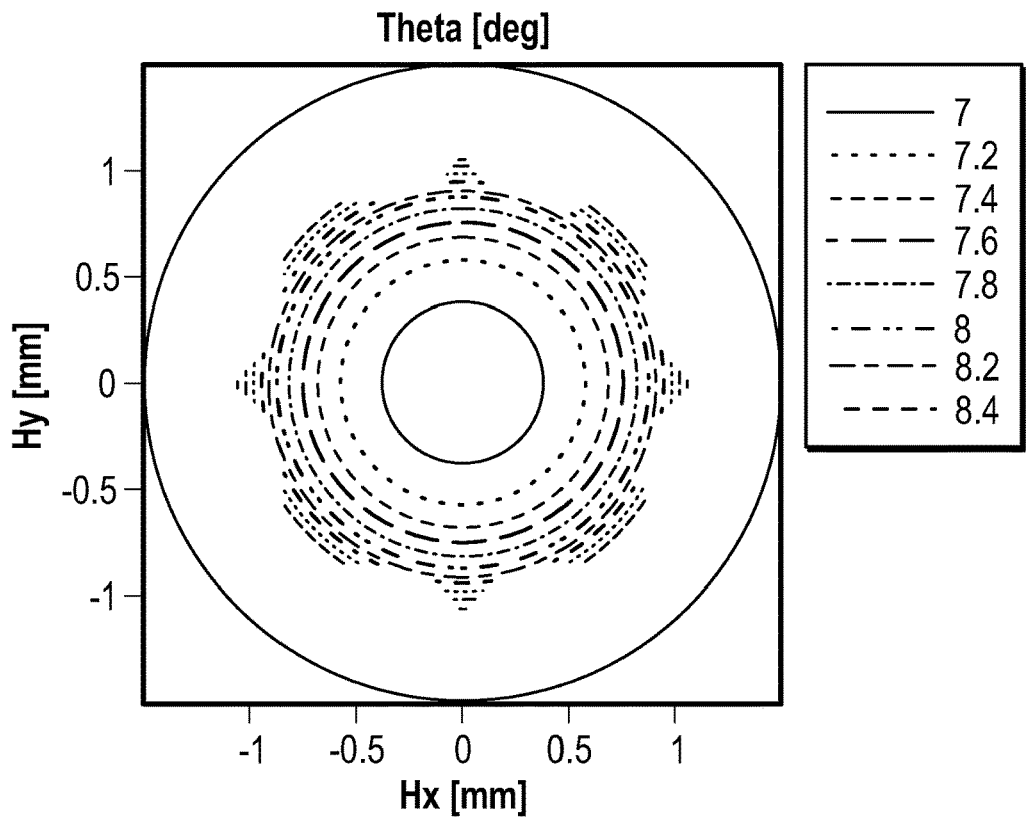
FIG. 20 is a contour plot of the average angle of incidence of light in the optical system first incident on the reflective polarizer as a function of location on the reflective polarizer.
Figure 21:
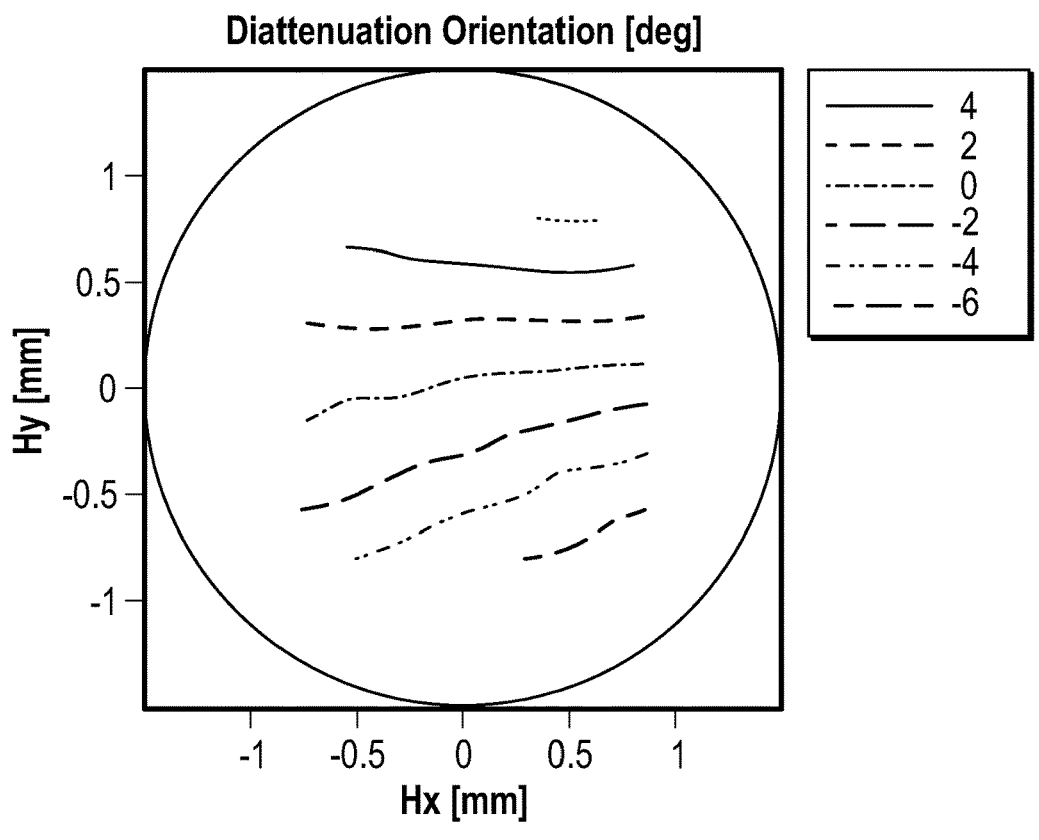
FIG. 21 is a contour plot of the diattenuation orientation of a reflective polarizer formed into a curved shape.
Figure 22A:
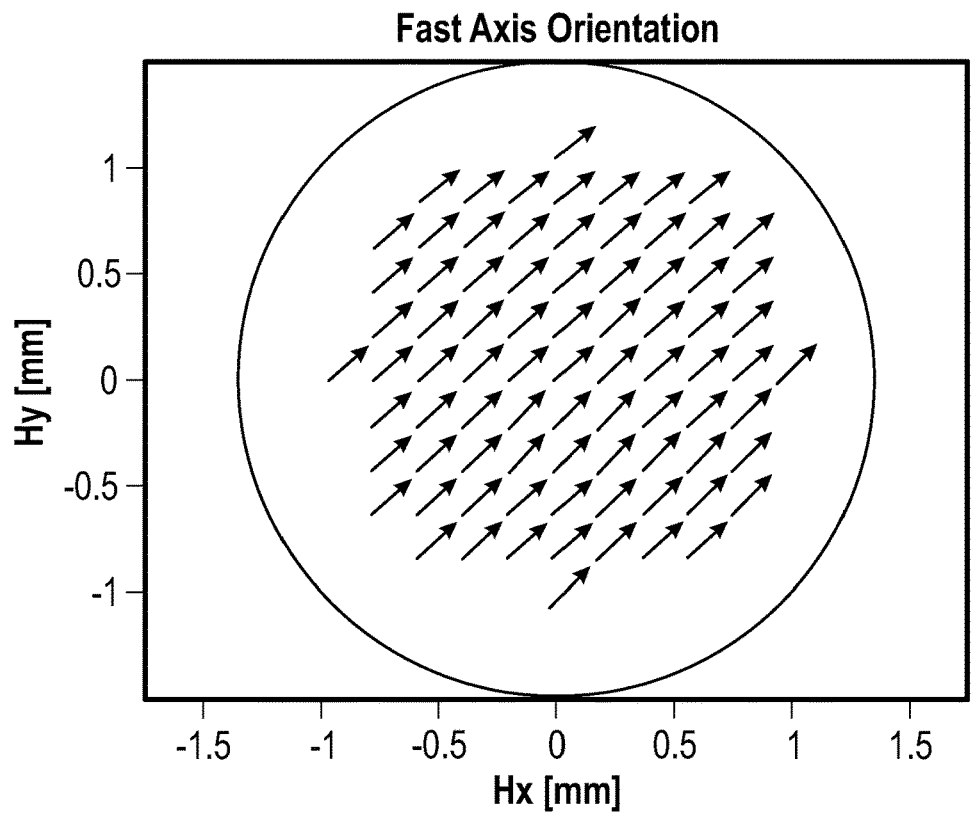
FIGS. 22A-22B are plots of the fast axis orientation of a retarder layer.
Figure 22B:
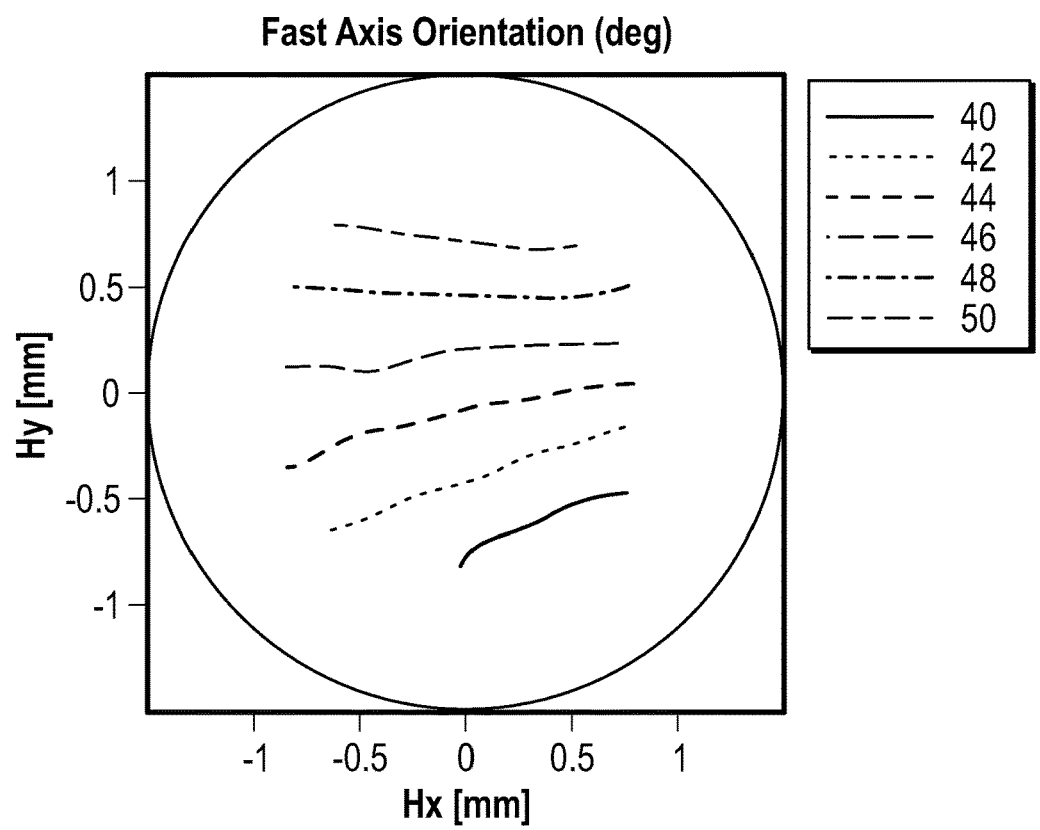
Figure 23:
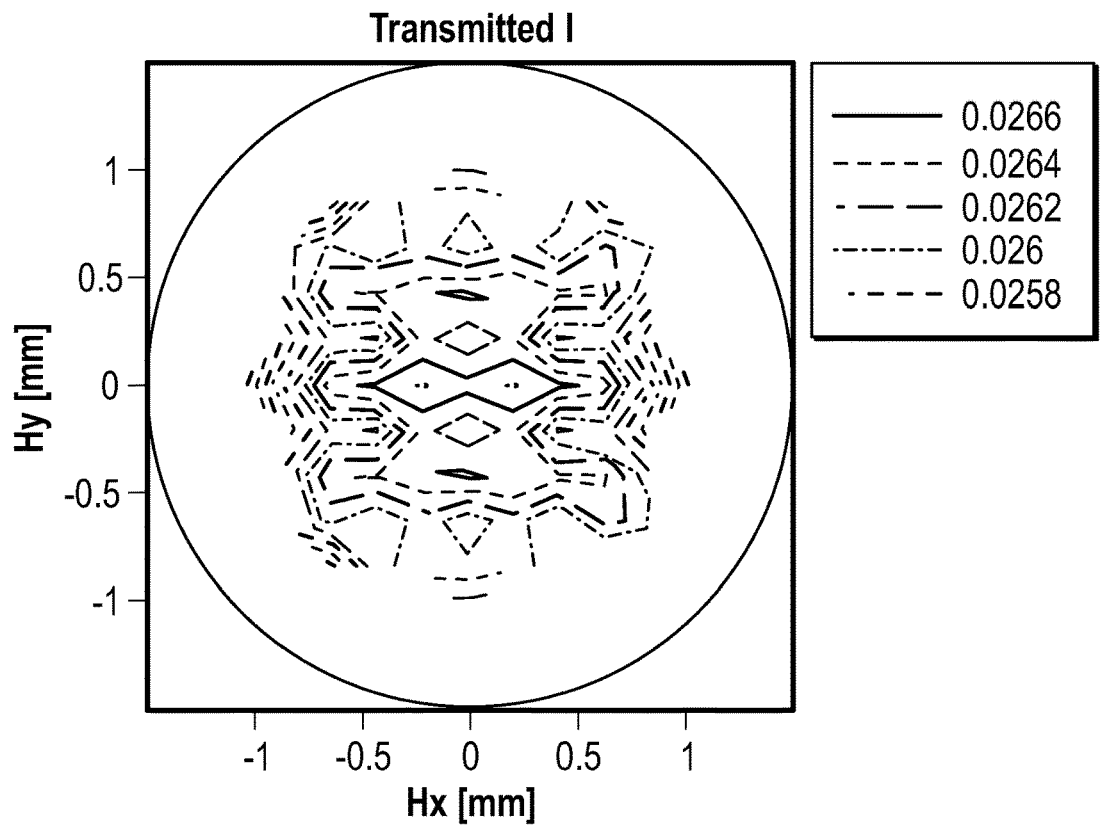
FIG. 23 is a contour plot of the transmitted intensity as a fraction of incident intensity on a reflective polarizer of an optical system having a retarder layer with a variable fast axis orientation.
Figure 24:
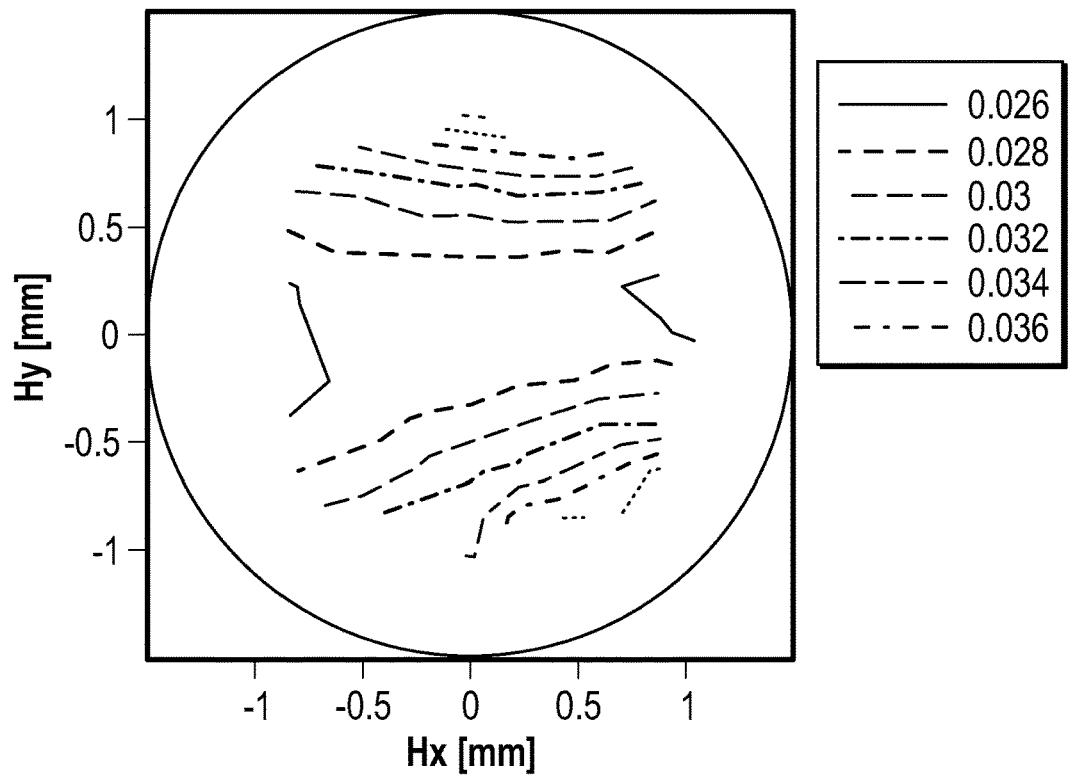
FIG. 24 is a contour plot of the transmitted intensity as a fraction of incident intensity on a reflective polarizer of a comparative optical system having a retarder layer with a uniform retardance and a uniform fast axis orientation.

The light first incident on the reflective polarizer was modeled as having the average incidence angle (Theta) on the reflective polarizer as a function of location (Hx and Hy denote the x- and y-coordinates in mm) on the reflective polarizer shown in FIG. 20. The pass axis of the reflective polarizer was modeled as having been shifted during forming into a curved shape to have the diattenuation orientation (angle between the local transmission axis and a local axis tangent to the reflective polarizer and aligned with the pass axis at the apex) illustrated in FIG. 21. The second retarder layer had a uniform quarter-wave retardance and a non-uniform fast optical axis orientation. The fast axis orientation was determined by minimizing the difference between the polarization state at the reflective polarizer and the local block state of the reflective polarizer of light that is first incident on the retarder layer in a circular polarization state quantified by the light leakage intensity through the reflective polarizer. The resulting fast axis orientation is illustrated by the arrow distribution of FIG. 22A and by the contour plot of FIG. 22B which shows the angle between the fast axis and the y-axis. The fraction of intensity (I) of light first incident on the reflective polarizer which is transmitted through the reflective polarizer is illustrated in FIG. 23. For comparison, the fraction of light first incident on the reflective polarizer in an otherwise equivalent optical system where the second retarder layer is a uniform quarter wave retarder with a uniform 45 degree fast optical axis orientation is shown in FIG. 24. It can be seen from FIGS. 23-24 that patterning the fast axis orientation significantly reduces the light first incident on the reflective polarizer that is transmitted through the reflective polarizer.

Figure 25:
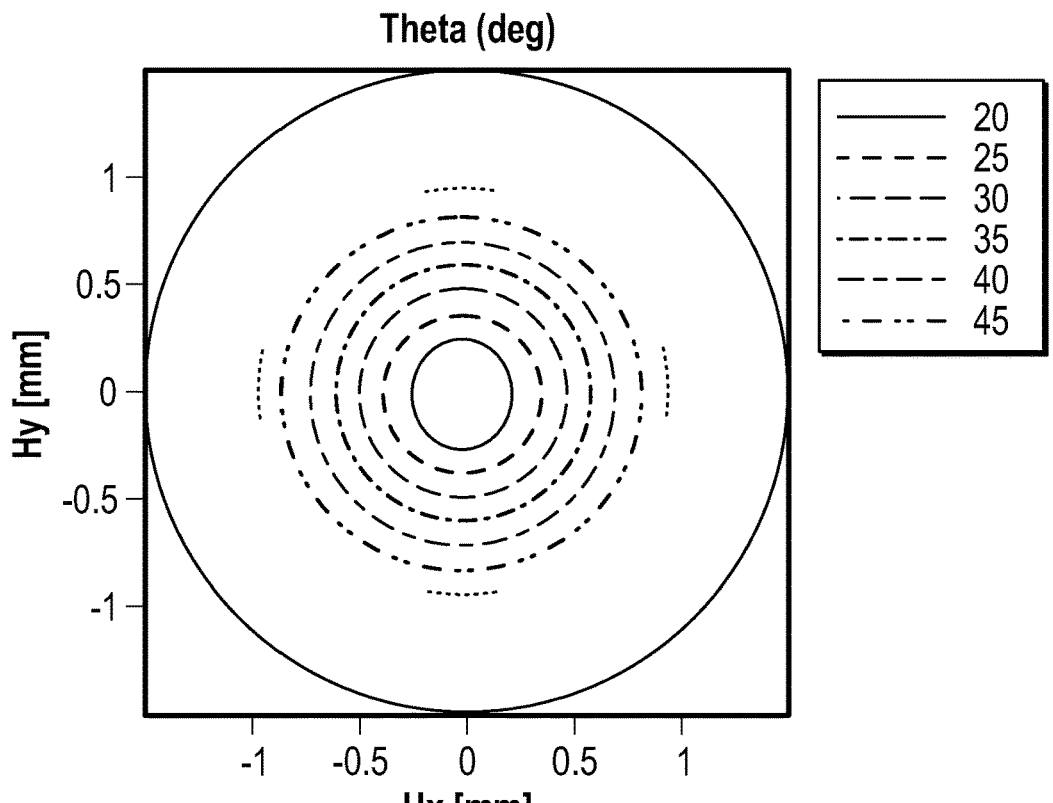
FIG. 25 is a contour plot of the average angle of incidence of light in the optical system first incident on a first retarder layer as a function of location on the first retarder layer.
Figure 26:
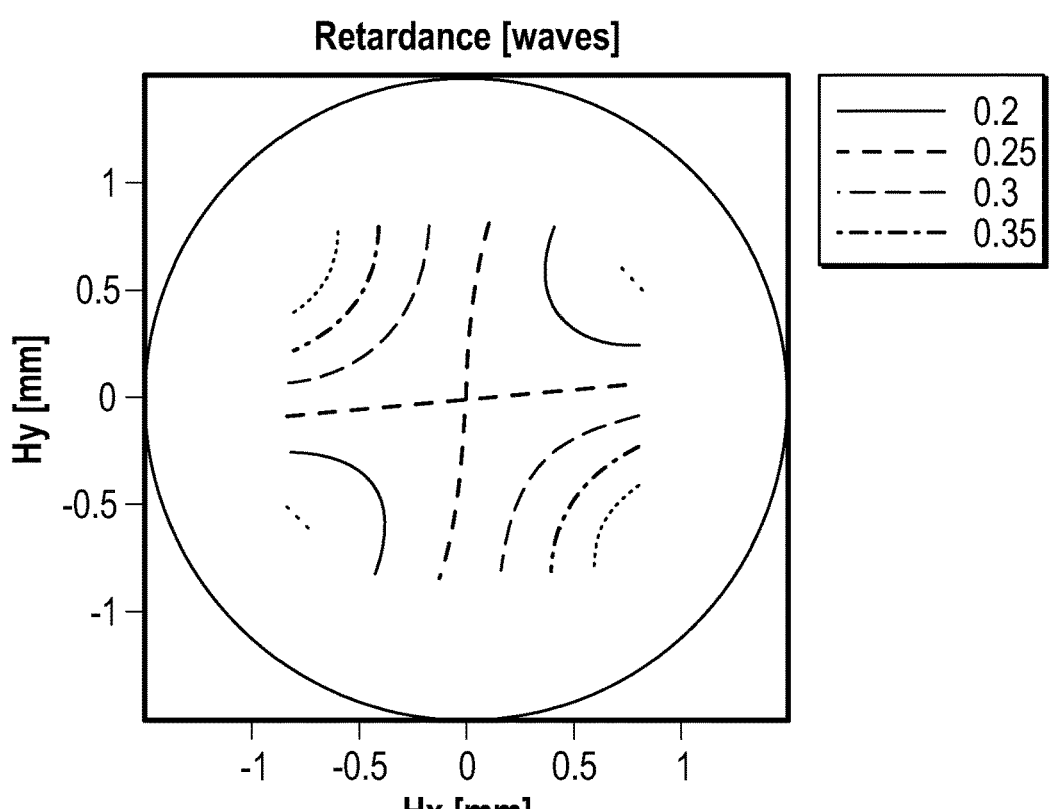
FIG. 26 is a contour plot of the retardance of a retarder layer.
Figure 27A:
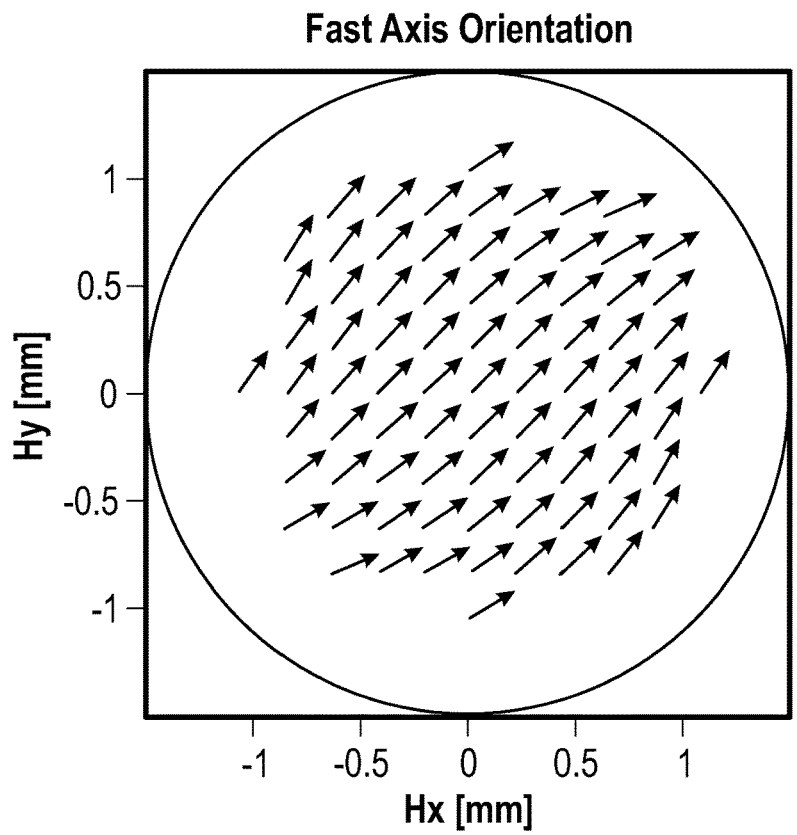
FIGS. 27A-27B are plots of the fast axis orientation of a retarder layer.
Figure 27B:
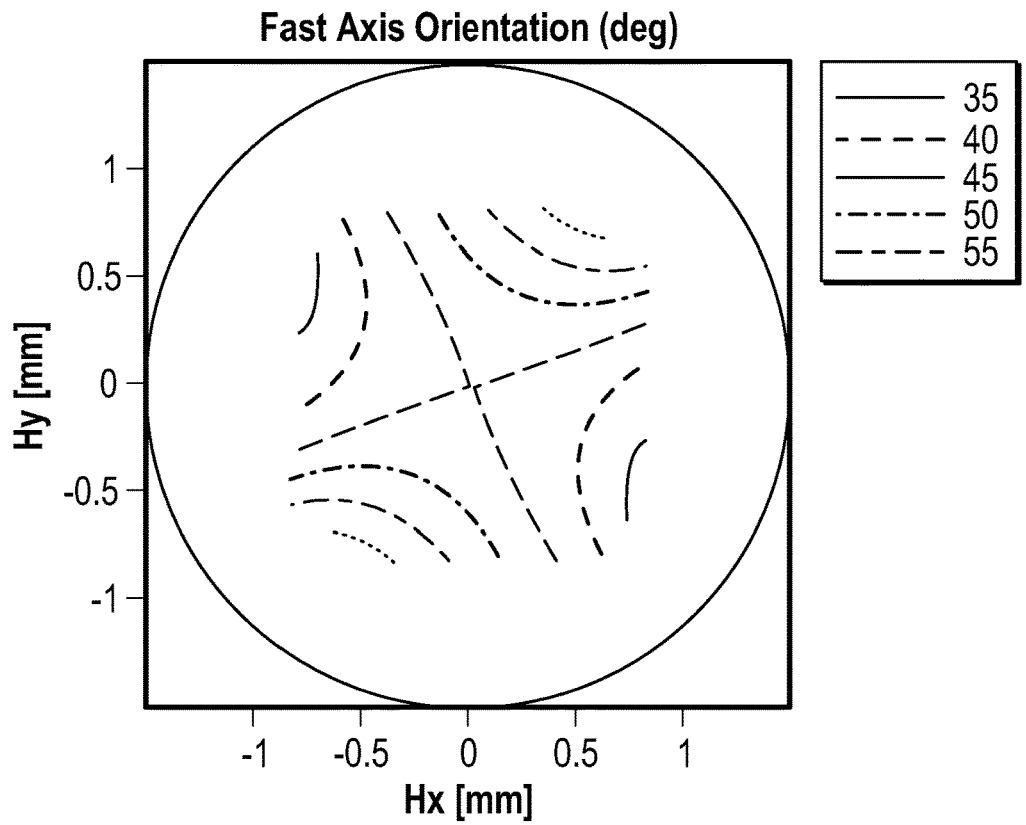
Figure 28:
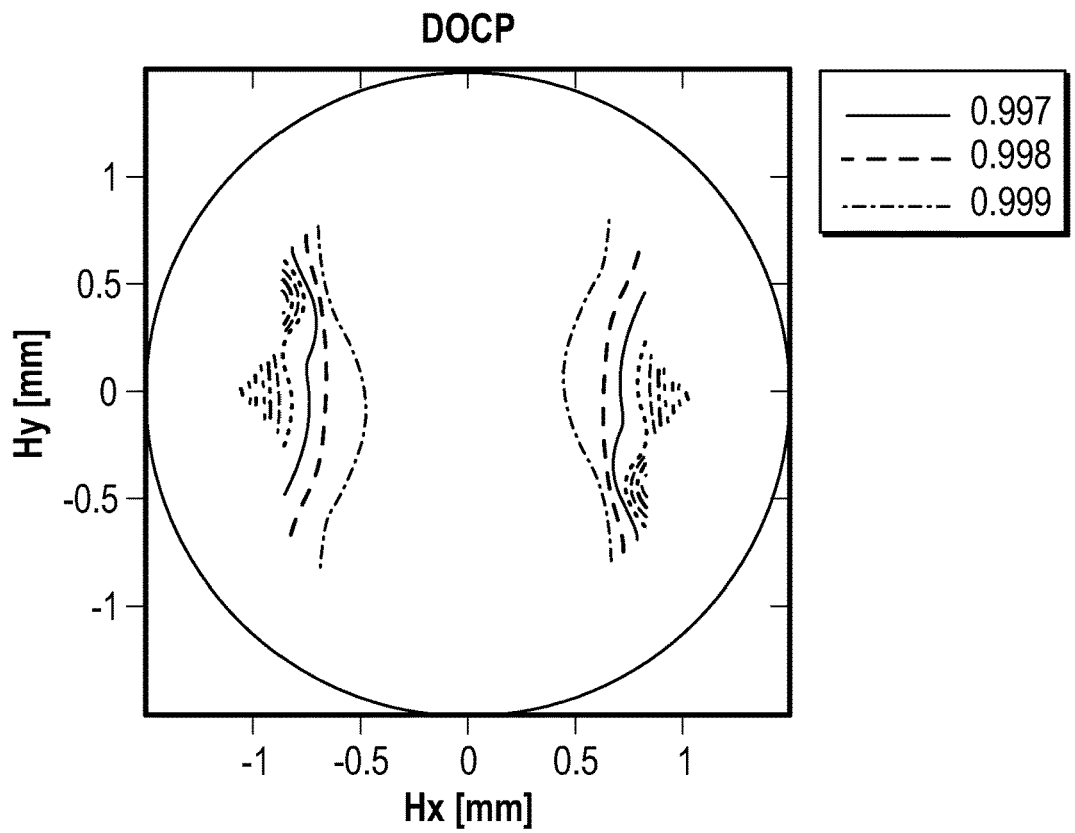
FIG. 28 is a contour plot of the degree of circular polarization (DOCP) of light transmitted through a first retarder layer having a non-uniform retardance and a non-uniform fast axis orientation.
Figure 29:
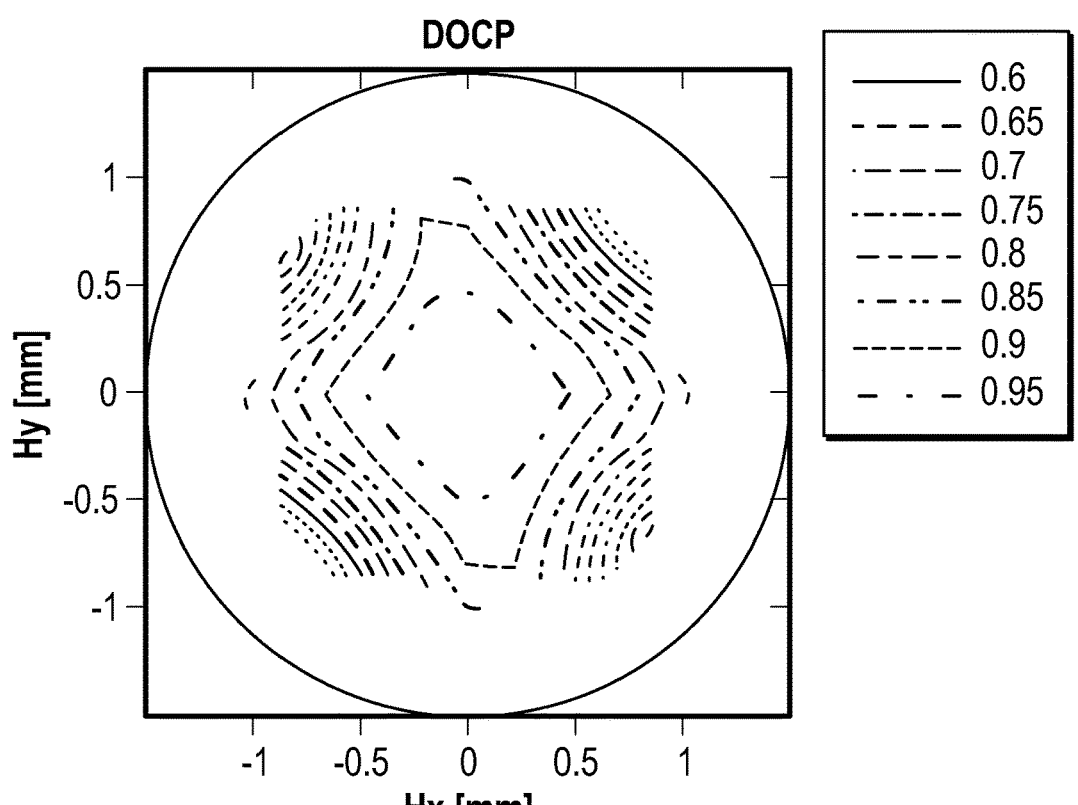
FIG. 29 is a contour plot of the degree of circular polarization (DOCP) of light transmitted through a comparative first retarder layer having a uniform retardance and a uniform fast axis orientation.

The first retarder layer had a non-uniform retardance and a non-uniform orientation. The retardance and the fast optical axis orientation were selected to maximize the degree of circular polarization of light transmitted through the first retarder layer (i.e., maximizing |V/I| where V and I are the Stokes parameters) when the light from the backlight was unpolarized and the pass axis of the absorbing display polarizer was along the x-direction. The light from the backlight was modeled as having the average incident angle of light on the first retarder layer as a function of location on the first retarder layer shown in FIG. 25. The resulting retardance (in waves) of the first retarder layer is shown in FIG. 26 and the resulting fast axis orientation is illustrated by the arrow distribution of FIG. 27A and by the contour plot of FIG. 27B which shows the angle between the fast axis and the y-axis. The degree of circular polarization (|V/I|) of light transmitted through the first retarder layer is illustrated in FIG. 28 where it can be seen that the degree of circular polarization is greater than about 0.997 over most of the area of the retarder. For comparison, the degree of circular polarization for an otherwise equivalent optical system where the first retarder layer is a uniform quarter wave retarder with a uniform 45 degree fast optical axis orientation is shown in FIG. 29. It can be seen from FIGS. 28-29 that patterning the retardance and the fast axis orientation significantly increased the degree of circular polarization.

Example 2

A retarder having a non-uniform retardance was made by spin coating a retarder layer onto an inner surface (concave surface) of an optical lens. The inner surface of the lens had a diameter of 58.8 mm and a maximum sag (denoted Sm in FIG. 6) of 15.6 mm. The lens was made via injection molding polycarbonate into the desired lens shape. The inner surface was cleaned and plasma treated and then a hard coat layer was applied. ROLIC ROP 131-360 LPP material was diluted from 6 weight percent solids (as supplied by ROLIC Technologies Ltd. (Allschwil, Switzerland)) to 4 weight percent solids using cyclohexanone. The LPP material was then spin coated onto the hard coated inner surface. The spin coater rotation rate was accelerated at 2000 RPM/s to a rotation speed of 3000 RPM, the rotation rate was held at 3000 RPM for 45 seconds, and then the rotation rate was decelerated to rest at 2000 RPM/s. The coating was annealed for 5 minutes at about 55° C. The LPP material was UV cured in air using linearly polarized light applied normal to the coated lens surface with constant polarization angle to the lens surface. ROLIC ROF 5190-416, which is an LCP material supplied at 35 weight percent solids, was spin coated onto the LPP coated concave surface. The spin coater rotation rate was accelerated at 2000 RPM/s to a rotation speed of 3200 RPM, the rotation rate was held at 3200 RPM for 45 seconds, and then the rotation rate was decelerated to rest at 2000 RPM/s. The coating was annealed for 5 minutes at about 55° C. The LPP layer was then UV cured in nitrogen using unpolarized UV light.

The retardance and fast axis orientation was measured by mounting the lens on a rotation platform under a Mueller-matrix polarimeter. The fast axis orientation at the apex of the lens (corresponding to apex 757 in FIG. 6) was fixed at one of several predetermined angles (0 degrees to 150 degrees in 30 degree increments) relative to a fixed axis orthogonal to the optical axis of the lens (e.g., the fixed axis may correspond be the x-axis of FIG. 1A) by rotating the lens about the optical axis until the fast axis at the apex had the predetermined angle with the fixed axis. Then the lens was rotated about the fixed axis to determine the retardance and fast axis rotation at various points on the lens. The position was specified by the lens slope (angle between the optical axis and the normal to the lens surface). The lens slope varied from 0 degrees at the apex to 55.6 degrees at the edge of the lens. The measurement was repeated at different fast axis orientations by rotating the lens about the optical axis so that the fast axis at the apex was at a different predetermined angle (e.g., 30 degrees higher than for the previous measurement) from the fixed axis. Then a retardance versus slope for the different predetermined angle was then determined by rotating about the fixed axis to select different slopes. This was repeated until the retardance and fast axis orientation versus slope was obtained for each predetermined angle. Each polarimeter measurement was an average over 20 scans and a wavelength of 550 nm.

Figure 30:
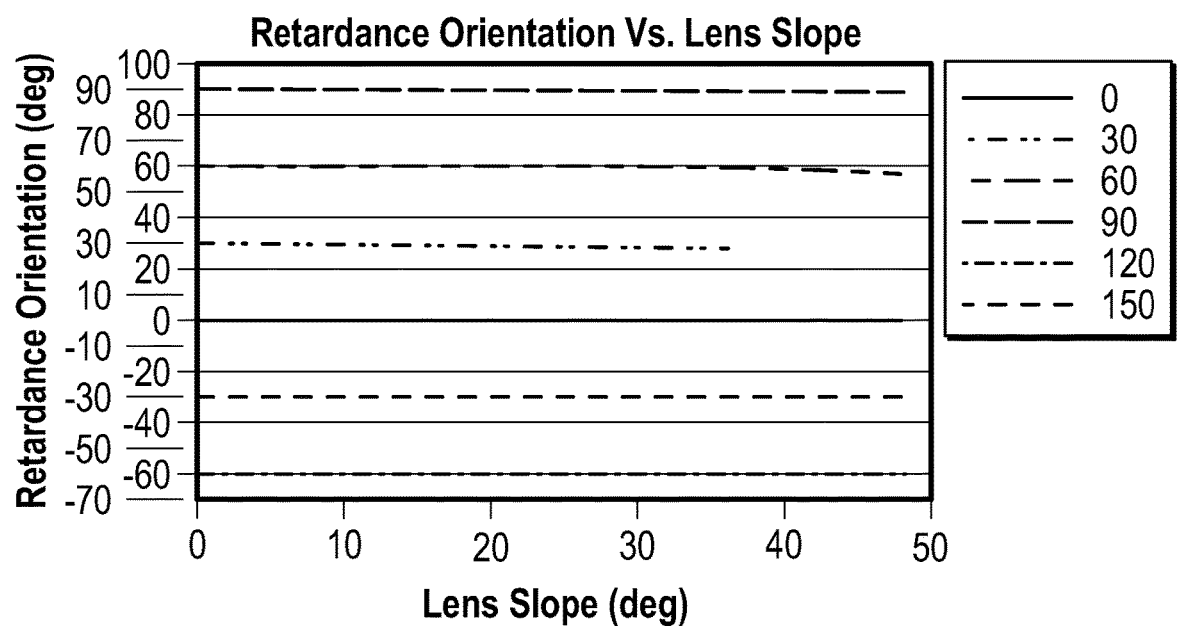
FIG. 30 is a plot of the fast axis orientation of a retarder disposed on a major surface of a lens versus lens slope and fast axis orientation.
Figure 31:
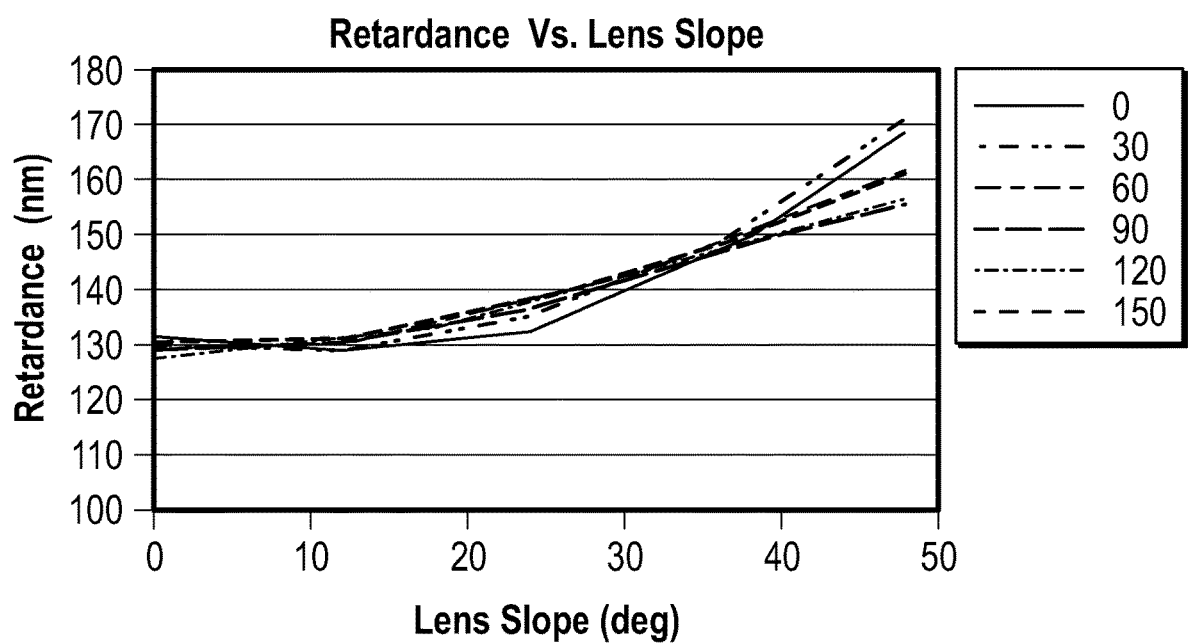
FIG. 31 is a plot of the retardance of a retarder disposed on a major surface of a lens versus lens slope and fast axis orientation.

FIG. 30 is a plot of fast axis orientation versus lens slope for various fast axis orientations at the apex (0 degrees to 150 degrees in 30 degree increments as indicated in the legend). FIG. 31 is a plot of retardance versus lens slope for various fast axis orientations at the apex (0 degrees to 150 degrees in 30 degree increments as indicated in the legend). The fast axis orientation angle at the apex of 150 degrees is equivalent to a fast axis orientation of −30 degrees and the fast axis orientation angle of the apex of 120 degrees is equivalent to a fast axis orientation of −60 degrees.

An optical system including the retarder having the retardance depicted in FIG. 31 is disposed between a reflective polarizer and a partial reflector. A second retarder having a uniform fast axis orientation at 45 degrees to a first polarization state of the reflective polarizer and having uniform quarter-wave retardance is disposed between the partial reflector and a display panel.

An optical system including the retarder having the retardance depicted in FIG. 31 is disposed between a display panel and a partial reflector. The optical system includes a reflective polarizer adjacent to and spaced apart from the partial reflector. A second retarder having a uniform fast axis orientation at 45 degrees to the first polarization state of the reflective polarizer and having uniform quarter-wave retardance is disposed between the partial reflector and the reflective polarizer.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof

What is claimed is:

1. An optical system for displaying an object to a viewer, comprising:
   one or more optical lenses having at least one curved major surface;
   a reflective polarizer disposed on and conforming to a first major surface of the one or more optical lenses, the reflective polarizer substantially reflecting light having a first polarization state and substantially transmitting light having an orthogonal second polarization state;
   a partial reflector disposed on and conforming to a different second major surface of the one or more optical lenses, the partial reflector having an average optical reflectance of at least 20%;
   a first retarder layer disposed on and conforming to a third major surface of the one or more optical lenses; and
   a second retarder layer disposed on and conforming to a fourth major surface, different than the third major surface, of the one or more optical lenses, such that relative to the first polarization state, the first retarder layer has a substantially uniform orientation and uniform retardance across the first retarder layer, and the second retarder layer has a substantially non-uniform retardance and non-uniform orientation across the second retarder layer.

2. The optical system of claim 1, wherein the first retarder layer has a first wavelength dispersion curve and the second retarder layer has a different second wavelength dispersion curve.

3. The optical system of claim 1, wherein the first retarder layer comprises a first spin-coated retarder layer having a smaller average first physical thickness and the second retarder layer comprises a second spin-coated retarder layer having a greater average second physical thickness.

4. The optical system of claim 1 having an optical axis intersecting the first retarder layer at a first origin and the reflective polarizer at a second origin, a light ray propagating along the optical axis passing through the one or more optical lenses, the partial reflector, the reflective polarizer and the first retarder layer without being substantially refracted, the optical system further comprising a display, wherein for a plurality of chief light rays emitted by the display, each chief light ray having the first polarization state at a predetermined wavelength and a different separation from the optical axis, the first retarder layer converts the chief light ray to a circularly polarized light.

5. The optical system of claim 1 having an optical axis intersecting the first retarder layer at a first origin and the reflective polarizer at a second origin, a light ray propagating along the optical axis passing through the one or more optical lenses, the partial reflector, the reflective polarizer and the first retarder layer without being substantially refracted, wherein each location on the reflective polarizer has corresponding mutually orthogonal pass and block polarization states, and wherein for a light ray having a predetermined wavelength and the block polarization state of the reflective polarizer at the second origin and first incident on the first retarder layer at the first origin and making an angle $\theta$ with the optical axis, the light ray is substantially reflected when first incident on the reflective polarizer at a first location and substantially transmitted when second incident on the reflective polarizer at a second location,
a difference between the polarization state of the light ray and the pass polarization state of the reflective polarizer at the second location being greater when $\theta$ is zero and less when $\theta$ is not zero.

* * * * *